United States Patent
Katayama et al.

(10) Patent No.: US 6,424,752 B1
(45) Date of Patent: Jul. 23, 2002

(54) IMAGE SYNTHESIS APPARATUS AND IMAGE SYNTHESIS METHOD

(75) Inventors: Tatsushi Katayama, Tokyo; Hideo Takiguchi, Kawasaki; Kotaro Yano; Kenji Hatori, both of Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/163,344

(22) Filed: Sep. 30, 1998

(30) Foreign Application Priority Data

Oct. 6, 1997 (JP) ............................................. 9-289175
Mar. 6, 1998 (JP) ........................................... 10-071204

(51) Int. Cl.⁷ ............................ G06K 9/36; G06G 5/02; H04N 9/74; H04N 1/46
(52) U.S. Cl. ...................... 382/284; 382/294; 382/293; 382/287; 345/630; 345/629; 348/606; 348/584; 358/540; 358/450
(58) Field of Search ................................. 382/284, 287, 382/291, 293, 282, 283, 294, 295, 302; 358/443, 540, 444, 448, 450, 538; 345/629, 630, 634, 635, 641; 348/584, 606

(56) References Cited

U.S. PATENT DOCUMENTS

| | | | |
|---|---|---|---|
| 5,140,647 A | | 8/1992 | Iise et al. ...................... 382/41 |
| 5,465,163 A | * | 11/1995 | Yoshihara et al. ........... 358/444 |
| 5,581,377 A | * | 12/1996 | Shimizu et al .............. 358/540 |
| 5,625,720 A | * | 4/1997 | Miyaza et al. .............. 382/284 |
| 5,982,951 A | * | 11/1999 | Katayama et al. ........... 392/284 |

FOREIGN PATENT DOCUMENTS

| | | | | |
|---|---|---|---|---|
| EP | 0599345 A | 6/1994 | ............ | G06F/15/70 |
| EP | 0655712 A | 5/1995 | ............. | G06T/7/00 |
| EP | 0737940 A | 10/1996 | ........... | G06T/11/00 |
| WO | WO 96/15508 | 5/1996 | | |

OTHER PUBLICATIONS

"A Computational Vision Approach To Image Registration", Q. Zheng et al., IEEE Transactions On Image Processing, U.S., IEEE Inc., New York, vol. 2, No. 3, Jul. 1, 1993, pp. 311–326, XP002003130.

* cited by examiner

*Primary Examiner*—Leo Boudreau
*Assistant Examiner*—Yosef Kassa
(74) *Attorney, Agent, or Firm*—Fitzpatrick, Cella, Harper & Scinto

(57) ABSTRACT

Disclosed are an image synthesis apparatus and an image synthesis method. According to the present invention, an image synthesis apparatus, for synthesizing a plurality of images to generate a synthesis image, selects for an image synthesis unit two or more images from among a plurality of images, and stores image information for the selected images, employs the stored image information to generate coordinate transformation parameters that are used to set a positional relationship for the selected images before these images are synthesized to obtain a single image, changes the generated coordinate transformation parameters by using as a reference a position location for an arbitrary image selected from among the plurality of images, provides the resultant coordinate transformation parameters as image synthesis information, and synthesizes the images in accordance with the image synthesis information. With this arrangement, even when there are many images to be synthesized, the positions of images can be precisely aligned without a large, permanent memory area being required for the storage of image data to be synthesized. Also, the characteristic of a synthesized image can be determined by employing as a reference the characteristic of an arbitrary image selected from among a plurality of images to be synthesized.

76 Claims, 36 Drawing Sheets

| PIXEL VALUE BEFORE CORRECTION | PIXEL VALUE AFTER CORRECTION |
|---|---|
| 0 | 0 |
| 1 | 1 |
| 2 | 2 |
| 3 | 2 |
| 253 | 251 |
| 254 | 252 |
| 255 | 253 |

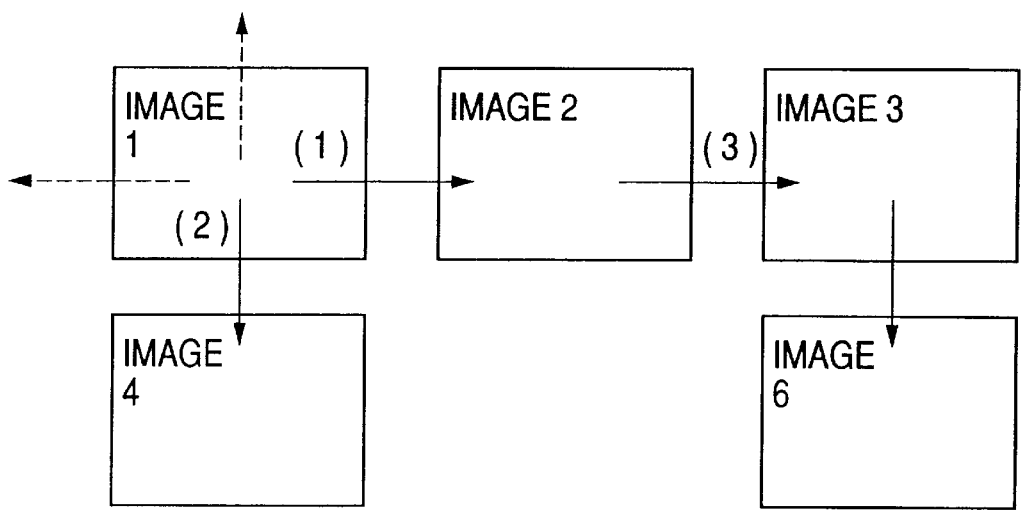

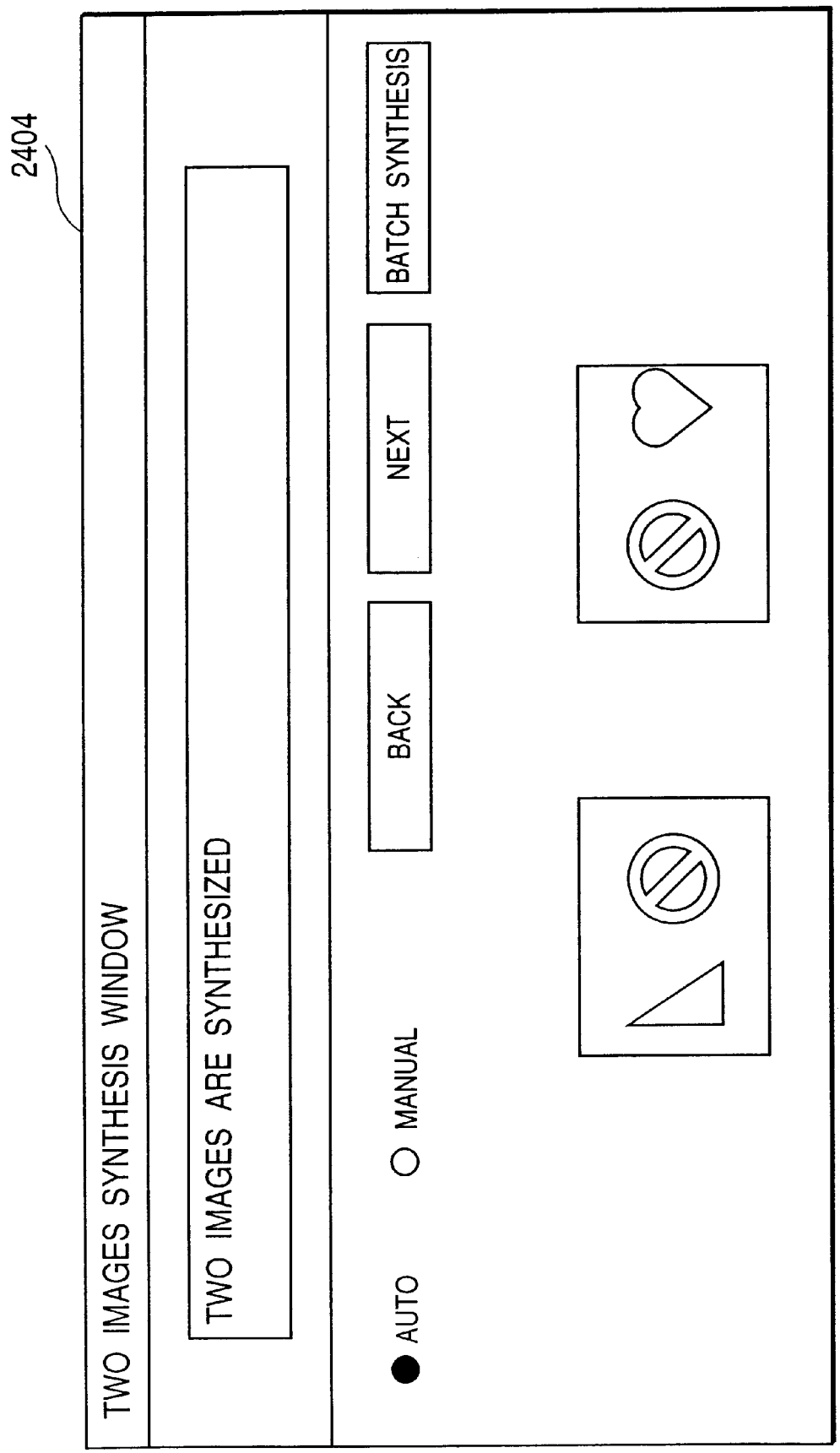

TWO IMAGES SYNTHESIZED RESULT

PLEASE PUSH "NEXT" BUTTON TO SYNTHESIZE NEXT IMAGE. WHEN RETRY, PLEASE PUSH "BACK" BUTTON.

BACK    NEXT    BATCH SYNTHESIS

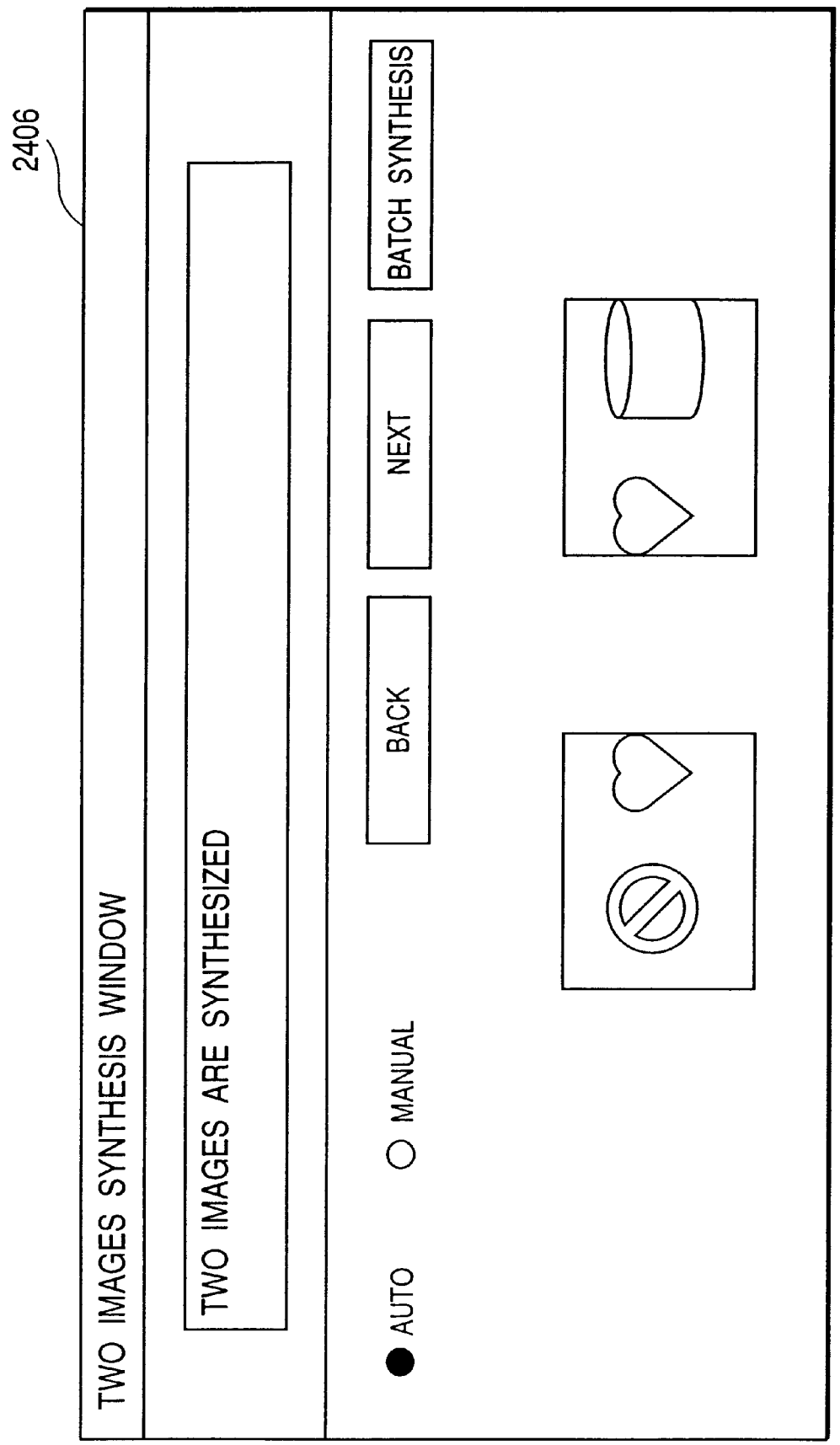

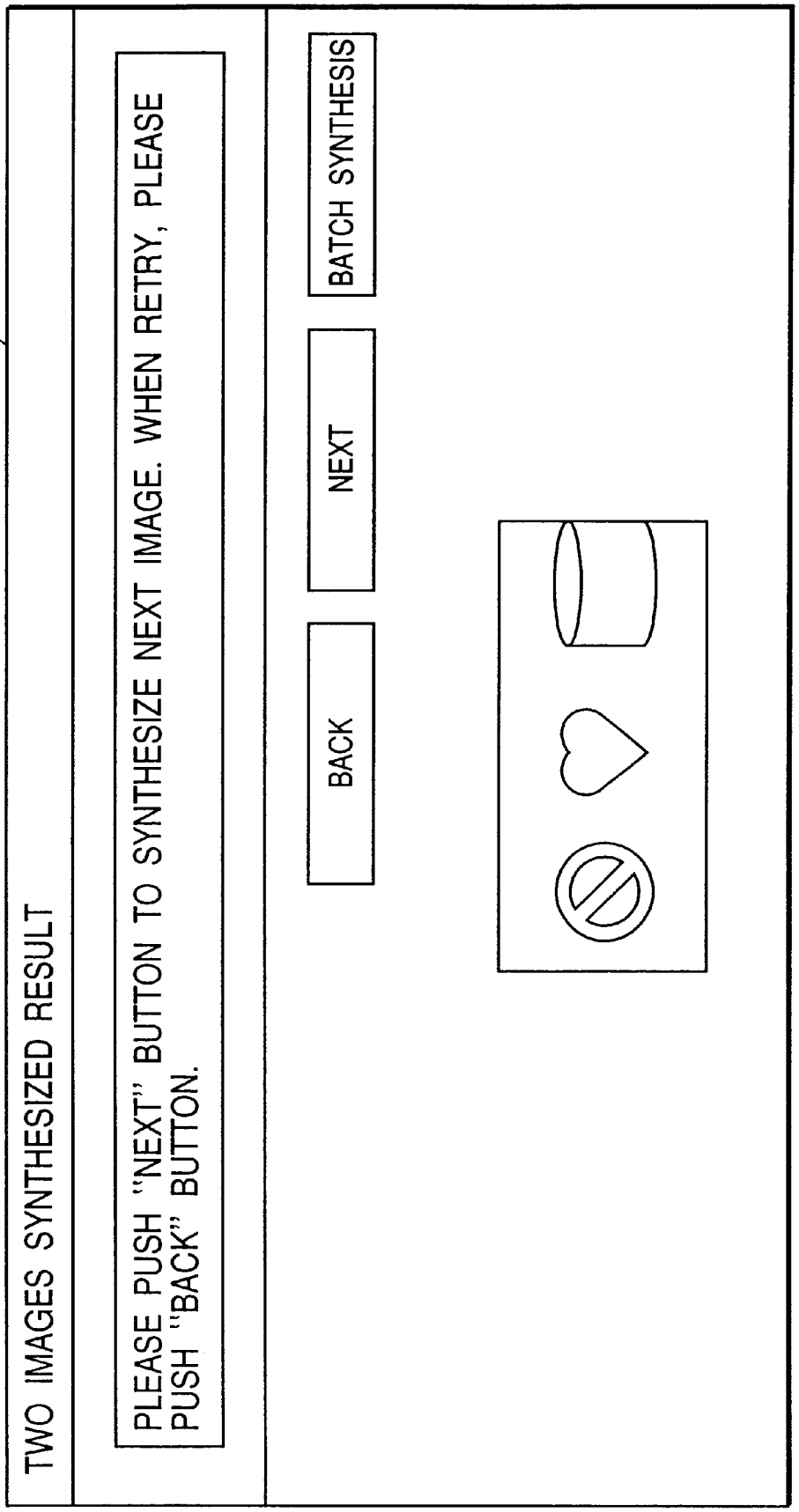

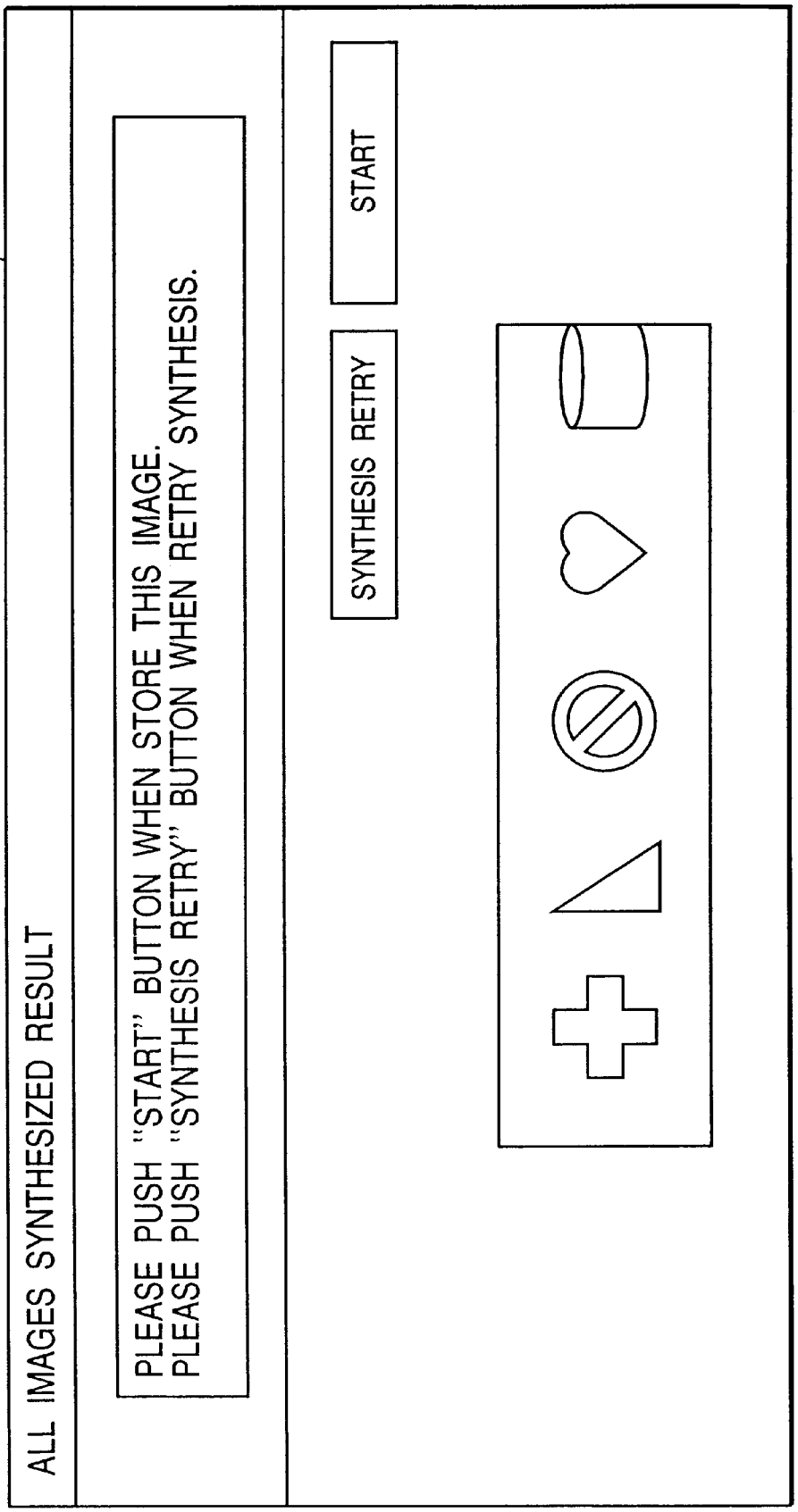

IMAGE SYNTHESIS APPARATUS AND IMAGE SYNTHESIS METHOD

BACKGROUND OF THE INVENTION

1. Field of the Invention

The present invention relates to an image synthesis apparatus and an image synthesis method for synthesizing a plurality of images, obtained by an electronic camera, that have at least some overlapping segments.

2. Related Background Art

Conventionally, a well known image synthesis apparatus of this type generates a panoramic image by synthesizing a plurality of images that partially overlap each other. FIG. 1 is a diagram illustrating a plurality of images that are partially overlapped. Some areas of images 301, 302 and 303 are overlapped. FIG. 2 is a diagram showing synthesis processing for the images in FIG. 1. An image 401 is obtained by synthesizing images 301 and 302.

Conventionally, to provide a panoramic image, a synthesized image is generated as is shown in FIG. 2, and the succeeding image is sequentially added to this image to perform image synthesizing. Therefore, to synthesize the synthesized image 401 and image 303, an overlapping area 401a in the synthesized image 401, for which rotation or a magnification rate is converted, is aligned with an overlapping area 303a in image 303.

However, since compared with an original image, deterioration of a synthesized image for which conversion, such as rotation, has been performed occurs because of changes in the shape of an object or of the transformation of coordinates, and a positioning error may occur that affects the alignment of the image with the next image and prevents a desired panoramic image from being generated.

Since this problem becomes more significant as the number of images to be synthesized is increased, only a very limited number of images can be synthesized when the conventional method is used.

In addition, since synthesized image data must continue to be stored in a memory so that synthesized images can be sequentially generated, a large memory capacity is required.

There is one well known conventional image synthesis method for synthesizing a plurality of images that are obtained by photographing segments of one part of a subject and then generating a panoramic or elaborate image, whereby when synthesizing the images rotation, correction of magnification rates and coordinate translation are performed for each of the images, and the joints of adjacent images are matched.

This image synthesis method will be specifically described while referring to FIGS. 3 to 7. FIGS. 3 to 7 are diagrams for explaining the image synthesis processing performed when using the conventional image synthesis method.

As is shown in FIG. 3, to synthesize three images A, B and C, first, image A and image B are synthesized to obtain a synthesized image Sa, which is then synthesized with image C to obtain a synthesized image Sb, the final result of the synthesis of images A, B and C. In other words, images A, B and C are connected one by one in order to obtain a single synthesized image.

Furthermore, to synthesize images A and B, first, as is shown in FIG. 4, images A, B and C are displayed in the arranged order. Then, as is shown in FIG. 5, images A and B are synthesized and the synthesized image Sa is displayed. The overlapping portions of images A and B are so displayed that the portions of the two images at the overlap can be identified. As is shown in FIG. 6, image C is thereafter synthesized with the obtained image Sa and the synthesized image Sb is displayed. Similarly, the portions of images B and C that overlap are so displayed that the two images at the overlapping portion are separately discernible.

And in addition, when as is shown in FIG. 7 images A, B and C overlap each other, an overlapping portion 2201 of the three images is so displayed that again the portions of images A, B and C that overlap can be separately discerned.

According to the above conventional method, however, since images are synthesized in order when repeating the process employed for linking the images, a synthesized image obtained during at each processing step must be stored in memory, and thus, until such time as a final synthesized image is acquired, a large memory capacity is required.

In addition, when the synthesis result (synthesized image Sa) obtained for images A and B does not provide a satisfactory image when synthesization of the three images has finally been completed synthesized (synthesized image Sb), the synthesis process for images A and B must be repeated. And then, since the newly obtained synthesized image will differ from the previously obtained synthesized image Sa, image C must be synthesized with the newly synthesized image Sa. Thus, a great amount of labor is required when the processing is repeated to obtain a desired synthesized image.

Furthermore, as is described above, when images A, B and C overlap each other, the overlapping portion 2201 of the three images is so displayed that the portions of images A, B and C at the overlap are separately discernible. Therefore, it is hard to accurately evaluate a portion at which three or more images overlap, and it is difficult to determine whether a desired synthesis result can be obtained.

SUMMARY OF THE INVENTION

It is, therefore, one objective of the present invention to provide an image synthesis apparatus and an image synthesis method for resolving the above described problems.

It is another objective of the present invention to provide an image synthesis apparatus and an image synthesis method for precisely performing the positioning of images, even when there are many images to be synthesized.

To achieve the above objectives, according to one aspect of the present invention, an image synthesis apparatus, for synthesizing a plurality of images in order to generate a synthesized image, comprises:

a storage unit for selecting from a plurality of images, as an image synthesis unit, two or more images, and for storing image information for the selected images;

a coordinate transformation parameter generation unit for employing the image information stored in the storage unit to generate coordinate transformation parameters that are used to establish a positional relationship for the selected images before the selected images are synthesized to obtain a single image;

an image synthesis information generation unit for changing the coordinate transformation parameters, which are generated by the coordinate transformation parameter generation unit, by using as a reference the position of an arbitrary image of the plurality of images, and for furnishing the resultant coordinate transformation parameters as image synthesis information; and an image synthesis processing unit for synthesizing the plurality of images in accordance with the image synthesis information generated by the image synthesis information generation unit.

It is an additional objective of the present invention to provide an image synthesis apparatus and an image synthesis method for determining the characteristic of a synthesized image by employing as a reference the characteristic of an arbitrary image selected from a plurality of images to be synthesized.

To achieve this additional objective, according to another aspect of the present invention, an image synthesis apparatus, for synthesizing a plurality of images to generate a synthesized image, comprises:

a storage unit for selecting from a plurality of images, as an image synthesis unit, two or more images and for storing image information for the selected images;

an adjustment information generation unit for employing the image information stored in the storage unit to adjust the characteristics of the selected images before synthesizing the selected images and obtaining a single image;

an image synthesis information generation unit for changing the adjustment information, which is generated by the adjustment information generation unit, by using as a reference the characteristic of an arbitrary image selected from the plurality of images, and for providing the resultant adjustment information as image synthesis information; and an image synthesis processing unit for synthesizing the plurality of images in accordance with the image synthesis information generated by the image synthesis information generation unit.

It is a further objective of the present invention to provide a simple and inexpensive image synthesis apparatus that does not need to constantly store image data to be synthesized that occupies a large memory area and that does not require a large memory capacity to store the image data to be synthesized, and an image synthesis method therefore.

To achieve this further objective, according to an additional aspect of the present invention, an image synthesis apparatus, for generating a synthesized image by synthesizing a plurality of images, each of which share an overlapping portion with at least one other of those images, comprises:

an arrangement destination unit for designating an arrangement for the plurality of images;

a parameter generation unit for employing the arrangement for the plurality of images designated by the arrangement designation unit to select from the plurality of images, as an image synthesis unit, two or more images lying adjacent to each other, and for generating parameters that are used to establish, for each of the selected images, a positional relationship for matching the overlapping portions of the selected images; and an image synthesis processing unit for synthesizing the plurality of images in accordance with the parameters generated by the parameter generation unit.

Other objectives and features of the present invention will become apparent during the course of the detailed explanation of the preferred embodiments that is given while referring to the following drawings.

BRIEF DESCRIPTION OF THE DRAWINGS

FIG. 21 is a diagram showing the procedures used for positioning two images;

FIG. 22 is a diagram showing a processing list;

FIGS. 41A and 41B are diagrams illustrating the state shifting performed in the window for explaining the batch synthesis function of the image synthesis apparatus in FIG. 27;

FIGS. 42A and 42B are diagrams illustrating the state shifting performed in the window for explaining the batch synthesis function of the image synthesis apparatus in FIG. 27; and FIGS. 43A and 43B are diagrams illustrating the state shifting performed in the window for explaining the batch synthesis function of the image synthesis apparatus in FIG. 27.

DETAILED DESCRIPTION OF THE PREFERRED EMBODIMENTS

The preferred embodiments of an image synthesis apparatus and an image synthesis method according to the present invention will now be described.

First Embodiment

Figure 8:
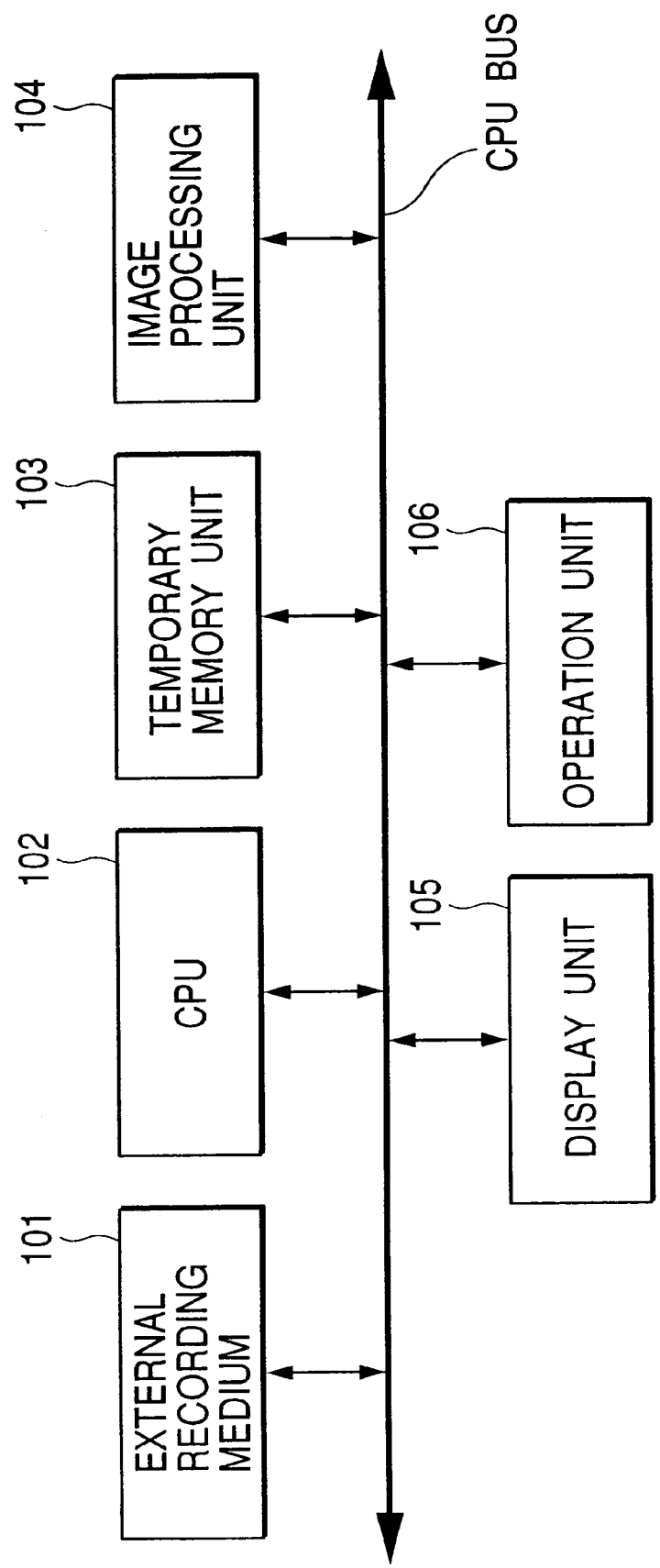
FIG. 8 is a block diagram illustrating the arrangement of an image synthesis apparatus according to a first embodiment of the present invention.

FIG. 8 is a block diagram illustrating the arrangement of an image synthesis apparatus according to a first embodiment of the present invention. In FIG. 8, a plurality of images that partially overlap each other are recorded on an external recording medium 101.

A CPU 102 reads the images from the external recording medium 101 and performs image synthesis processing which will be described later. A temporary memory unit 103 is used to temporarily store the images that are read. An image processing unit 104 synthesizes the images stored in the temporary memory unit 103 to generate a panoramic image.

A display unit 105 displays a synthesized image, a graphic user interface (GUI), etc. An operating unit 106 includes a button and a mouse. These individual sections are connected to a CPU bus along which they can exchange data and control signals.

The image synthesis apparatus reads images from the external recording medium 101, and stores in the temporary memory unit 103 only two images for which positions are to be aligned.

Figure 9A:
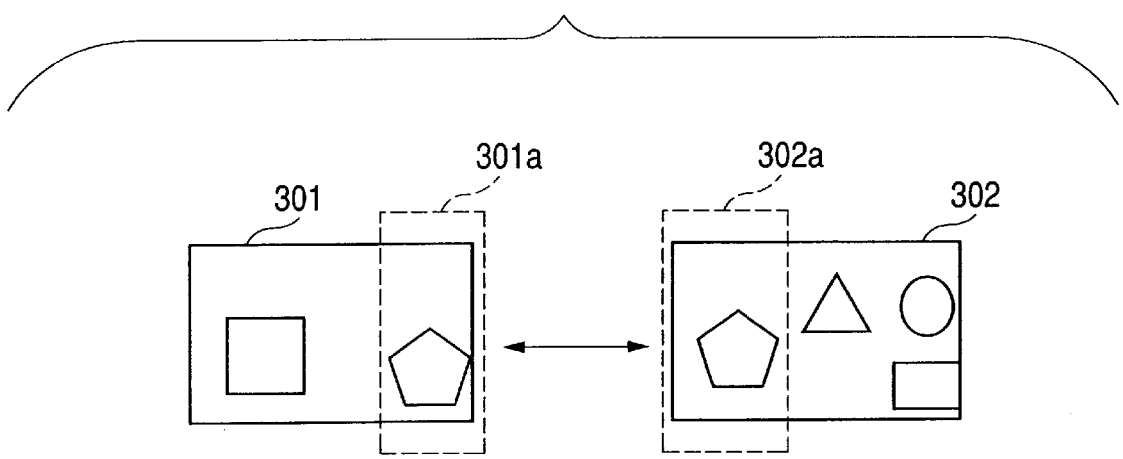
FIGS. 9A and 9B are diagrams showing position alignment processing.
Figure 9B:
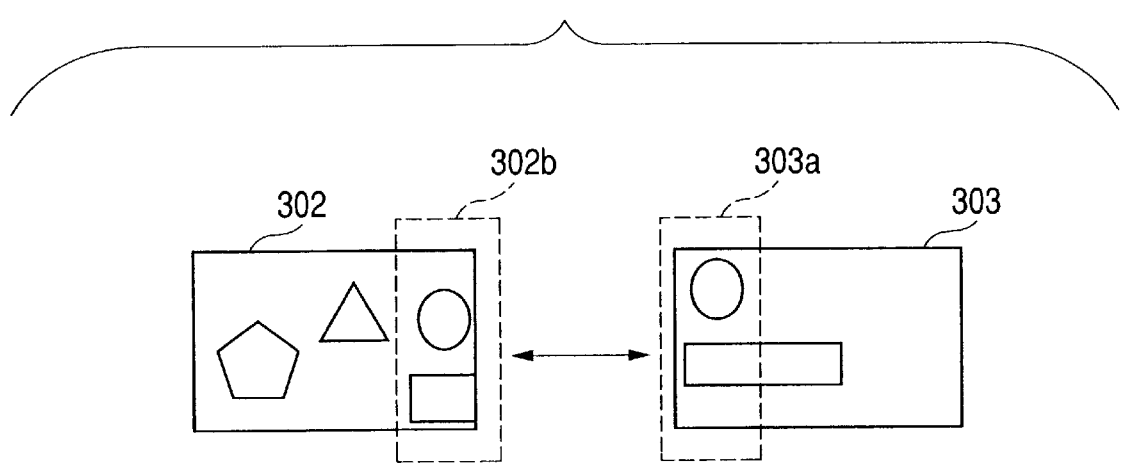

FIGS. 9A and 9B are diagrams showing the position alignment processing. To synthesize a plurality of images 301, 302 and 303, the original image is employed during a corresponding point detection process performed for the positioning.

In FIG. 9A the corresponding point detection process is performed using overlapping portions 301a and 302a in order to align the positions of images 301 and 302. Similarly in FIG. 9B the corresponding point detection process is performed using overlapping portions 302b and 303a in order to align the positions of images 302 and 303. Since in either case the original image is employed instead of a synthesized image, the corresponding point detection process can be precisely performed.

Figure 10:
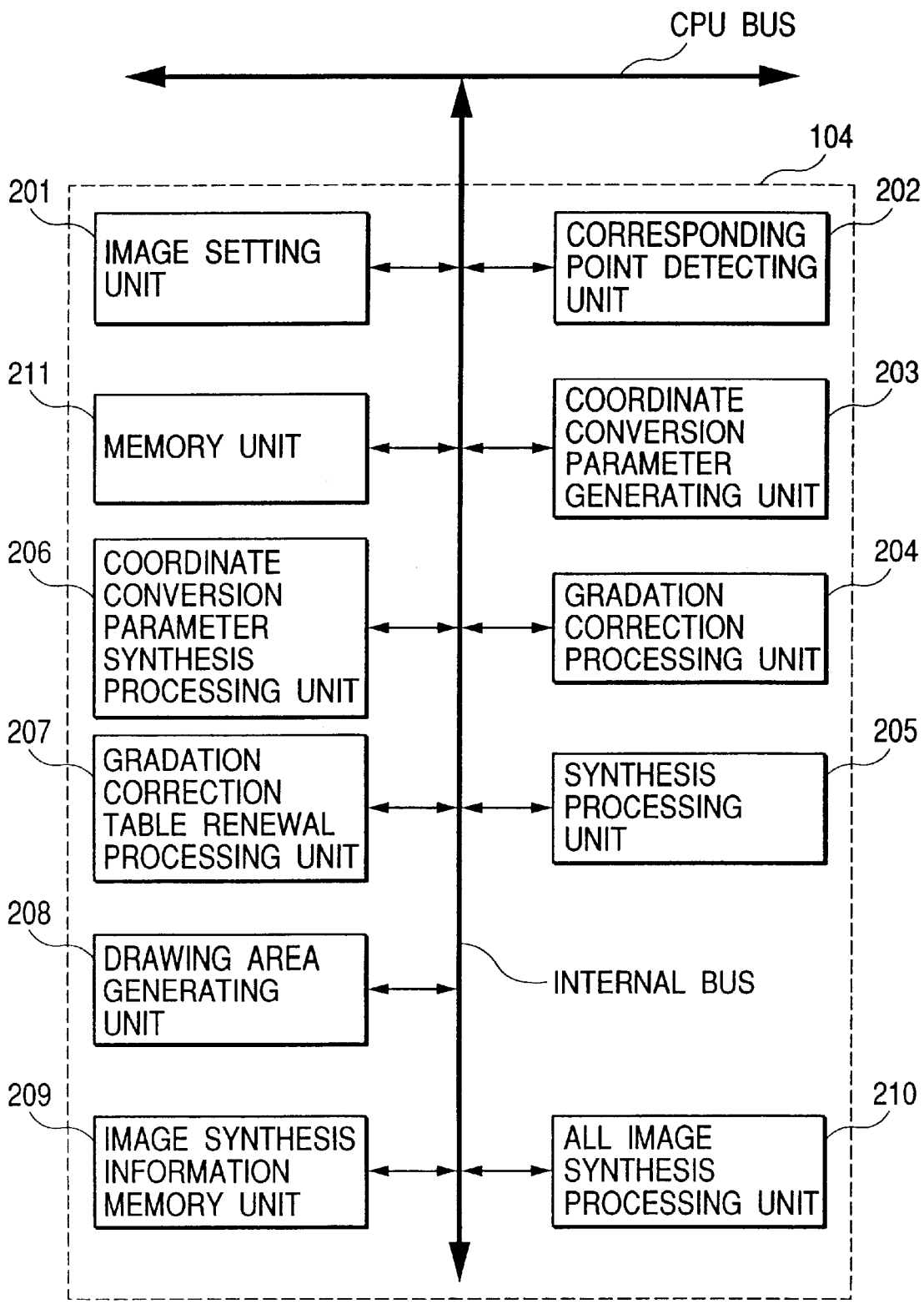
FIG. 10 is a block diagram illustrating the arrangement of an image processing unit in FIG. 8.

FIG. 10 is a block diagram illustrating the arrangement of an image processing unit 104. In FIG. 10, an image setting unit 201 sets two images for a plurality of images for which the corresponding point detection process is to be performed. A corresponding point detecting unit 202 extracts the locations of corresponding points in the area in which the two images overlap, as is shown in FIGS. 9A and 9B.

A coordinate transformation parameter generating unit 203 generates coordinate transformation parameters for the two images. A gradation correction processing unit 204 generates a correction coefficient to match the gradations of the two images, and prepares a gradation correction table.

A synthesis processing unit 205 synthesizes the two images that are set, and outputs the synthesis result to the display unit 105. A coordinate transformation parameter synthesis processing unit 206 sets a reference image for a plurality of images, and converts coordinate transformation parameters for the other images based on the reference image. A gradation correction table renewal processing unit 207 updates a gradation correction table based on the reference image.

A drawing area generating unit 208 sets a drawing area for the finally obtained synthesized image. An image synthesis information memory unit 209 is used to store information required for generating a final synthesized image. An all image synthesis processing unit 210 generates a final synthesized image using all the images employed for synthesis and all the image synthesis information. All of these individual sections are connected to an internal bus along which they exchange data and control signals.

An explanation will now be given for the image synthesis processing performed by the thus arranged image synthesis apparatus. The image setting unit 201 employs a plurality of images stored in the temporary memory unit 103 to determine an image arrangement and two images for which the corresponding point detection unit 202 detects corresponding points.

Figure 11:
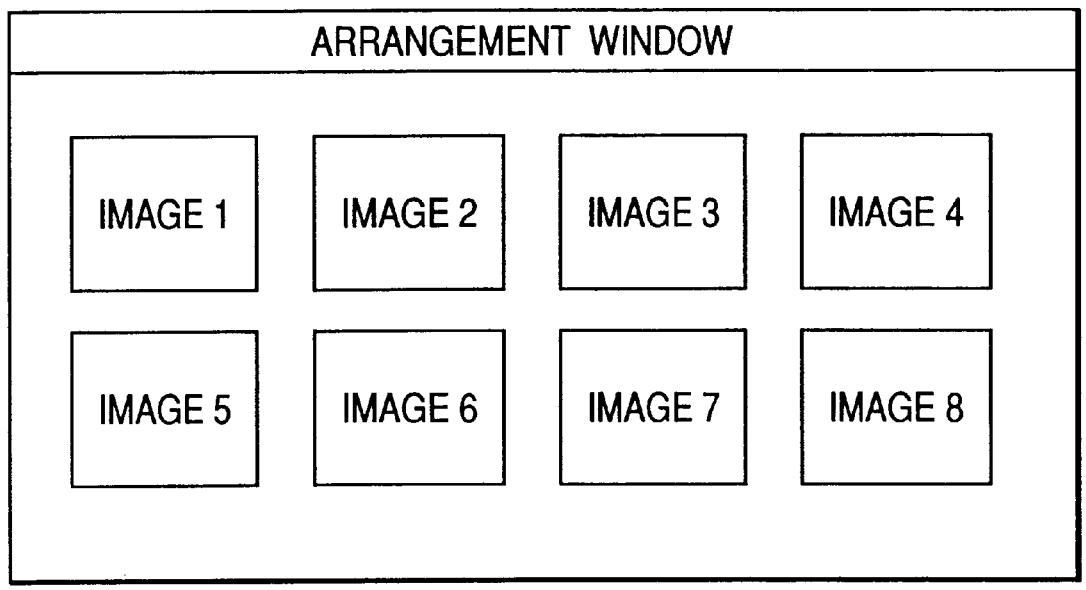
FIG. 11 is a diagram showing an arrangement window for a plurality of images.

FIG. 11 is a diagram showing an arrangement window for a plurality of images. When the arrangement window is displayed on the display unit 105 and the positional information is employed for the images arranged in the window, the positional relationship for the images can be set. It should be noted that amount of memory that is required can be reduced by using thumb-nail images in the arrangement window.

Figure 12:
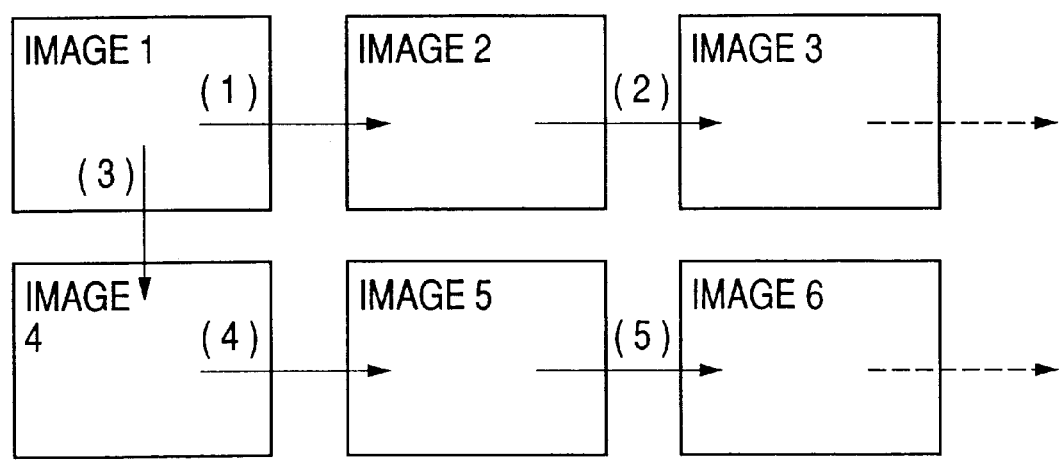
FIG. 12 is a diagram showing the procedures for synthesizing a plurality of images arranged in the arrangement window.

FIG. 12 is a diagram showing the synthesis processing for a plurality of images arranged in an arrangement window. The image setting unit 201 initiates the processing by employing as a reference an image at the upper left corner of the arrangement window (image 1 in FIG. 12).

First, whether there is an image to the right of image 1 to use as a reference is determined (arrow path (1)). When there is an image on the right side, an image 2 is selected. When the synthesis processing for images 1 and 2 has been completed, a search is made to determine whether to the right of image 2 there is an image to use as a reference (arrow path (2)), and an image 3 is selected.

Continuing, a search is performed for an image to the right of image 3. In FIG. 12, however, since there is no image to the right of image 3 (an arrow indicated by a broken line), the search returns to the image at the left end of the same row in which is image 3, i.e., to image 1. A search is made below image 1 for an image to use as a reference (arrow path (4)), and an image 4 is selected. The same process is repeated and two images are set for of a plurality of images.

The image setting unit 201 loads to the temporary memory unit 103 only the two images selected from the external recording medium 101, and performs the following processing. When image synthesis information is stored in the image synthesis information memory unit 209, the two images are abandoned by the temporary memory unit 103.

When the corresponding point detecting unit 202 employs small images to perform the corresponding point detection process, the image setting unit 201 reduces the sizes of the two images that have been set. Furthermore, when of the RGB color information only a G signal is employed to perform the corresponding point detection process, the image setting unit 201 extracts a G signal from a color image. In addition, when an edge image is employed for the corresponding point detection process, the image setting unit 201 extracts edge information from an image.

In this manner, the two images set by the image setting unit 201 are transmitted to the corresponding point detecting unit 202, which thereafter detects the corresponding point information for the two images.

Figure 13:
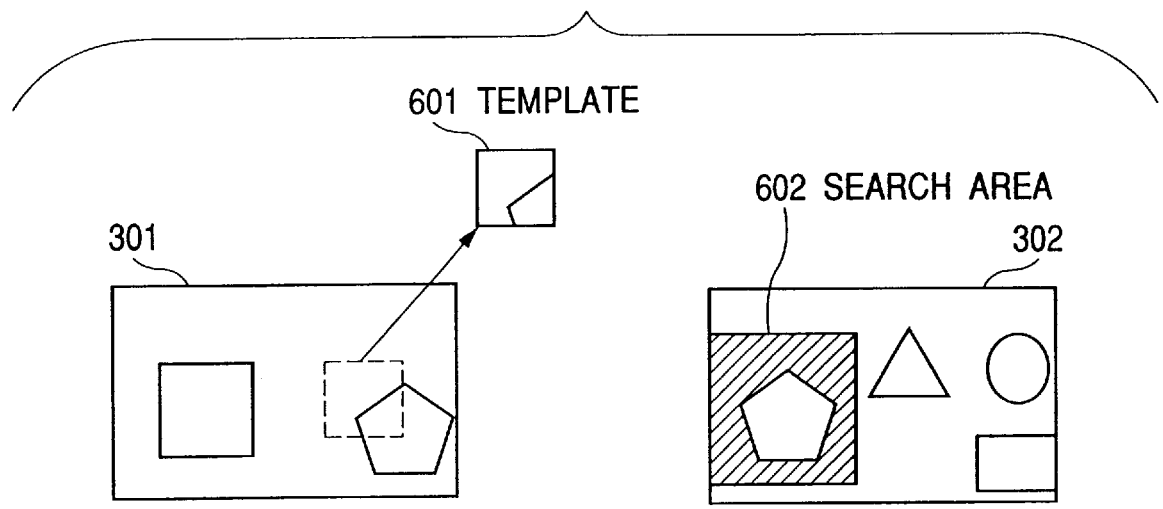
FIG. 13 is a diagram showing the processing used for detecting corresponding point information.

FIG. 13 is a diagram showing the processing for detecting corresponding point information. Images 301 and 302 are the two that were set by the image setting unit 201.

In this embodiment, images 301 and 302 are employed; however, images that vertically and horizontally constitute half of images 301 and 302 may be employed. In this case, the corresponding point detection process can be performed at high speed. And the speed and the precision of the detection of corresponding points can be further increased by using edge images.

A template matching method is employed as the method for detecting corresponding point information. According to the template matching method, as is shown in FIG. 13 one image segment is cut off image 301 to serve as a template 601. While the template 601 is being shifted inside a search area in the other image 302, at each position an absolute value is calculated for a difference between a pixel in the template 601 and a corresponding pixel in the search area 602, and the sum of the absolute values is evaluated.

Corresponding points in the template 601 are acquired as positions at which the minimum sum for the absolute values of the differences is obtained. The corresponding point detecting unit 202 employs at least two of these templates to detect corresponding point information in the images.

To synthesize two images, The coordinate transformation parameter generating unit 203 calculates coordinate transformation parameters. In this embodiment, affine transformation is employed as one example coordinate transformation. Assuming coordinates (x, y) are located on image 301 and coordinates (x', y') are located on image 302, using parameters A, B, C and D, the affine transformation performed for images 301 and 302 can be represented by equations (1) and (2):

$$x'=Ax+By+C \quad (1)$$

$$y'=Bx+Ay+D \quad (2).$$

The coordinate transformation parameter generating unit 203 acquires the parameters A, B, C and D based on the corresponding point information that is obtained by the corresponding point detecting unit 202. Since there are four parameters, corresponding point information for two points are substituted into equations (1) and (2) to resolve the simultaneous equations, so that the parameters A, B, C and D can be obtained. When corresponding point information for more than three points is acquired, the parameters can be obtained using the least square method.

Figure 14:
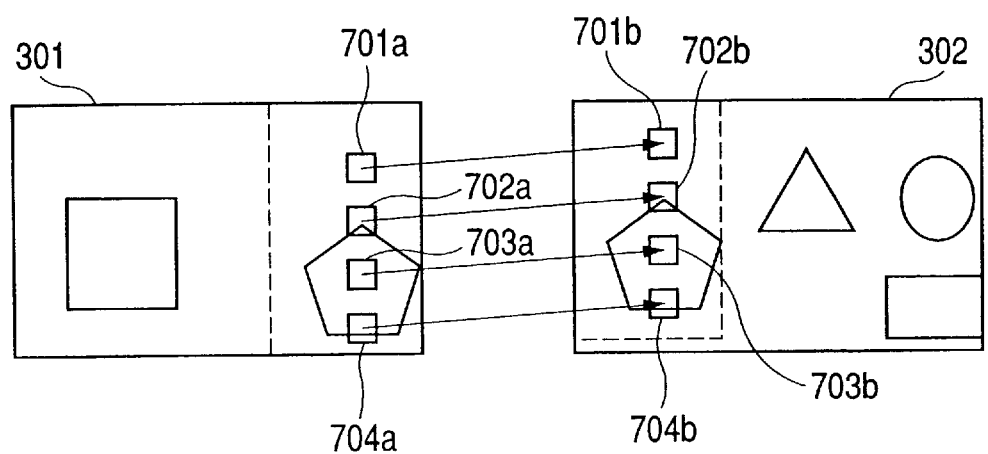
FIG. 14 is a diagram showing gradation correction processing.

The gradation correction processing unit 204 performs gradation correction processing to perform gradation matching for the two images. FIG. 14 is a diagram showing the gradation correction processing.

During the gradation correction processing, the corresponding points in images 301 and 302 are calculated using equations (1) and (2), and sample data are acquired. That is, a point that corresponds to sample data 701 in FIG. 14 is calculated using equations (1) and (2), and sample data 701*b* that correspond to the sample data 701*a* are generated for image 302. The sample data may be a pixel value at a specific point, or they may be the average of the pixel values in an arbitrary area, for which a specific point is designated as the center point, calculated while taking into account known coordinate transformation parameters errors.

Figures 15, 16:
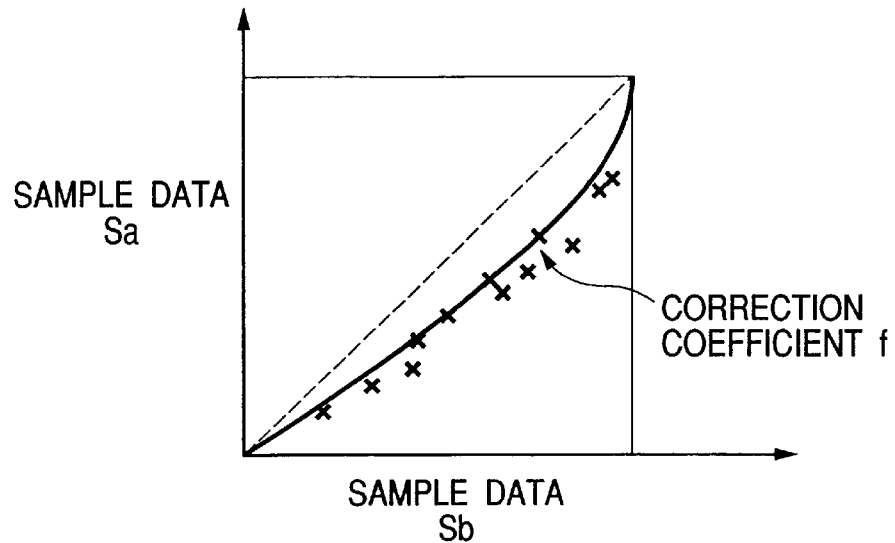
FIG. 15 is a graph showing a correction coefficient.
FIG. 16 is a diagram showing a gradation correction table.

FIG. 15 is a graph showing a correction coefficient. Sample data sets 701*a* to 704*a* and 701*b* to 704*b* in FIG. 14 are generated and are plotted as is shown in FIG. 15 (x points in FIG. 15). The pixel values for the sample data are generated based on the gradation correction table that is held for each image. Therefore, sample data Sa for image 301 and sample data Sb for image 302 are calculated using equations (3) and (4) in which the original pixel value is represented by i:

$$Sa=Ka\,[i] \quad (3)$$

$$Sb=Kb\,[i] \quad (4).$$

Ka and Kb denote values in the gradation correction tables for images 301 and 302.

The plotted data are employed to generate a correction coefficient f that is used to match the gradations of image 302 with those of image 301. Based on the plotted data, the correction coefficient f can be obtained using the least square method.

The gradation correction processing unit 204 employs the obtained correction coefficient f to prepare a gradation correction table. For an RGB color image, the correction coefficient f that is obtained for an individual color is fR, fG or fB. In the gradation correction table, the values are generated as data R[256], G[256] or B[256], each of which values are represented by 8-bit data.

As for an R signal, the gradation correction table is prepared in the following manner:

$$R[i]=fR(i)\,(i=0\text{ to }255) \quad (5).$$

FIG. 16 is a diagram showing a gradation correction table. Pixel values before correction are entered in the left column, and pixel values after correction, which are generated using equation (5), are entered in the right column. The gradation correction processing unit 204 performs the above described processing to prepare the gradation correction table.

It should be noted that at this time the gradation correction table is only temporary. Only when the synthesis result has been determined to be adequate is the gradation correction table stored in correlation with the images. When the synthesis result is determined to be inadequate, the gradation correction table is abandoned and the processing is retried.

Figure 17:
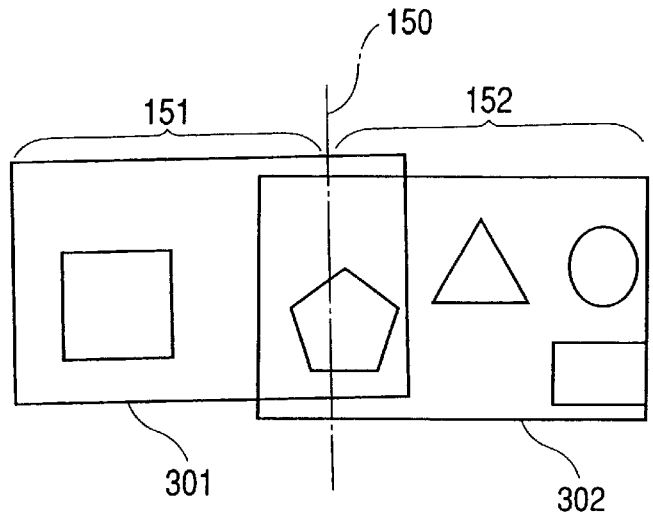
FIG. 17 is a diagram showing synthesis processing.

The synthesis processing unit 205 synthesizes the two images 301 and 302 using the coordinate transformation parameters and the gradation correction table. FIG. 17 is a diagram showing the synthesis processing. In accordance with the coordinates that employ as a reference the left upper corner of image 301, the pixel value at coordinates (i, j) in the synthesized image G is generated from images 301 and 302.

With a centerline 150 in the overlapping areas of images 301 and 302 being as a joint, the pixel value for image 301 is used for the area to the left of the center 150, and the pixel value for image 302 is used for the area to the right.

Since image 301 is used as a reference, an area 151 is represented by G(i, j)=Ta(i, j), in which Ta is employed to represent the pixel value for image 301. In accordance with equations (1) and (2), and by employing a pixel value that is obtained by using the gradation correction table to convert the pixel value Tb for image 302, an area 152 is represented by G(i, j)=K(Tb(i', j')).

It should be noted that i'=A·i+B·j+C and j'=−B·i+A·j+D, and that K( ) denotes a value in the gradation correction table.

For a color image, the generation of a pixel value for a synthesized value is performed for each of the RGB colors. The coordinates and the gradations of image 302 are changed by employing image 301 as a reference, and a synthesized image is generated. The obtained synthesized image is written in the memory unit 211 and is output to the display unit 105.

The synthesized image is displayed by the display unit 103, and at the same time a confirmation button is displayed on the display unit 105. When a user determines that the synthesized image is adequate, the user uses the confirmation button to transmit a signal to that effect to the image processing unit 104 via the operating unit 106.

When notification information to the effect that the synthesized image is inadequate is received from the operating unit 106, the two images on the display unit 105 are erased, and the image information in the memory unit 211 is erased. When the image processing unit 104 receives from the operating unit 106 notification information to the effect that the synthesized image is adequate, the coordinate transformation parameter synthesis processing unit 206 initiates the synthesis processing for the coordinate transformation parameters.

Figure 18:
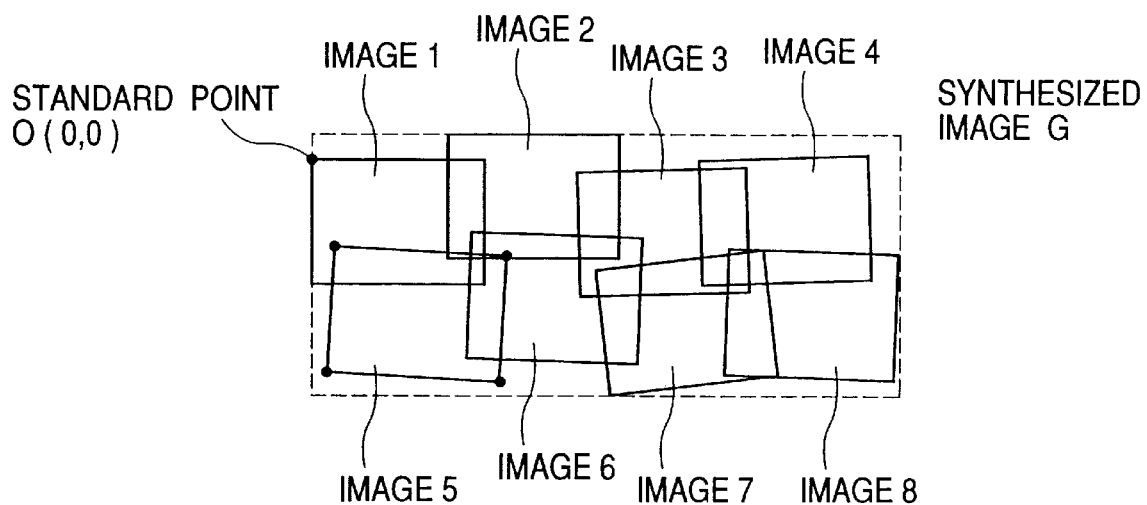
FIG. 18 is a diagram showing coordinate transformation parameter synthesis processing.

FIG. 18 is a diagram showing coordinate transformation parameter synthesis processing. In FIG. 18, eight images are to be synthesized. Assume that the upper left corner of an image 1 is the reference point O(0, 0).

When the synthesis result obtained for the two images by the image synthesis processing unit 205 is determined to be adequate, the coordinate transformation parameter synthesis processing unit 206 converts a parameter that is obtained by the coordinate transformation parameter generating unit 203 into a coordinate transformation parameter that is based on the reference point O.

The coordinate points are detected and the coordinate transformation parameters are generated for images 2 and 3. However, since the parameters for image 3 are those that are generated while image 2 is employed as a reference, the coordinate transformation parameter synthesis processing unit 206 changes these parameters to those for which point O for image 1 is employed as a reference. This process is performed once for all the images except image 1.

The gradation correction table renewal processing unit 207 updates the gradation correction table for image 3 based on the gradation correction table that is obtained by the gradation correction processing unit 204. That is, a data area is acquired for storing for image 3 the gradation correction table obtained by the gradation correction processing unit 204, and the table data are written to the data area. When information to the effect that the synthesis result for images 2 and 3 is adequate is not transmitted via the operating unit 106, the gradation correction table updating process is not performed.

When the gradation correction table has been updated, the drawing area generating unit 208 sets a drawing area for each final synthesized image.

For the drawing area for the synthesized image G for image 5, inverse conversion is performed for synthesis parameters $A_5$, $B_5$, $C_5$ and $D_5$ obtained by the coordinate transformation parameter synthesis processing unit 206, and the parameters $A'_5$, $B'_5$, $C'_5$ and $D'_5$ that are obtained are employed to calculate coordinates in the synthesized image for the original four corners of image 5 using equations (6) and (7):

$$x = A'_5 x' + B'_5 y' + C'_5 \qquad (6)$$

$$y = -B'_5 x' + A'_5 y' + D'_5 \qquad (7).$$

(x', y') represents the coordinates for each of the original four corners, and (x, y) represents the corresponding coordinates for the synthesized image G.

Figure 19:
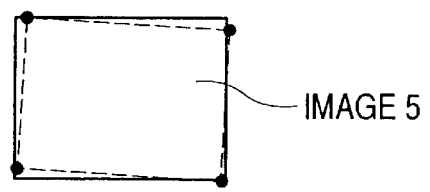
FIG. 19 is a diagram showing a drawing area for a synthesized image G.

FIG. 19 is a diagram showing a drawing area for the synthesized image G. The drawing area for the synthesized image G is set as the minimum rectangular area for enclosing the four corners after conversion.

The synthesis parameters, obtained by the coordinate transformation parameter synthesis processing unit 206, and the gradation correction table and drawing area data, obtained by the gradation correction table renewal processing unit 207, are stored with the image information in the image synthesis information memory unit 209.

The information stored in the image synthesis information memory unit 209 includes (1) image identification information (e.g., a file name), (2) a coordinate transformation parameter relative to the reference point O, (3) gradation correction tables for RGB colors, (4) a drawing area for a synthesized area, and (5) a check flag.

The image processing unit 104 does not constantly store, in the temporary memory unit 103, n images or images that are being sequentially synthesized, but instead stores, therein, only the image synthesis information. When the image synthesis information has been set, the check flag is set to a value of "1" so that the information will be stored for each image.

In accordance with the paths shown in FIG. 12, the image setting unit 201 selects image 1–image 2, image 2–image 3, image 1–image 4, image 4–image 5 and image 5–image 6, and performs the above described processing series. Basically, only two images are required for this process, and when the image setting unit 201 reads from the external recording medium 101 only the two images required for the corresponding point detection, the amount of memory that is required can be reduced.

When the above processing is completed for images 5 and 6 and the image synthesis information for image 6 is stored in the image synthesis information memory unit 209, the coordinate transformation parameters for all the images are converted into those that are based on the reference point O of the image 1, and the gradation correction table is set so that the gradations are matched with those for image 1. Furthermore, a drawing area is set for each image.

The all image synthesis processing unit 210 employs the information in the image synthesis information memory unit 209 and the images stored in the temporary memory unit 103 to generate the synthesized image G for all the images. Once the drawing areas for the individual images have been acquired as is shown in FIG. 12, images 1 to 8 are sequentially read from the memory unit 211 and the pixel values in the drawing areas for the images are written. The writing of the images is performed in accordance with the synthesized coordinate transformation parameter and the gradation table.

In addition, since images are written in order beginning with image 1, when image 1 has been written in the drawing area, the information stored in the temporary memory unit 103 for image 1 is abandoned. Since the same process is performed for images 2 to 8, only sufficient memory for storing eight images need be provided for the temporary memory unit 103.

Since essentially only the original images are employed to generate information for synthesis processing, the load imposed on the processing is unchanged, regardless of how many images are employed. In addition, since the position detection is performed based on the original images, the precision is not deteriorated due to an increase in the number of images.

Second Embodiment

Figure 20:
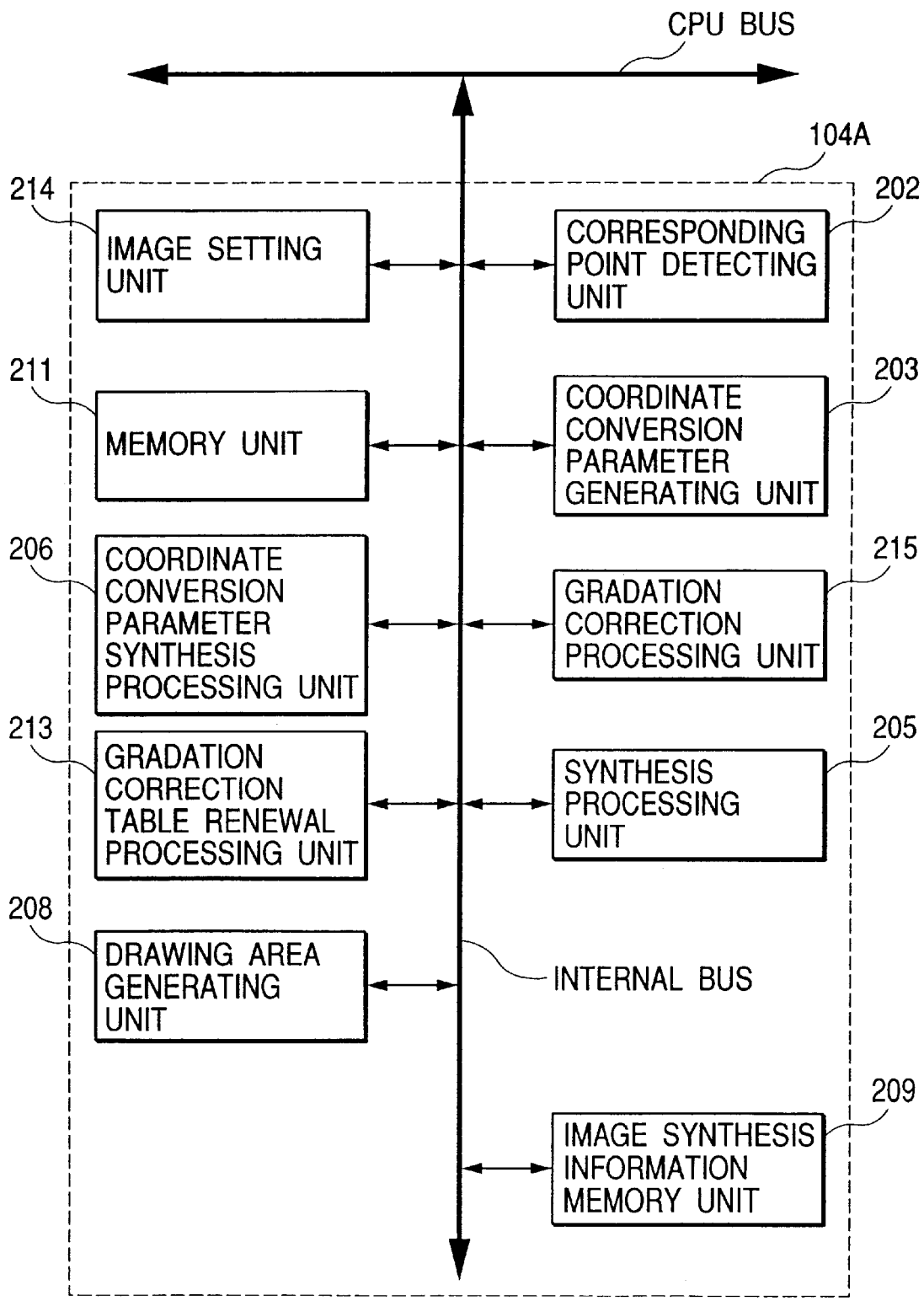
FIG. 20 is a block diagram illustrating the arrangement of an image processing unit for an image synthesis apparatus according to a second embodiment of the present invention.

FIG. 20 is a block diagram illustrating the arrangement of an image processing unit for an image synthesis apparatus according to a second embodiment of the present invention. Except for the image processing unit, the individual sections are the same as those for the first embodiment.

The same references as are used in FIG. 10 are also used to denote corresponding components in an image processing unit 104A in FIG. 20, and no explanation for them will be given. The specific features of the image synthesis apparatus in the second embodiment includes an image setting unit 214, a gradation correction processing unit 215, and a gradation correction table renewal processing unit 213.

FIG. 21 is a diagram for the setting procedures employed for two images. The image setting unit 214 sets two images using procedures that differ from those in the first embodiment. Specifically, using image 1 at the upper left corner as a reference, peripheral images to the left and to the right, and above and below are searched for in order. When an image is found, the image is set as in the conventional manner, and is output to a corresponding point detecting unit 202. In FIG. 21, image 1–image 2 (arrow path (1)) is set. Then, the search is continued using image 1 as a reference, and image 4, below image 1 (arrow path (2)) is set. Processing is then initiated for images 1 and 2.

In addition, the image setting unit 214 prepares a process list in accordance with the performance order for the processes. FIG. 22 is a diagram showing the process list. Beginning with image 1, image information is added to a process list 900 in the order in which the images were used for the process.

When a search for images has been made to the right and to the left, and above and below image 1, and the processing has been completed for images that were found, images 1, 2 and 4 are entered in the process list 900. Then, using the second image 2 in the process list 900 as a reference, the search and the processing is performed in order to the left and to the right, and above and below. Although image 1 is located to the left of image 2, as a pair of images 1 and 2 has already been processed, image 1 is skipped. Whether or not the image should be skipped is determined by examining the check flag to determine whether it holds a value of 1 (already processed) or a value of 0 (unprocessed).

Since unprocessed image 3 is present to the right of image 2, image 2–image 3 is set and the succeeding process is performed. When the process for which image 2 is used as a reference has been performed, the processing is moved to the third entry in the process list 900, and the search and the process is performed while using image 4 as a reference. The above described processing is repeated to obtain the image synthesis information.

When this search method is employed, the synthesis information can be efficiently set and all images can be processed, regardless of how complicated the arrangement of the plurality of images is.

The processing performed by the gradation correction processing unit 215 will now be described. In the first embodiment, the gradation correction for matching the gradations of image 2 with those for image 1 has been explained. In the second embodiment, however, the gradations are corrected for by compounding the gradations of individual images.

Figure 23:
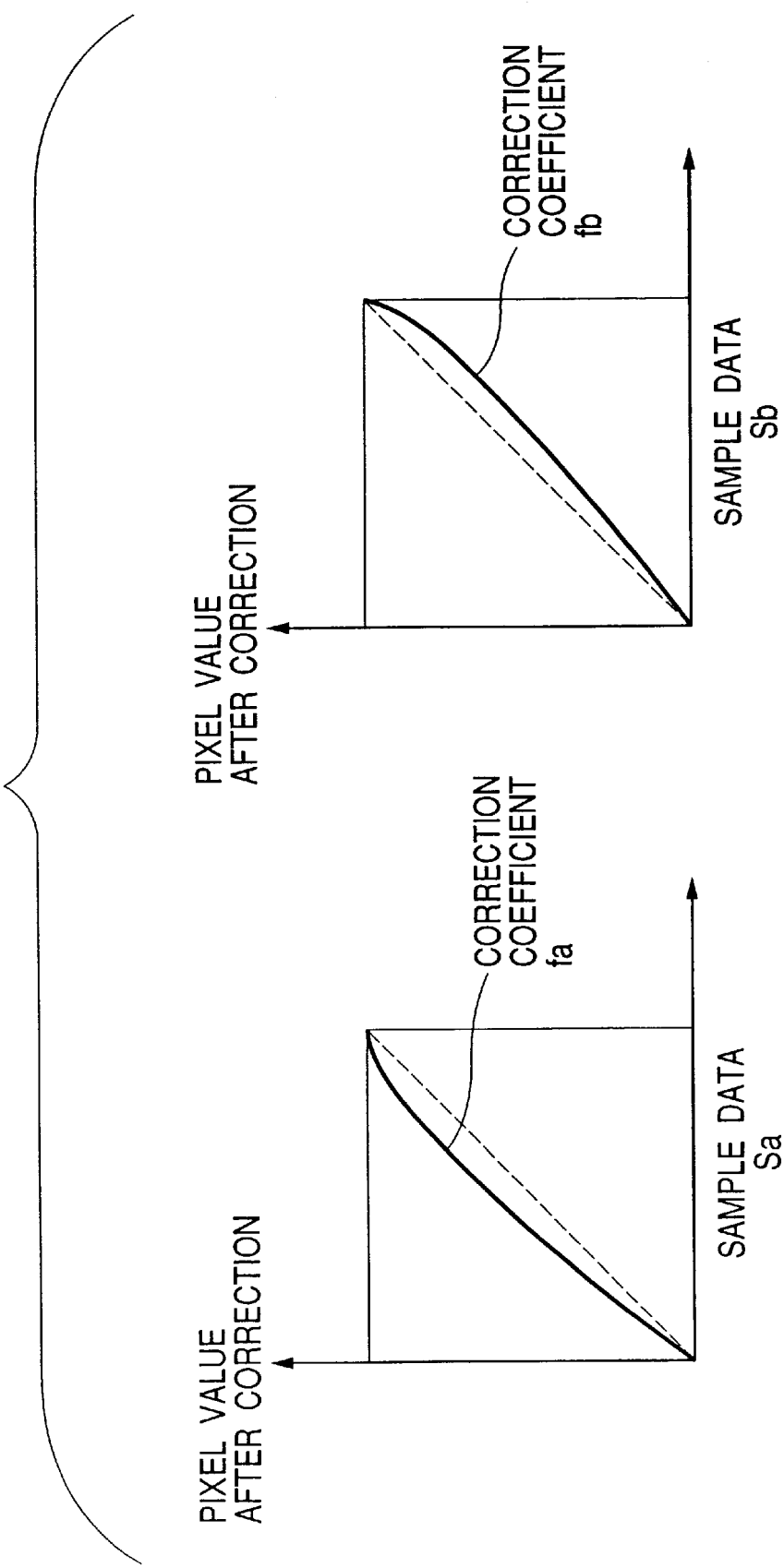
FIG. 23 is a graph showing a correction coefficient.

Sample data are acquired in the same manner as in the first embodiment. FIG. 23 is a graph showing a correction coefficient. Based on individual sampling data, correction coefficients fa and fb are so generated by compounding the gradations of the individual images.

The gradation correction table renewal processing unit 213 generates a correction coefficient by compounding the gradations of the individual images to prepare the gradation correction table. Specifically, when the gradations between images 1 and 2 are corrected to prepare the gradation correction table, and when a gradation correction table is prepared for images 2 and 3 later, converting at the same time the gradation correction table for image 1, which contacts image 2, and the gradation correction table for image 4, which contacts image 1, is indispensable. In the first embodiment, however, this process is not required because only the gradations for an image that is newly linked are converted and corrected for while using image 1 as a reference.

To implement the above described processing, the gradation correction table renewal processing unit 213 accesses the process list 900 via a microcomputer. Since during the gradation correction for images 2 and 3, images 1, 2 and 4 are included in the process list, the correction coefficient is generated for images 2 and 3. After a notification to the effect that the synthesis result of the two images is adequate is received via the operating unit 106, the gradation correction table renewal processing unit 213 updates the gradation correction tables for images 1, 2 and 4.

In the updating process for the gradation correction table, the gradation correction coefficient fb for image 3 is employed to obtain $R_3[i]=fb(i)$ (i=0 to 255). Similarly, for images 1, 2 and 4, $R_1[i]=fa(R_1[i])$, $R_2[i]=fa(R_2[i])$ and $R_4[i]=fa(R_4[i])$ are employed.

When the image synthesis information has been set through the processing series, the synthesis information is added for each image to the header portion of the process list 900 in the image synthesis information memory unit 209.

In this embodiment, the process list 900 is stored by the CPU 102 as a single file format in the recording medium. When a device (not shown) that includes a means for reproducing the format file and the all image synthesis processing unit are employed, a synthesized image can be generated from the recording medium on which information is recorded.

With this recording medium, even if a synthesized image is not recorded, image synthesis can be performed using the synthesis information as needed in order to generate a synthesized image. Furthermore, since the image synthesis device is constituted by the reproduction means and the all image synthesis processing unit, the structure can be simplified and can provide a synthesized image at a low cost.

Third Embodiment

Figure 24:
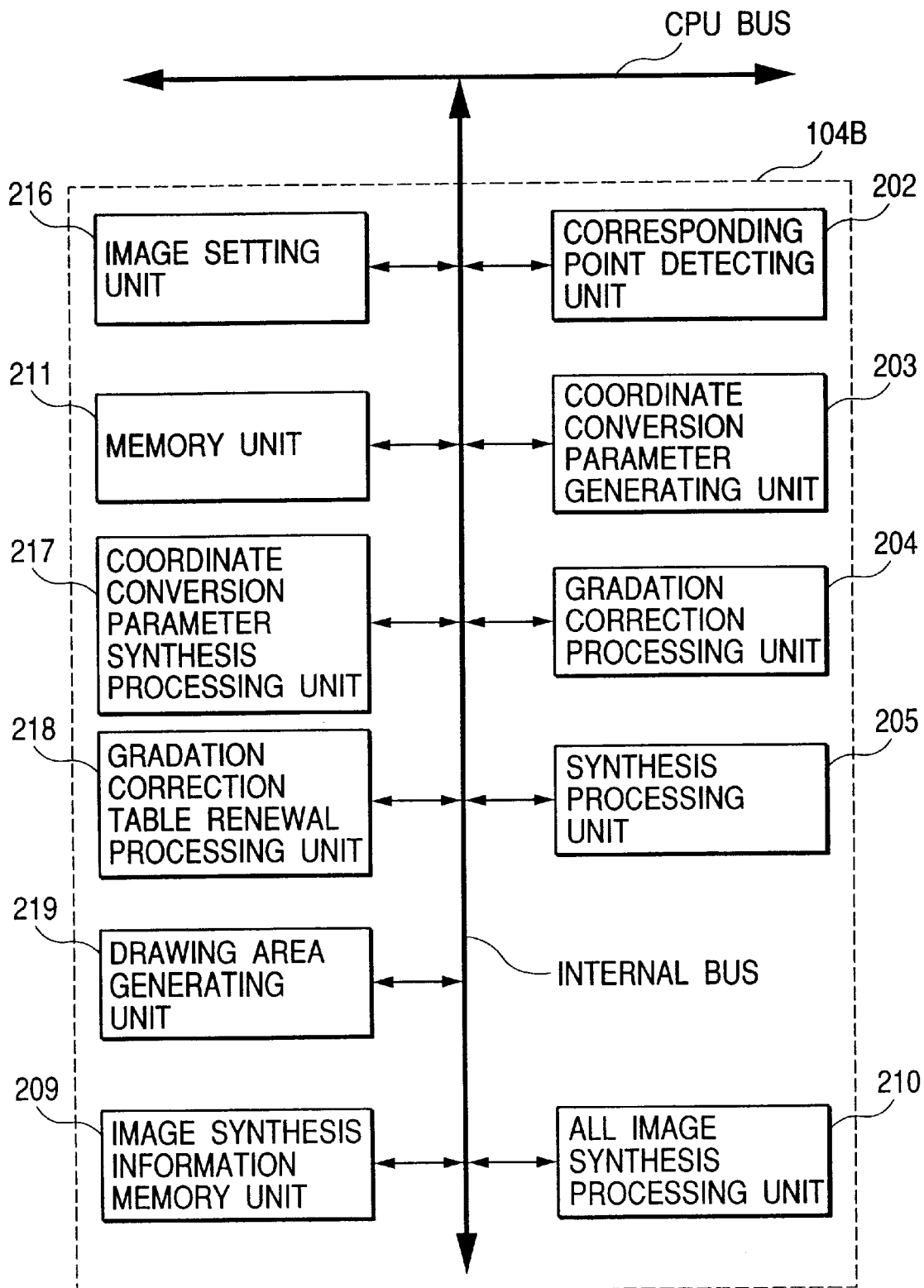
FIG. 24 is a block diagram illustrating the arrangement of an image synthesis unit for an image synthesis apparatus according to a third embodiment of the present invention.

FIG. 24 is a block diagram illustrating the arrangement of an image processing unit for an image synthesis apparatus according to a third embodiment of the present invention. The same references as are used in FIG. 10 are also used to denote corresponding components in an image processing unit 104B in FIG. 24, and no explanation for them will be given.

The image synthesis apparatus according to the third embodiment includes a feature whereby a user is permitted to select a reference image for synthesizing a plurality of images, and whereby the generating of coordinate transformation parameters and gradation corrections for other images are performed based on the user selected reference image.

Figure 25:
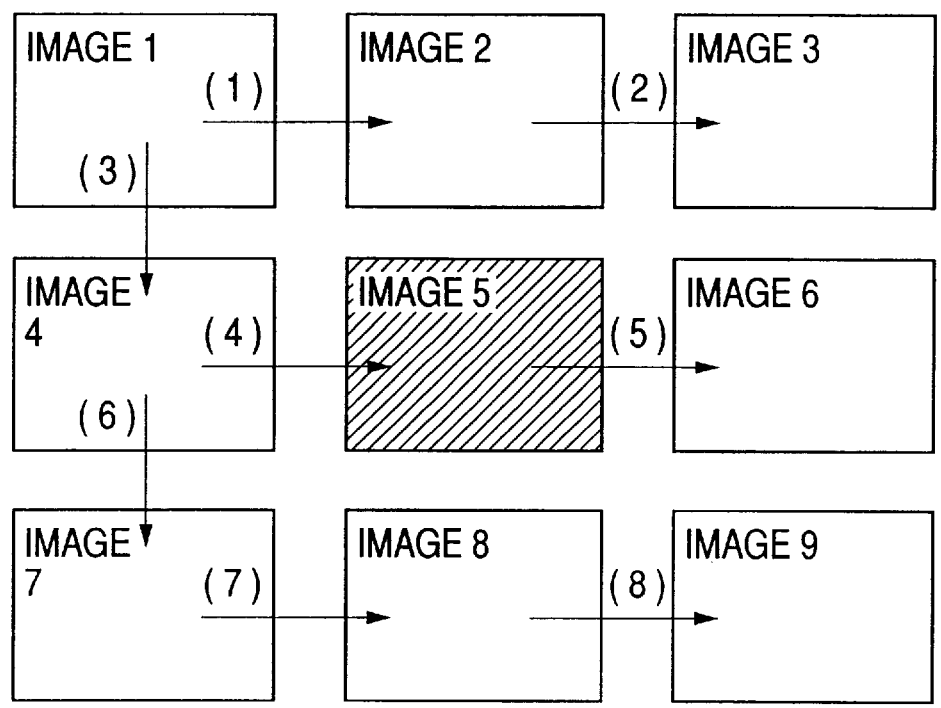
FIG. 25 is a diagram showing the state where a plurality of images have been arranged.

FIG. 25 is a diagram showing an arrangement of a plurality of images. An image setting unit 216 reads a plurality of images from a temporary memory unit 103, and assigns numbers to the thus arranged images beginning with the image at the upper left corner.

When a shaded image 5, for example, is selected via an operating unit 106, the selected image information is set as a reference image. As well as in the first embodiment, two images are sequentially set, and the corresponding point detection process and the succeeding process are performed for these images.

Image pairs used for the corresponding point detection process are, along arrow paths in FIG. 25, (1) image 1–image 2, (2) image 2–image 3, (3) image 1–image 4, (4) image 4–image 5, (5) image 5–image 6, (6) image 4–image 7, (7) image 7–image 8 and (8) image 8–image 9.

In this embodiment, the same processing series as is performed in the first embodiment is performed until the reference image 5 is set. When the reference image 5 is set, the coordinate transformation parameters and the gradation correction tables are changed based on the reference image 5. That is, the coordinate transformation parameters and the gradation correction tables obtained while using image 1 as a reference are held until the process for the arrow path (3) is initiated, and when the process for the arrow path (4), i.e., the process for images 4 and 5, is initiated, the coordinate transformation parameters and the gradation correction tables are converted into those for which image 5 is used as a reference.

When a synthesized image for images 4 and 5 is generated, and when a notification indicating that the synthesis result is adequate is transmitted from the operating unit 106 to the microcomputer, a coordinate transformation parameter synthesis processing unit 217 converts the coordinate transformation parameter for image 4 into that obtained when image 5 is used as a reference. Then, the coordinate transformation parameter for image 1, which contacts image 4, is converted into a value while using image 5 as a reference, and the coordinate transformation parameters for images 2 and 3 are also converted into values which are based on image 5.

A gradation correction table renewal processing unit 218 changes the gradations of images 1 to 4 using a correction coefficient f that is employed to convert the gradations for image 4 into those for image 5. A drawing area generating unit 219 employs the coordinate transformation parameter that is obtained by a coordinate transformation parameter synthesis processing unit 217 to reset drawing areas in the synthesized image for images 1 to 5.

The results of the processing are stored in the image synthesis information memory unit 209. Information for the pair of images 5 and 6 and the succeeding pairs is converted into the information obtained when image 5 was used as a reference, and is then stored. When the image synthesis information for all the images has been set, an all image synthesis processing unit 210 synthesizes all the images in accordance with the synthesis information.

Figure 26:
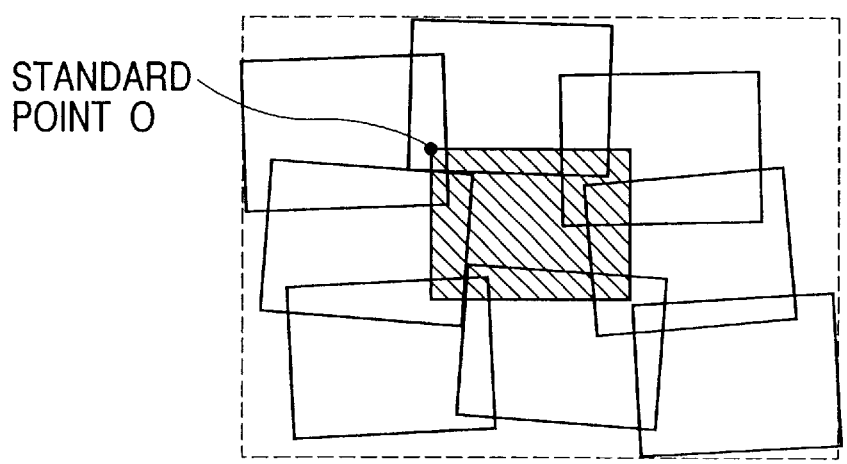
FIG. 26 is a diagram for describing the image synthesis processing.

FIG. 26 is a diagram showing image synthesis processing. Since image synthesis is performed while using an image in the center as the reference, an image can be generated in which distortion is dispersed. When an image which includes the main subject is selected as a reference image, the synthesis result for all the images can be obtained while the gradations existing when the main subject was photographed are maintained.

In the third embodiment, a user selects a reference image. However, a reference image may also be automatically selected in accordance with the arrangement of the images. Since, for example, the arrangement in FIG. 26 consists of a 3×3 images matrix, an image at the vertical and horizontal center position (1, 1) may be automatically determined to be a reference image.

The functions of the image processing unit 104, 104A or 104B in the first, the second or the third embodiment can be stored as a program on a recording medium, such as a floppy disk, and the program can be loaded into a memory unit by using a system or an apparatus, such as a personal computer, and executed as application software. In this case, when the system or the apparatus reads from the recording medium the program, which is represented by software, for accomplishing the present invention, the system or the apparatus can provide the effects of the present invention.

Such a memory medium can be, for example, a ROM, a hard disk, an optical disk, a magneto optical disk, a CD-ROM, a CD-R, a DVD, a magnetic tape, or a nonvolatile memory card.

Fourth Embodiment

A fourth embodiment of the present invention will now be described while referring to the accompanying drawings.

Figure 27:
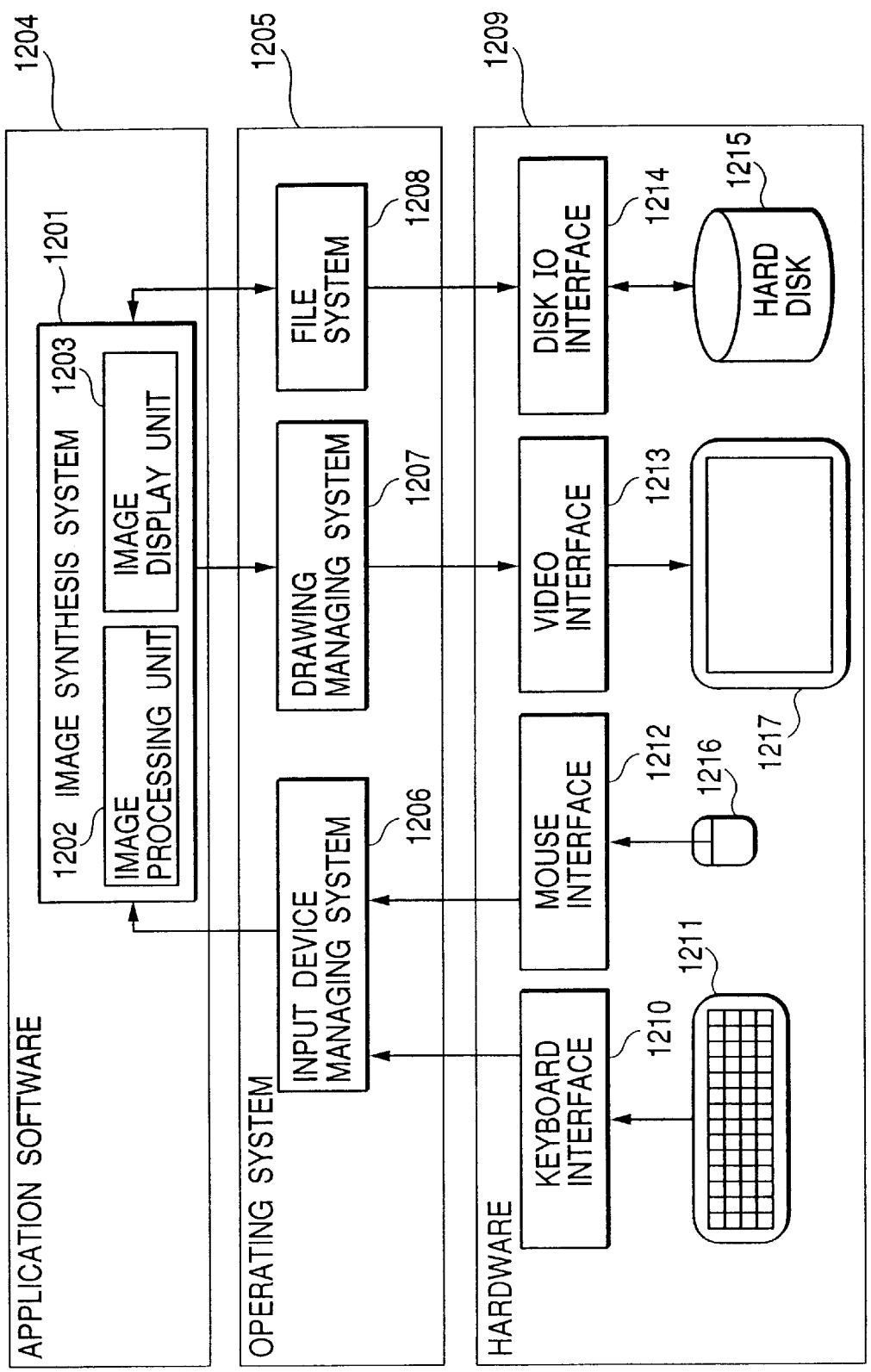
FIG. 27 is a block diagram illustrating the arrangement of an image synthesis apparatus according to a fourth embodiment of the present invention.
Figure 28:
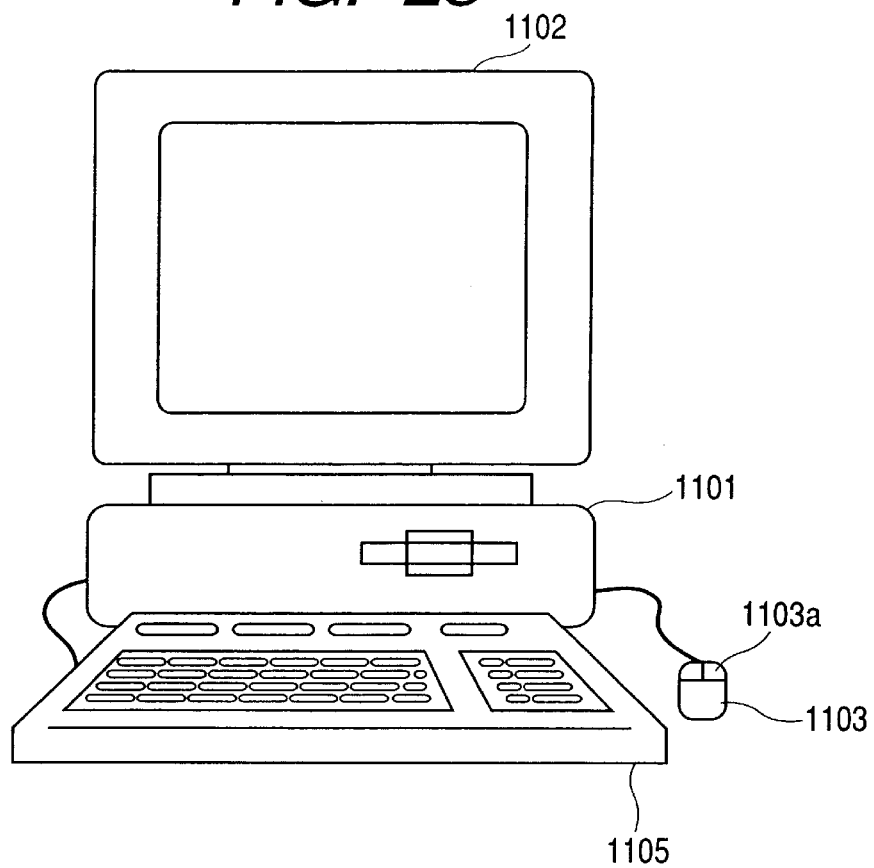
FIG. 28 is a diagram depicting the external appearance of a personal computer that constitutes the image synthesis apparatus in FIG. 27.

FIG. 27 is a block diagram illustrating the arrangement of an image synthesis apparatus according to the fourth embodiment of the present invention. FIG. 28 is a diagram showing the external appearance of a personal computer that constitutes the image synthesis apparatus in FIG. 27.

The personal computer that serves as the image synthesis apparatus of the present invention will now be described while referring to FIG. 28. As is shown in FIG. 28, the personal computer comprises: a computer main body 1101, incorporating a CPU, a ROM, a RAM and an interface for connecting these devices; a display unit 1102, for displaying the processing results obtained by an application program; and a mouse 1103 and a keyboard 1105, with which instructions and data are entered. A mouse button 1103a is provided for the mouse 1103, which with the keyboard 1105 is connected via a cable to the computer main body 1101.

The arrangement of the image synthesis apparatus in this embodiment will now be described while referring to FIG. 27.

As is shown in FIG. 27, the image synthesis apparatus constituted by the personal computer comprises: a hardware unit 1209; an operating system (OS) 1205, to be operated by the hardware unit 1209; and application software 1204, to be operated by the operating system 1205.

The hardware unit 1209 includes a keyboard interface 1210 for connecting a keyboard 1221; a mouse interface 1212 for connecting a mouse 1216; a video interface 1213 for connecting a display device 1217; and a disk IO interface 1214 for connecting a hard disk 1215.

The operating system 1205 includes an input device management system 1206, a drawing management system 1207, and a file system 1208. The input device management system 1206, via the keyboard interface 1210, receives data input at the keyboard 1211, and, via the mouse interface 1212, receives data input with the mouse 1216, and transmits the received data to the application software 1204, as needed. The drawing management system 1207 permits the application software 1204 to execute drawings on the display device 1217 via the video interface 1213 without the application software 1204 being aware of the hardware unit 1209. The file system 1208 permits the hard disk 1215 and the application software 1204 to exchange data via the disk IO interface 1214.

The application software 1204 includes an application program for building an image synthesis system 1201. The image synthesis system 1201 includes an image processing unit 1202 for performing various processes for synthesizing a plurality of images to generate a single synthesized image, and an image display unit 1203 for displaying on the display device 1217 the processing condition and the results that are obtained during the various processes. These units are built by a program that is stored in advance. The image processing unit 1203 performs: a designation process for designating a position for each image in accordance with an instruction entered at the keyboard 1211 or with the mouse 1216; a positional relationship calculation process for extracting, for each image, two mutually adjacent images based on the designated arrangement for the images, and for calculating the positional relationship where the overlapping portions of each two extracted images match; a synthesized image generation process for synthesizing the images in accordance with the obtained positional relationship and for generating a synthesized image; and a positional relationship recalculation process for recalculating the positional relationship for two mutually adjacent images that are designated. It also controls the image display means 1203.

The positional relationship calculation process can be so set that two mutually adjacent images are designated by manipulating the keyboard 1211 or the mouse 1216; the approximate positional relationship is entered for these two images by manipulating the keyboard 1211 or the mouse 1216; and the positional relationship is calculated for the two designated adjacent images by employing the approximate positional relationship.

Furthermore, the positional relationship calculation process can be so set that the positional relationship for two mutually adjacent images is automatically calculated en bloc.

The retry processing for the synthesis of the individual images can be so set that two mutually adjacent images is designated in the image designation process; the positional relationship between the designated images is recalculated by the positional relationship recalculation process; the recalculated positional relationship for the two designated images and the previously obtained positional relationship for the other two adjacent images is employed for the image synthesis generation process to perform image synthesis processing. The positional relationship recalculation process, as well as in the positional relationship calculation process, can be so set that two mutually adjacent images can be designated by manipulating the keyboard 1211 or the mouse 1216; the approximate positional relationship is entered for the two designated images by manipulating the keyboard 1211 or the mouse 1216; and the positional relationship for the two designated adjacent images can be recalculated by employing the approximate positional relationship entered for the designated adjacent images.

The image display unit 1203 is so controlled that it displays only two mutually adjacent images on the display device 1217 when calculating the positional relationship for these images using the positional relationship calculation process. In addition, the image display unit 1203 is so controlled that it displays on the display device 1217 a synthesized image obtained in accordance with the positional relationship existing between the two adjacent images that is acquired by the positional relationship calculation process. To display a synthesized image of the two adjacent images, in the display the two images must overlap each other, and the overlapping portion must be transparent.

Figure 29:
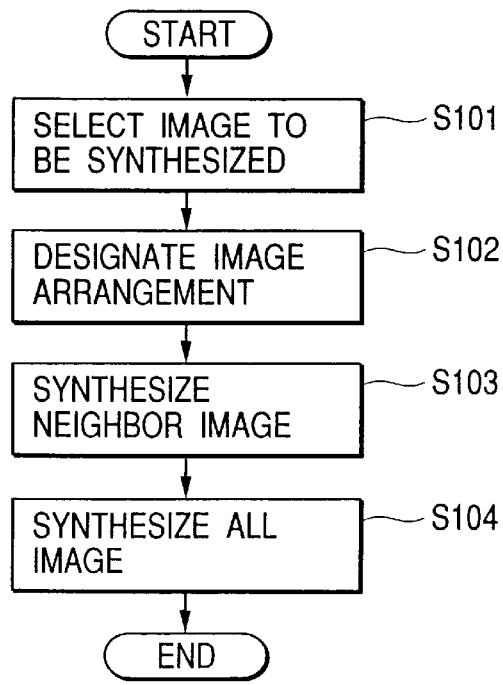
FIG. 29 is a flowchart showing image synthesis processing performed by the image synthesis apparatus in FIG. 27.
Figure 30:
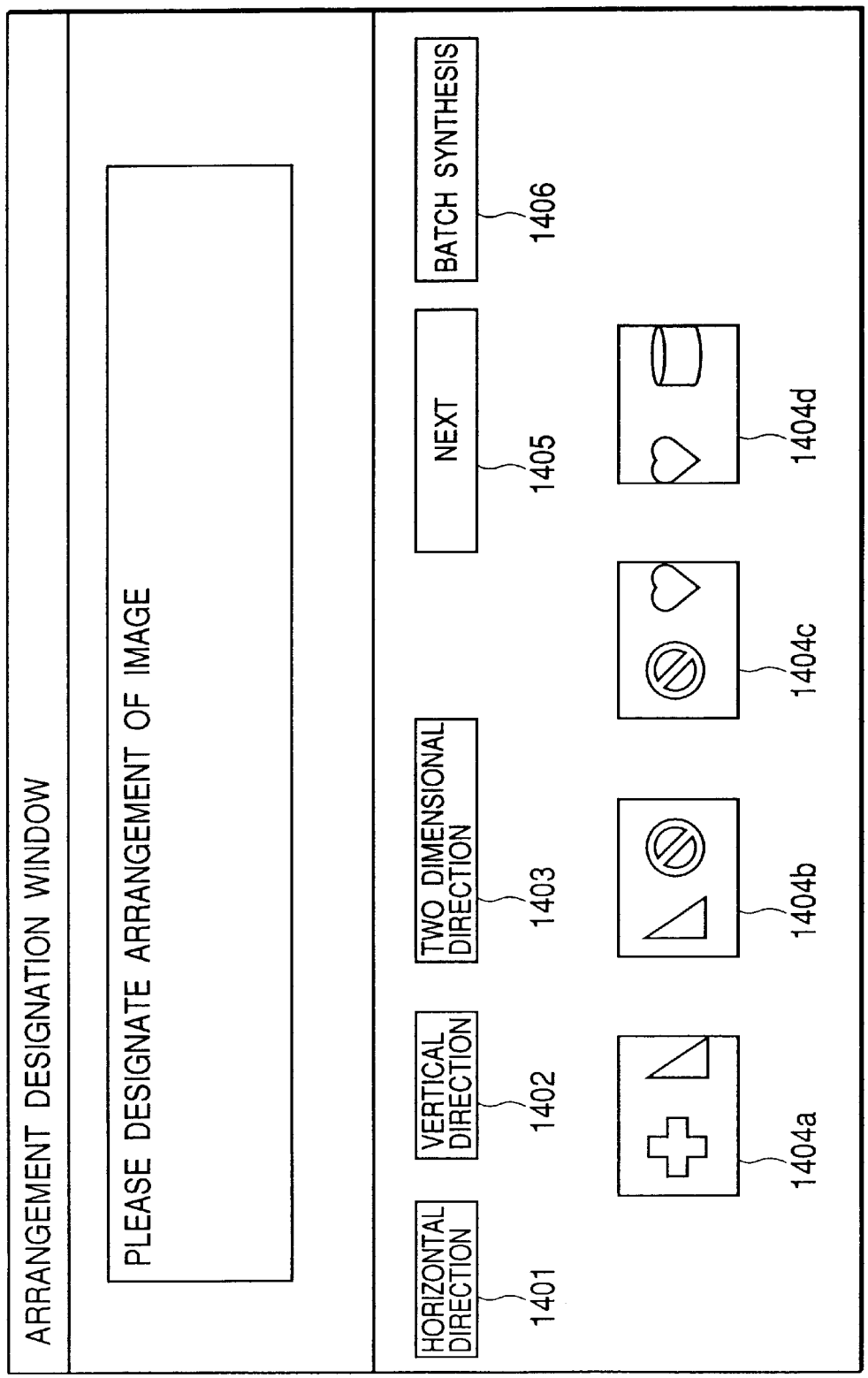
FIG. 30 is a diagram showing an example image arrangement designation window at step S102 in FIG. 29.
Figure 34:
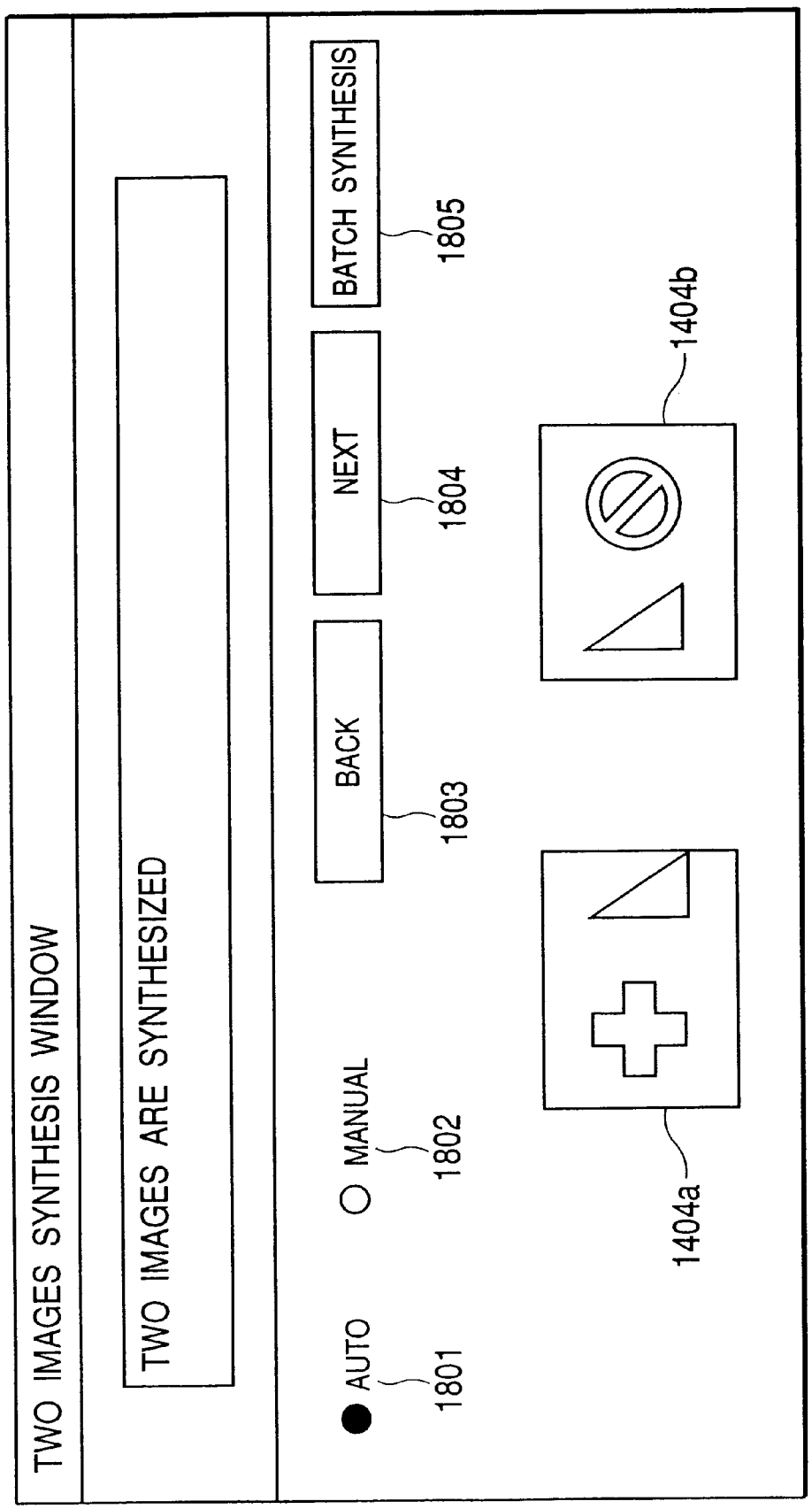
FIG. 34 is a diagram showing an example two image synthesis window at step S103 in FIG. 29.
Figure 35:
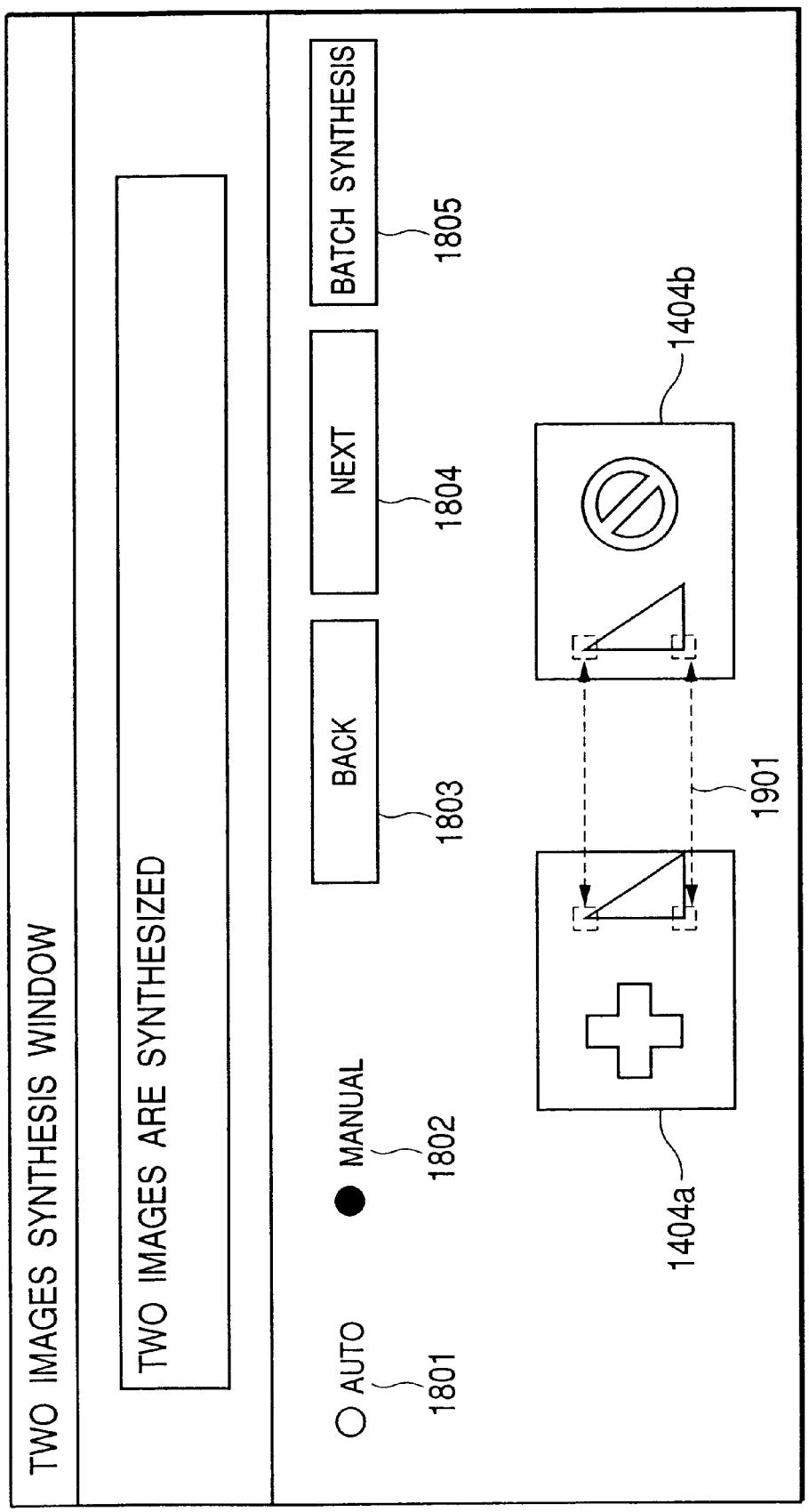
FIG. 35 is a diagram showing another example two image synthesis window at step S103 in FIG. 29.
Figure 36:
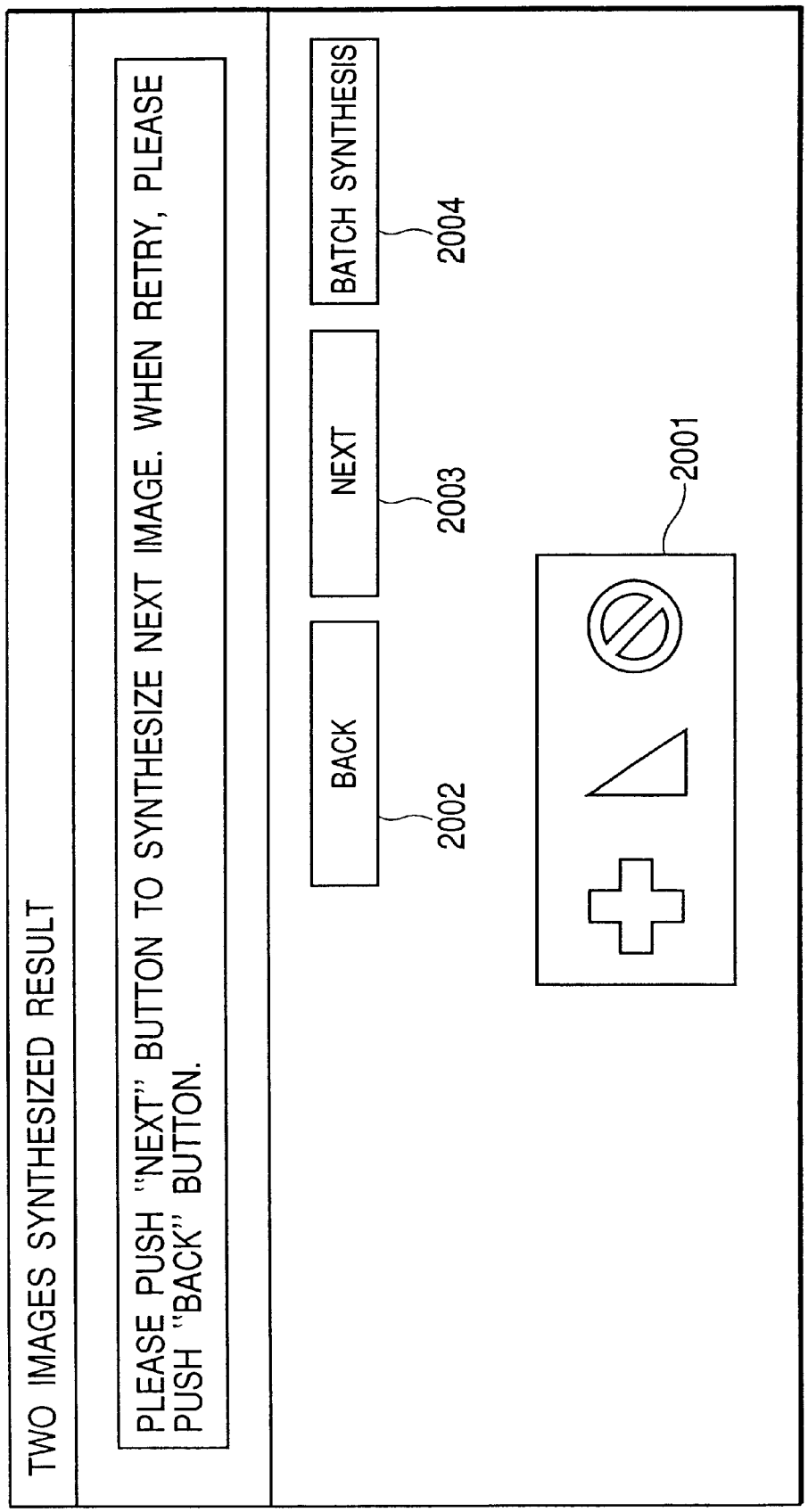
FIG. 36 is a diagram showing an additional example two image synthesis window at step S103 in FIG. 29.
Figure 37:
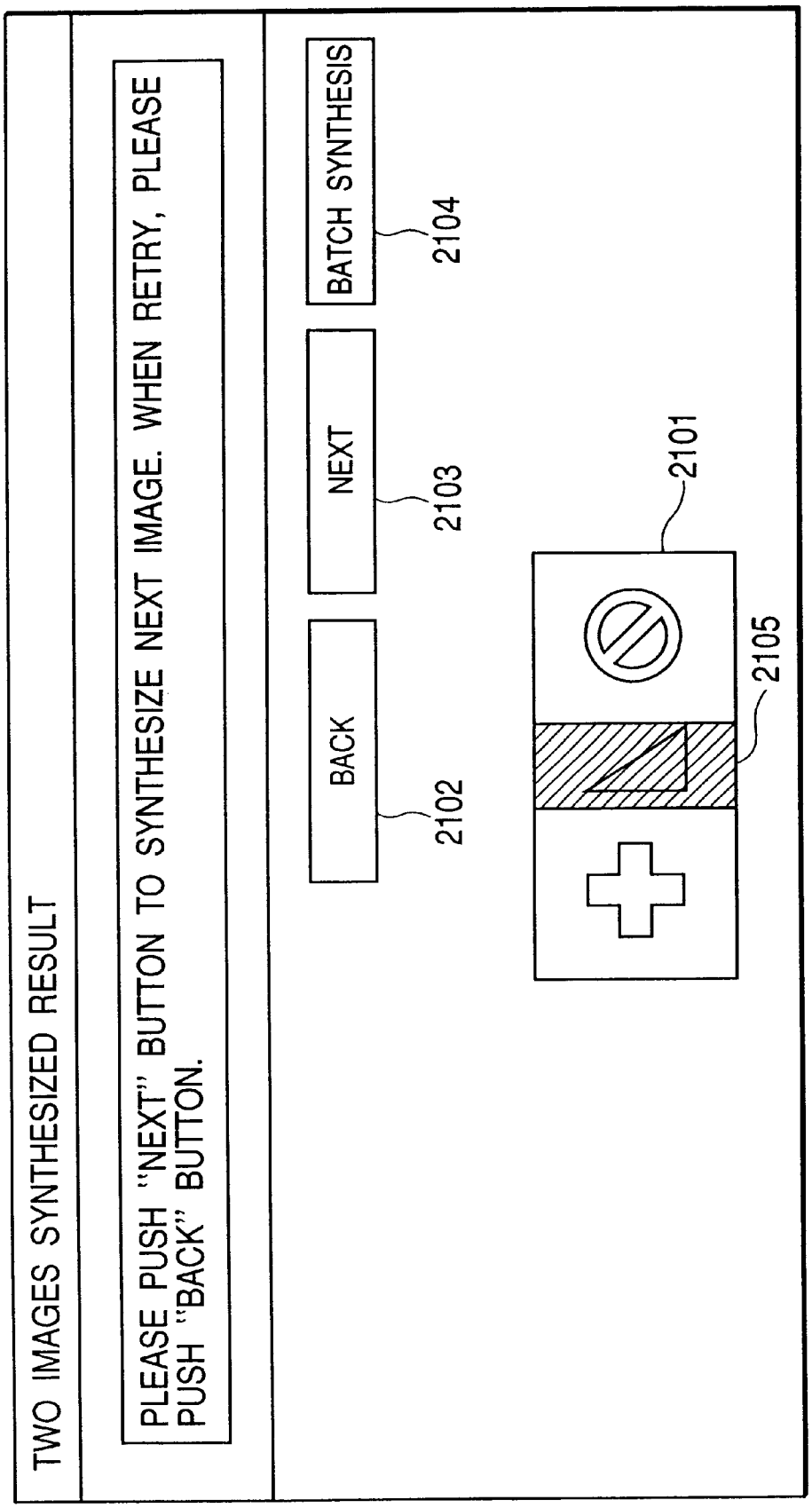
FIG. 37 is a diagram showing a further example two image synthesis window at step S103 in FIG. 29.
Figure 38:
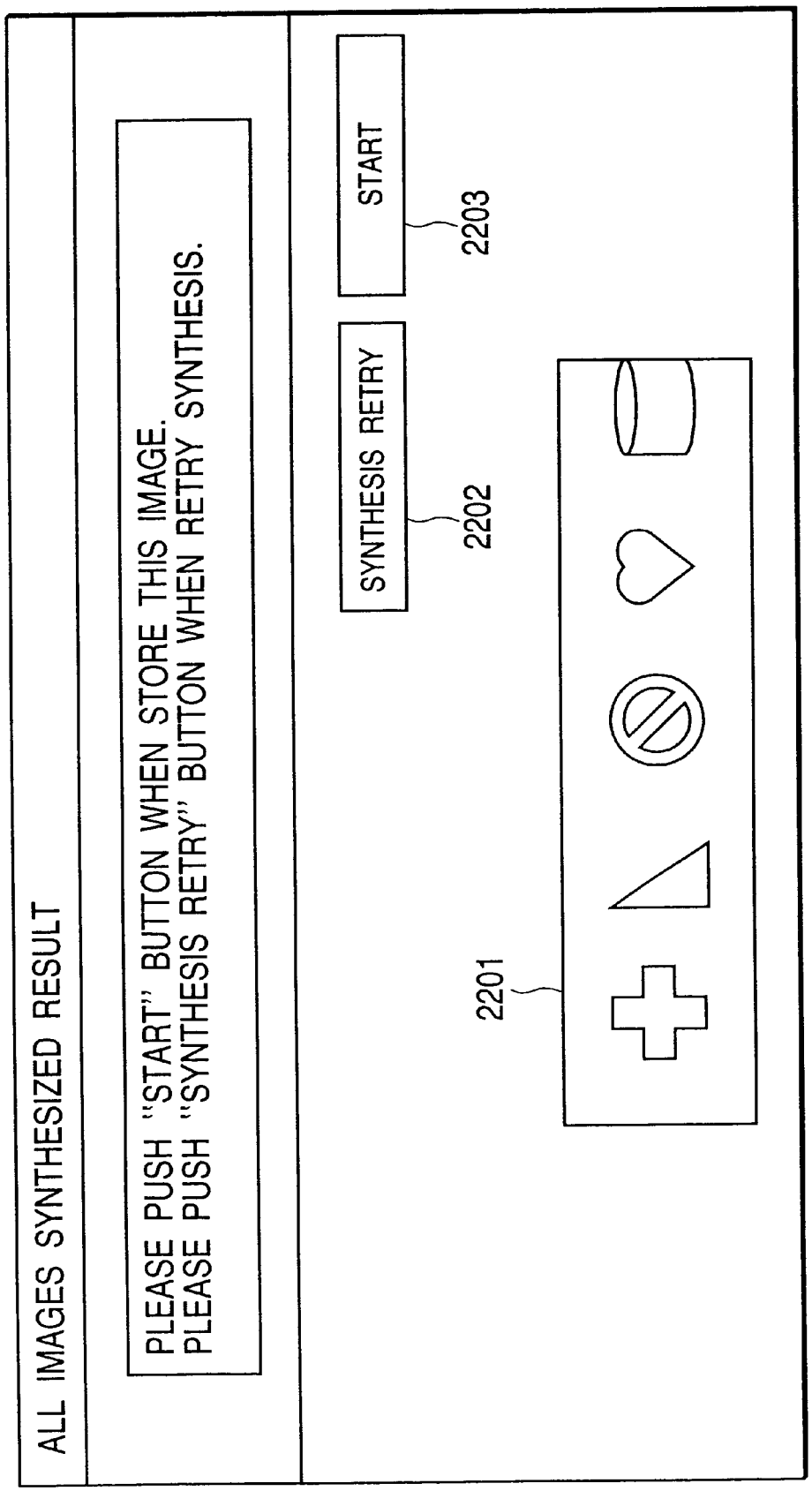
FIG. 38 is a diagram showing an example synthesis window for all images at step S104 in FIG. 29.
Figure 39:
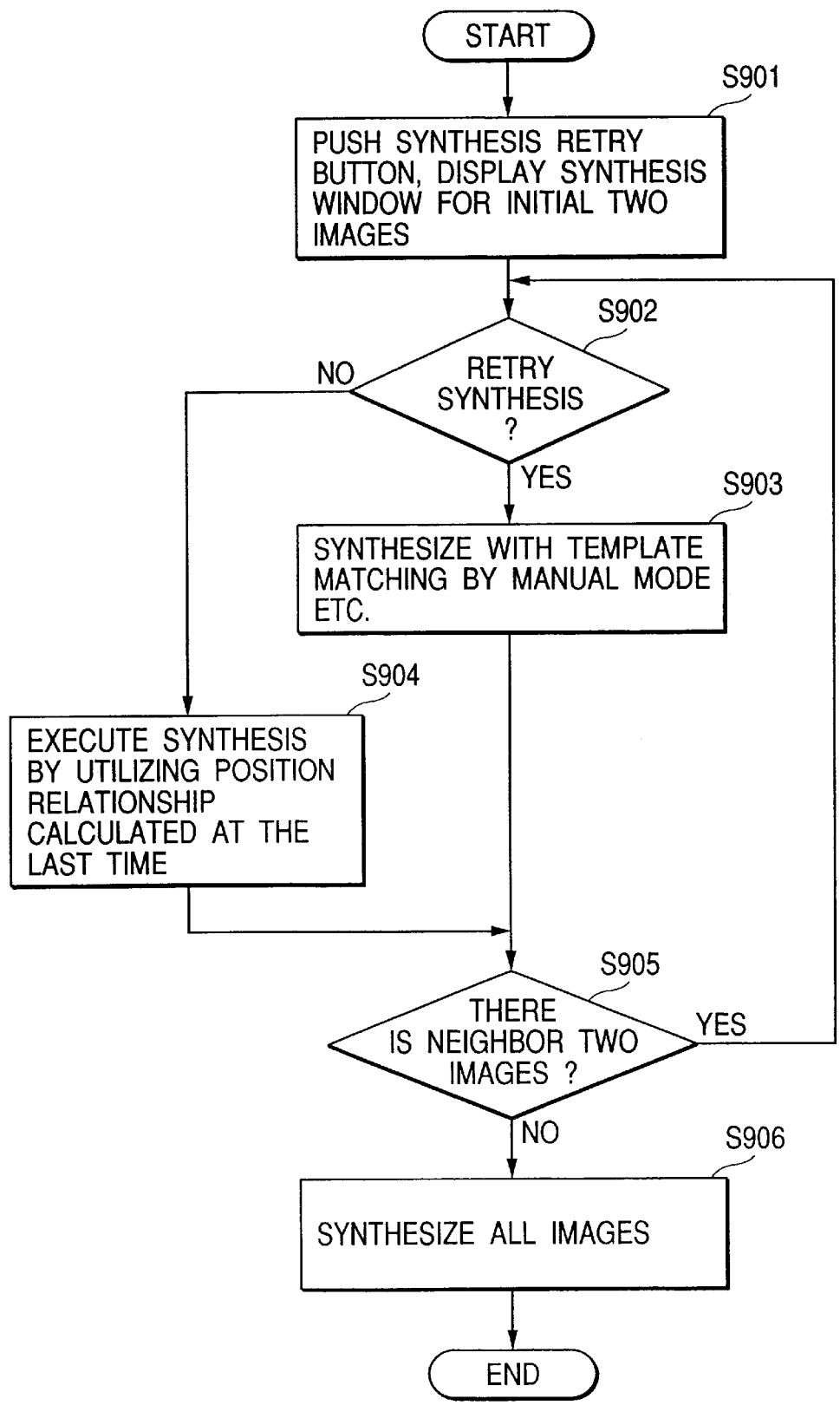
FIG. 39 is a flowchart showing image synthesis retrying processing performed by the image synthesis apparatus in FIG. 27.

The image synthesis processing performed by the image synthesis apparatus will now be described while referring to FIGS. 29 through 39. FIG. 29 is a flowchart showing the image synthesis processing performed by the image synthesis apparatus in FIG. 27. FIG. 30 is a diagram showing an example image arrangement designation window at step S102 in FIG. 29. FIGS. 33A to 33D are diagrams showing an example combination of two adjacent images at step S103 in FIG. 29. FIGS. 34 and 35 are diagrams showing an example two image synthesis window at step S103 in FIG. 29. FIGS. 36 and 37 are diagrams showing an example two image synthesis result window at step S104 in FIG. 29. FIG. 38 is a diagram showing an example all images synthesized result window at step S104 in FIG. 29. And FIG. 39 is a flowchart showing the image synthesis retrying processing performed by the image synthesis apparatus in FIG. 27.

In FIG. 29, first, at step S101 a request is issued for the selection of images to be synthesized. A user employs the keyboard 1211 or the mouse 1216 to enter the file names of the images to be synthesized. The selected images are those that have been photographed by a digital camera, and that have portions that overlap at least one of the other images.

When the images to be synthesized are selected, at step S102 a request is issued to designate the arrangement for the selected images. In this embodiment, as is shown in FIG. 30, an arrangement designation window is displayed on the display device 1217, and a user is requested to select one of several predetermined arrangements for the selected images. In the arrangement designation window are displayed a message "Please designate arrangement for images"; buttons 1401, 1402 and 1403, for designating an image arrangement; a button 1405, for establishing the current process and instructing a shift to the next process; a button 1406, for instructing batch synthesis; and selected images 1404a, 1404b, 1404c and 1404d. It should be noted that the individual images 1404a, 1404b, 1404c and 1404d that are displayed are small.

The button 1401 is used to designate the arrangement wherein the selected images are arranged horizontally in one row. This arrangement is selected for a case in which a subject was divided horizontally when it was photographed, and the obtained images are to be synthesized. When the button 1401 is selected to designate the horizontal image arrangement, as is shown in FIG. 30 the images 1404a, 1404b, 1404c and 1404d are horizontally arranged and displayed.

Figure 31:
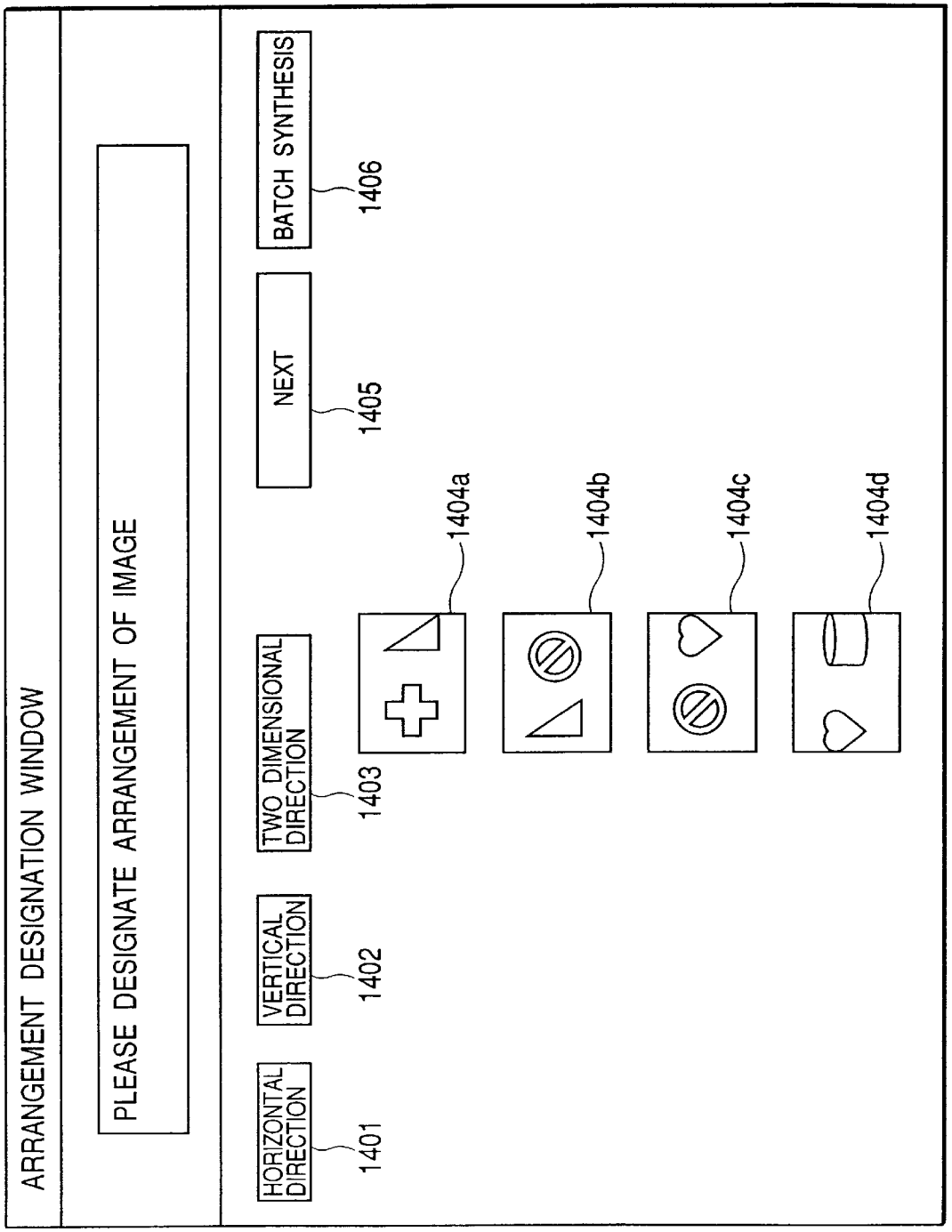
FIG. 31 is a diagram showing another example image arrangement designation window at step S102 in FIG. 29.

The button 1402 is used to designate an arrangement wherein the selected images are vertically arranged in a line. This arrangement is selected for a case in which a subject was divided vertically when it was photographed, and the obtained images are to be synthesized. When the button 1402 is selected to designate the vertical image arrangement, as is shown in FIG. 31 the images 1404a, 1404b, 1404c and 1404d are vertically arranged and displayed.

Figure 32:
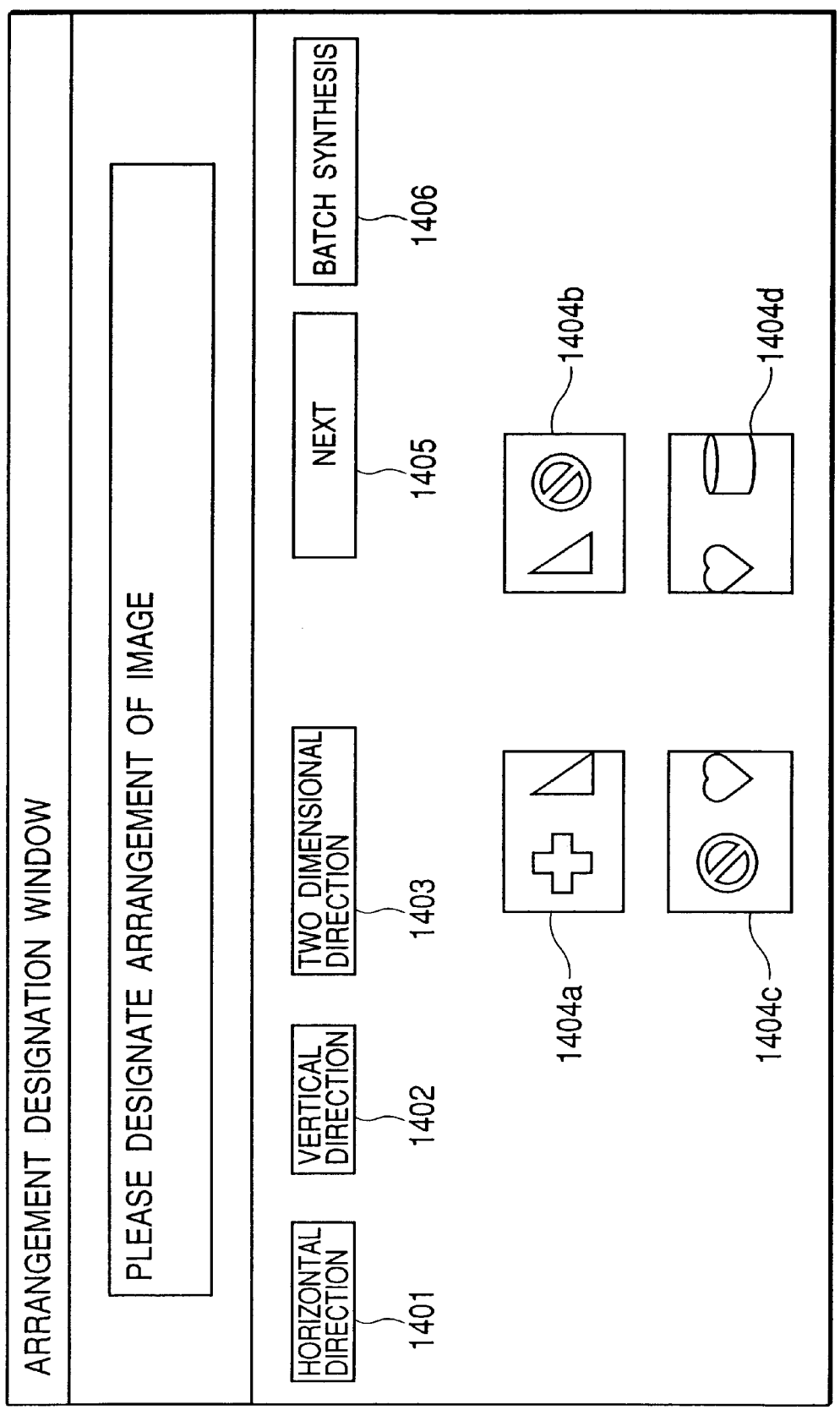
FIG. 32 is a diagram showing an additional example image arrangement designation window at step S102 in FIG. 29.
Figure 33A:
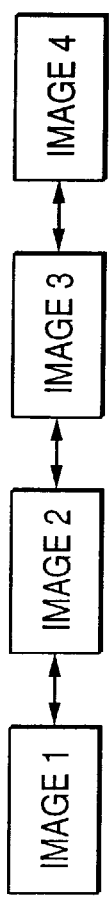
FIGS. 33A, 33B, 33C and 33D are diagrams showing example combinations of two adjacent images at step S103 in FIG. 29.
Figure 33B:
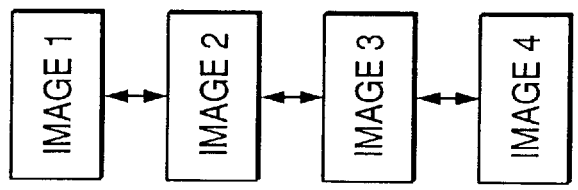
Figure 33C:
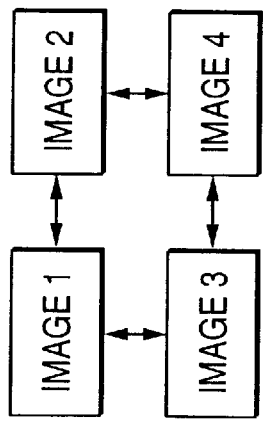
Figure 33D:
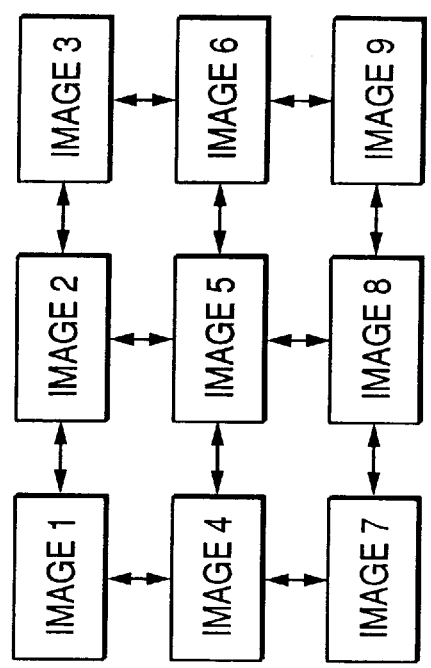

The button 1403 is used to designate an arrangement wherein the selected images are arranged two-dimensionally. This arrangement is selected for a case in which a subject was divided vertically and horizontally when it was photographed, and the obtained images are to be synthesized. When the button 1403 is selected to designate the two-dimensional image arrangement, as is shown in FIG. 32 images 1404a, 1404b, 1404c and 1404d are arranged two-dimensionally and displayed.

Since in these windows the displayed images can be rearranged as desired by drug-and-drop manipulation using the mouse 1216, a user can rearrange the images as needed. When, for example, the order of the arranged images does not match the order in which they were photographed, the displayed images can be rearranged in the order in which they were photographed.

When the user confirms that the images are appropriately arranged, he or she selects the button 1405 to designate this image arrangement. Through the selection of the button 1405, the process is shifted to the next step S103. At step S103, all the pairs of adjacent images are synthesized based on the image arrangement designated at step S102. For the four images shown in FIG. 33A that are arranged horizontally, for example, there are three the pairs of adjacent images: image 1 and image 2, image 2 and image 3, and image 3 and image 4. For the four images shown in FIG. 33B that are vertically arranged, there are also three image pairs: image 1 and image 2, image 2 and image 3, and image 3 and image 4. For the four images in FIG. 33C that are arranged two-dimensionally, there are four image pairs: image 1 and image 2, image 2 and image 4, image 1 and image 3, and image 3 and image 4. And for the nine images in FIG. 33D that are arranged two-dimensionally, as is indicated by the arrows, there are twelve image pairs .

In the synthesis processing for two adjacent images, a two image synthesis window is displayed on the display device 1217, and a user is requested to select either an auto mode or a manual mode for synthesizing the two adjacent images. As is shown in FIG. 34, in the two images synthesis window are displayed a message "Two images are synthesized"; buttons 1801 and 1802, for designating a mode for synthesizing the two adjacent images; a button 1803, for instructing a return from the current process to the previous process; a button 1804, for establishing the current process and for instructing a shift to the next process; a button 1805, for instructing batch synthesis; and two adjacent images, images 1404a and 1404b, for example. The images, 1404a and 1404b, that are displayed constitute one of the adjacent image pairs formed by the four images in FIG. 30 that are horizontally arranged.

Upon the selection of the button 1801, the auto mode is designated, and upon the selection of the button 1804, the manual mode is executed. In the auto mode, first, template matching is performed; a minute area is extracted from one of the images; and matching of this area with the other image is performed to search for a common portion in the two images. Then, the positional relationship for the two images is calculated based on the result obtained by the template matching. In accordance with the positional relationship, the two images are synthesized to generate a new image (i.e., a synthesized image is generated using the two images). The positional relationship for the two images can be obtained as a parameter that is used to synthesize one image with the other employed as a reference. The positional relationship is represented by equation (8):

$$u_0 = M u_1 \quad (8),$$

wherein $u_0 = (x_0, y_0, 1)^T$, $u_1 = (x_1, y_1, 1)^T$, $$M = \begin{pmatrix} m_1 & m_2 & m_3 \\ m_4 & m_5 & m_6 \end{pmatrix}.$$

In the auto mode, the above processing is automatically performed and two adjacent images are automatically synthesized.

Upon the selection of the button 1802, the manual mode is designated, and upon the selection of the button 1804, the manual mode is executed. In the manual mode, a user designates the common portion for the two adjacent images. Based on the designated common portion, the positional relationship for the two images is calculated using, for example, equation (8), and based on the obtained positional relationship the two images are synthesized to generate a new image (i.e., a synthesized image is generated using the two images). In the manual mode, as is shown in FIG. 35, the mouse 1216 is employed to designate a common portion 901 for the image 1404a and the image 1404b on the two image synthesis window. Although the manual mode requires a user perform many manipulations, the common portion for the two images can be precisely designated, so that a more accurate image synthesis can be preformed.

When the synthesis for one image pair has been completed, as is shown in FIG. 36, a window for the synthesis result is presented on the display device 1217. Displayed in this window are a message "Please select 'NEXT' button to synthesize next image. For a retry, please select 'BACK' button"; a button 2002 for returning to the previous process; a button 2003 for establishing the current process and for instructing a shift to the next process; a button 2004 for instructing a batch synthesis; and a synthesis result 2001 obtained for two images. When a desired synthesis result is obtained, the button 2003 is selected to shift to the process for synthesizing the next two adjacent images. Upon the execution of this shift, the two image synthesis window is displayed for the next two adjacent images, and the same synthesis process is performed for them. When a desired synthesis result is not obtained, the button 2002 is selected to return to the two image synthesis window for the current images, and the image synthesis is retried.

Another example for the synthesized result display window is shown in FIG. 37. In this window are displayed the same message as in FIG. 36; a button 2102 for returning to the previous process; a button 2103 for establishing the current process and instructing a shift to the next process; a button 2104 for instructing a batch synthesis; and a synthesis result 2101 obtained for two images. This window differs from the window in FIG. 36 in that, as is indicated by the synthesis result 2101, in accordance with the positional relationship the images are displayed with an overlapping transparent portion 2105.

When all the adjacent, paired images have been synthesized, at step S104 all the obtained images are synthesized in accordance with the synthesis results obtained for all the image pairs, i.e., in accordance with the positional relationships of all the adjacent, paired images. The shift to step S104 is automatically performed when the "NEXT" button is selected in the two image synthesized result window and when all the adjacent, paired images have been synthesized.

When all the images have been synthesized, a window displaying the all images synthesized result is opened on the display device 1217. As is shown in FIG. 38, in this window are displayed a message "Please select 'START' button when storing this image. Please select 'SYNTHESIS RETRY' button when retrying synthesis."; a button 2202 for instructing that an image be stored; a button 2203 for instructing an image synthesis retry; and an obtained synthesized result 2201. When a desired synthesized result is obtained, the user selects the button 2203 to store the obtained synthesized image 2201. The processing is thereafter terminated.

When a desired synthesized image is not obtained, the user can instruct a synthesis retry for the two adjacent images by selecting the button 2202. In this case, the window in FIG. 34 is opened on the display device 1217, and the process used in the manual mode for retrying the synthesis of two adjacent images is performed in order to acquire a desired synthesized image.

As is shown in FIG. 39, to retry the all images synthesis, first, at step S901, upon the selection of the button 2201 in the window in FIG. 38 instructing the image synthesis retry, the synthesis window (e.g., the one in FIG. 34) for the first pair of adjacent images is displayed. Then, at step S902 a check is performed to determine whether the user has instructed a synthesis retry for the two images in the two image synthesis window. When a synthesis retry instruction has been issued, at step S903, based on the user's instruction, the template matching employed in the manual mode is performed, or, based on the common portion of the two images that is redesignated by the user, template matching is performed and the positional relationship of the two images is recalculated to synthesize the images. When a synthesis retry instruction is not issued, at step S904 the current positional relationship for the two images is not calculated, and instead, the previously obtained positional relationship is employed to synthesize the two images. In this case, the parameter that was previously obtained using equation (8) and that is stored can be read in order to employ the previous positional relationship.

After the process at step S903 or S904 is completed, at step S905 a check is performed to determine whether any adjacent image pairs remain. When any adjacent image pairs remain, program control returns to step S902, and the process is repeated until all adjacent image pairs have been synthesized. When no more adjacent image pair remain, it is assumed that all the adjacent image pairs have been synthesized. At step S906 all the obtained images are synthesized, and the synthesis result is displayed in the window in FIG. 38. The processing is thereafter terminated.

The batch synthesis function that is activated upon the selection of the "BATCH SYNTHESIS" button will now be described while referring to FIGS. 40A and 40B through 43A and 43B. FIGS. 40A and 40B through 43A and 43B are diagrams showing the shifting of the state of a window employed for explaining the batch synthesis function of the image synthesis apparatus in FIG. 27.

As is described above, when the "NEXT" button or the "BACK" button in a window is selected, the currently displayed window is exchanged for the next window or for the previous window.

Figure 40A:
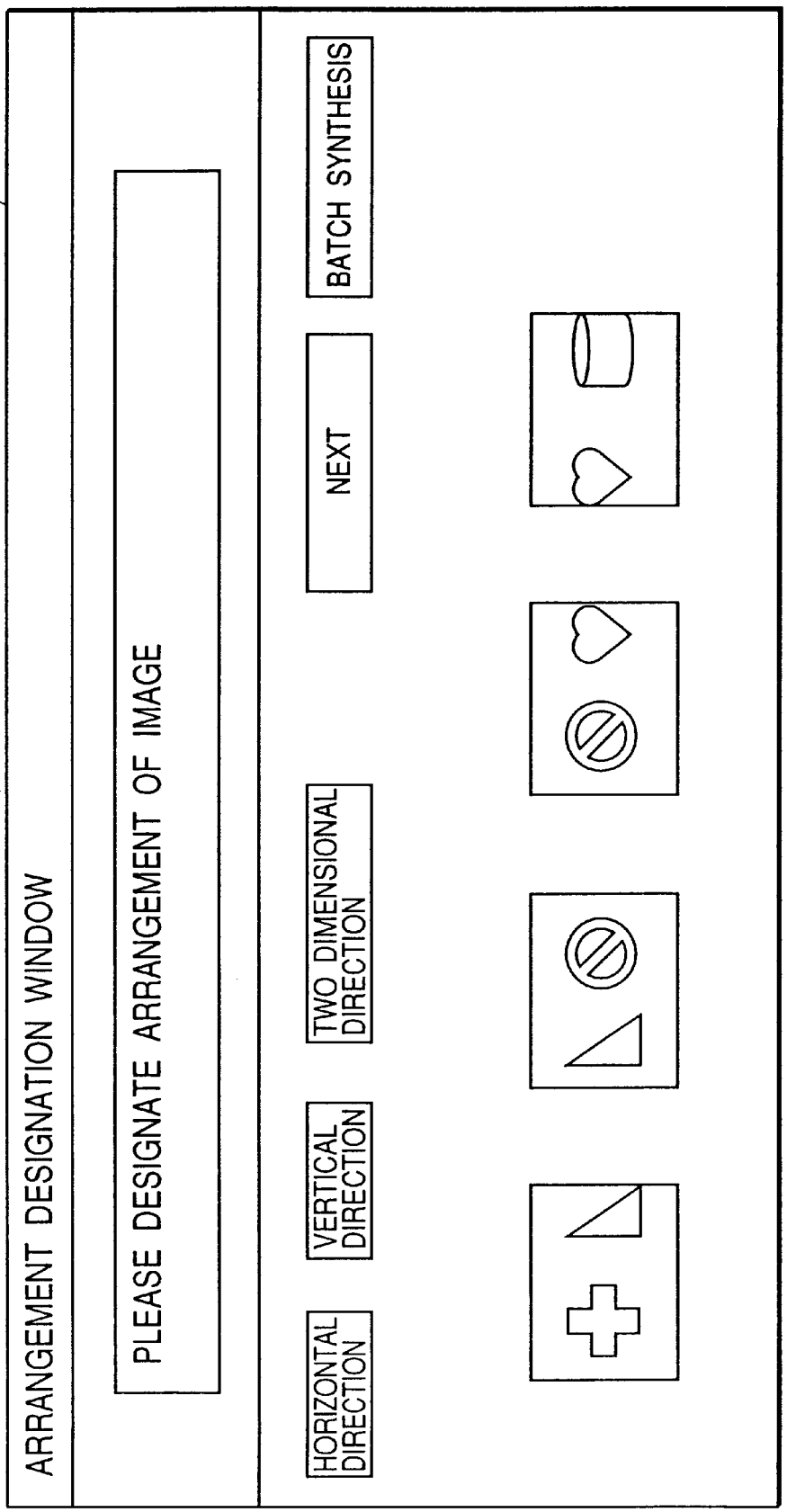
FIGS. 40A and 40B are diagrams illustrating state shifting performed in a window for explaining the batch synthesis function of the image synthesis apparatus in FIG. 27.
Figure 40B:
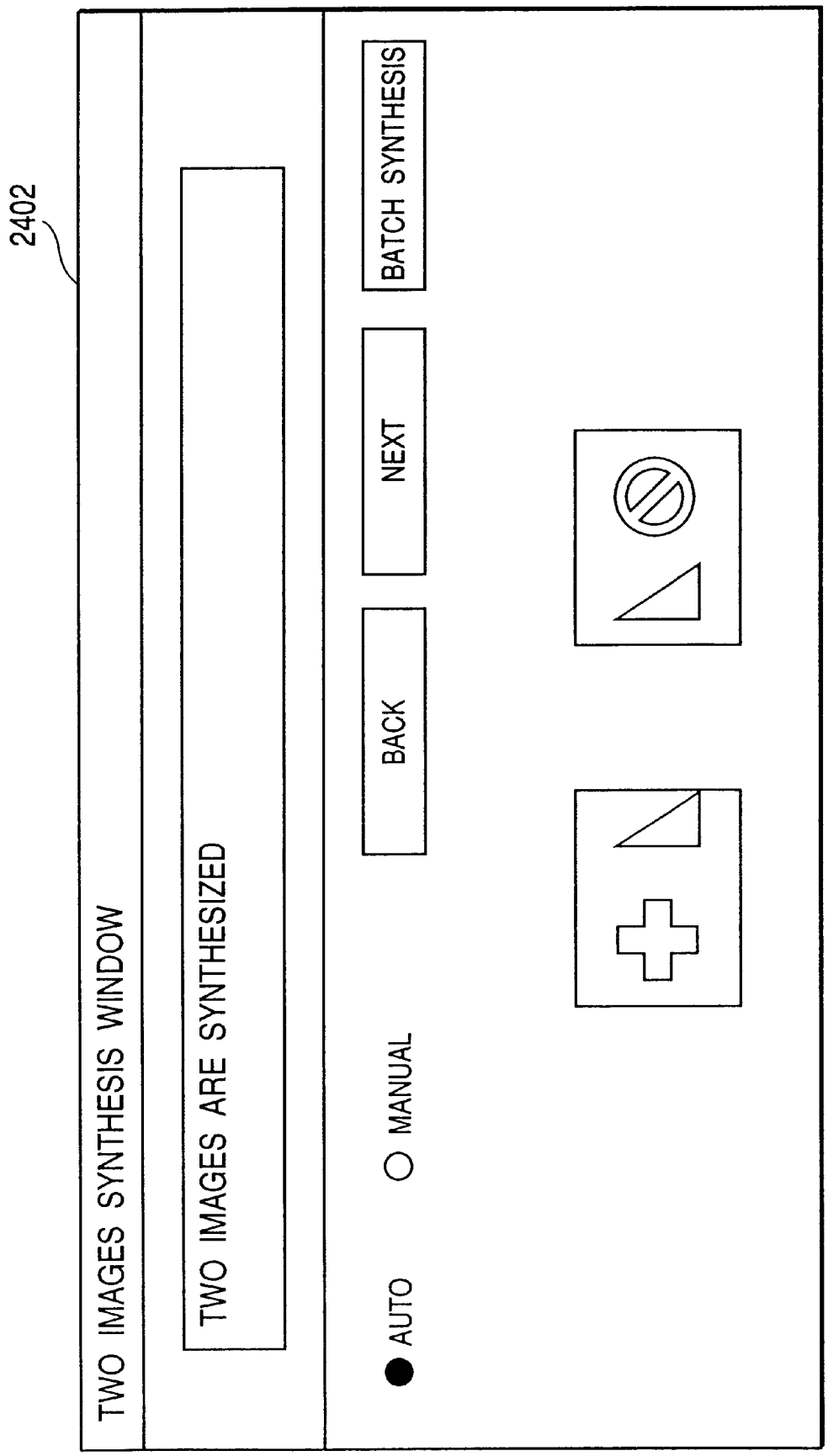
Figure 41A:
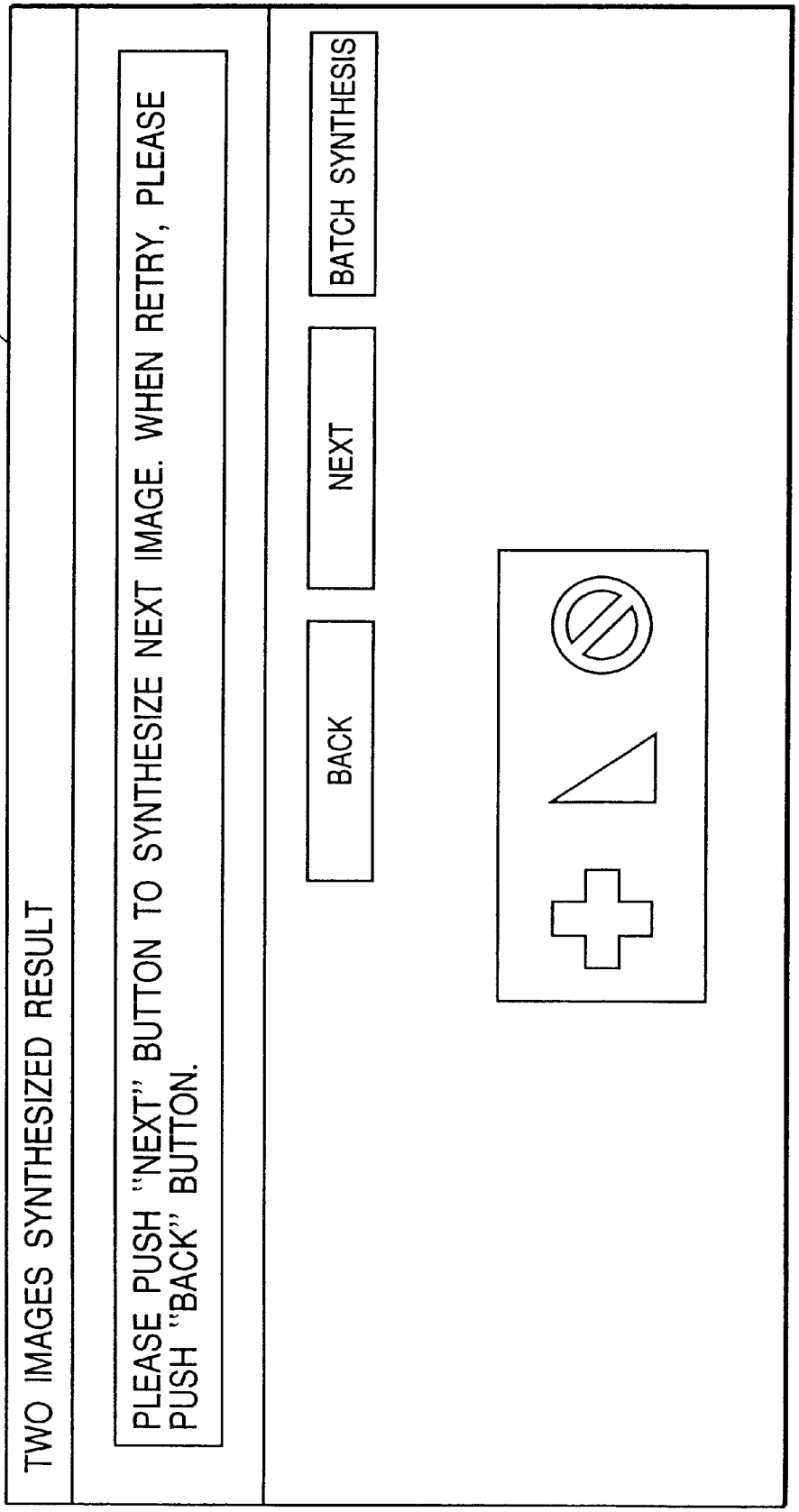
Figure 42A:
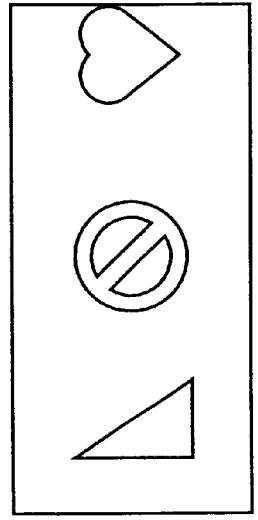

When the "BATCH SYNTHESIS" button is selected in an arrangement designation window 2401 in FIG. 40A, a two image synthesis window 2402 in FIG. 40B is opened, and the auto mode is automatically selected for the two images displayed in the window 2402. In the auto mode, as is described above, the template matching is performed automatically, and the positional relationship represented by equation (8) is calculated. That is, the user need not designate the auto mode or the manual mode in the two image synthesis window 2402. And without the "NEXT" button being selected, the positional relationship of the two images can be automatically obtained in the auto mode. When the positional relationship has been obtained, the two image synthesis result shown in FIG. 41A is not displayed, but instead, for the next two images the two image synthesis window 2404 shown in FIG. 41B is displayed. Then, the positional relationship for the two images displayed in the window 2404 is calculated in the auto mode. Similarly, the two image synthesis result shown in FIG. 42A is not opened, but instead, for the succeeding two images the two image synthesis window 2406 in FIG. 42B is displayed, and in the auto mode, the positional relationship for the two images in the window 2406 is calculated. The window 2407 in FIG. 43A, in which is presented the synthesis result obtained for two images, is also not displayed, and instead, the window 2408 in FIG. 43B, in which is presented the synthesis result for all the images, is displayed. When the synthesis result in the window 2408 is a desired image, this image is stored. When a desired synthesized image is not obtained, the synthesis of two adjacent images is retried.

An explanation will now be given for the processing performed when the "BATCH SYNTHESIS" BUTTON is selected in the two image synthesis window 2402 in FIG. 40B. The positional relationship for the two images displayed in the window 2402 is calculated in either the auto mode or the manual mode, which has been selected by the user, but the synthesis result window 2403 in FIG. 41A is not displayed. When the positional relationship is obtained, the two image synthesis window 2404 in FIG. 41B for the next two images is displayed. Then, the positional relationship for the two images displayed in the window 2404 is calculated in either the auto mode or the manual mode, which has been selected by the user. After the positional relationship is acquired, a synthesis result window 2405 in FIG. 42A is not displayed, but instead, the two image synthesis window 2406 in FIG. 42B for the next two images is displayed. Following this, the positional relationship for the two images displayed on the window 2406 is calculated, but thereafter, the synthesis result window 2407 in FIG. 43A is not displayed. When the positional relationship for all the pairs of images is obtained and the two image synthesis has been completed, the all images synthesis result window 2408 in FIG. 43B is displayed. When the synthesized result displayed in the window 2408 is a desired image, this result is stored. When a desired synthesized image can not be obtained, the synthesis of two images can be retried.

An explanation will now be given for the processing performed when the "BATCH SYNTHESIS" button is selected in the two image synthesis result window 2403 in FIG. 41A. When the "BATCH SYNTHESIS" button is selected in the window 2403, first, the window 2404 in FIG. 41B is displayed. The positional relationship for two images displayed in the window 2404 is calculated in the auto mode. Hereinafter, the synthesis result windows 2405 and 2407 in FIGS. 42A and 43A are not displayed, but instead, the two image synthesis window 2406 in FIG. 42B for the next two images is displayed, and the positional relationship for these images in the window 2406 is calculated in the auto mode. When the positional relationship for all the pairs of images has been obtained in the auto mode, the all images synthesis result window 2408 in FIG. 43B is opened. When the synthesis result displayed in the window 2408 is a desired image, this is stored. When a desired synthesized image can not be obtained, the synthesis of two adjacent images can be retried.

As is described above, when the "BATCH SYNTHESIS" button in the individual windows is designated, the positional relationship for two images is calculated in the auto mode, if not specifically designated, and is employed to synthesize the images. At this time, the synthesis result obtained for the two images is not displayed, and the two images for which the positional relationship is being calculated are displayed for a user.

As is described above, according to this embodiment, performed are: a designation process for designating a position for each image in accordance with an instruction entered at the keyboard 1211 or with the mouse 1216; a positional relationship calculation process for extracting, for each image, two adjacent images based on the designated arrangement for the images and for calculating the positional relationship wherein the overlapping portions of each two extracted images match; a synthesized image generation process for synthesizing the images in accordance with the obtained positional relationship and for generating a synthesized image; and a positional relationship recalculation process for recalculating the positional relationship for two adjacent images that are designated. Therefore, a large memory capacity is not required to perform the image synthesis processing.

The positional relationship calculation process is set so that two adjacent images can be designated by manipulating the keyboard 1211 or the mouse 1216; the approximate positional relationship is entered for these two images by manipulating the keyboard 1211 or the mouse 1216; and the positional relationship for the designated two adjacent images is calculated by employing the approximate positional relationship. Therefore, a more accurate positional relationship can be obtained for two images.

Furthermore, the positional relationship calculation process can be so set that the positional relationship for two adjacent images is automatically calculated en bloc. Therefore, the work required for inputting operations associated with the calculation of the positional relationship can be reduced.

The retry processing for the synthesis of the individual images can be so set that two adjacent images are designated in the image designation process; the positional relationship between the designated images is recalculated during the positional relationship recalculation process; and the recalculated positional relationship for the two designated images and the previously obtained positional relationship for the other two adjacent images is employed in the image synthesis generation process to perform image synthesis processing. Therefore, the image synthesis can be easily retried.

Since only two adjacent images are displayed on the display device 1217 for calculating the positional relationship for these images during the positional relationship calculation process, the two images that are to be synthesized can be easily confirmed. In addition, in accordance with the positional relationship existing between the two adjacent images that is acquired during the positional relationship calculation process, the two images are synthesized and the synthesized image is displayed on the display device 1217, so that the synthesized image for the two images can be easily confirmed. To display the synthesized image obtained for the two adjacent images, in the display the two images are overlapped, and the overlapping portion is transparent. As a result, at the overlapping portion the ease with which details can be discerned is superior to that when three or four images are overlapped, and the overlapped portion can be easily confirmed.

What is claimed is:

1. An image synthesis apparatus, for synthesizing a plurality of images in order to generate a synthesized image, comprising:

(A) storage means for selecting from a plurality of images to be synthesized, as an image synthesis unit, two or more images, and for storing image information for the selected images;

(B) coordinate transformation parameter generation means for employing said image information stored in said storage means to generate coordinate transformation parameters that are used to establish a positional relationship for said selected images before said selected images are synthesized to obtain a single image;

(C) image synthesis information generation means for changing said plural coordinate transformation parameters, which are generated by said coordinate transformation parameter generation means, by using as a reference the position of any image of said plurality of images, and for furnishing the resultant coordinate transformation parameters as image synthesis information;

(D) image synthesis processing means for synthesizing said plurality of images in accordance with said image synthesis information generated by said image synthesis information generation means; and (E) reference image designation means for designating as a reference an image selected from among said plurality of images, wherein said image synthesis information generation means, converts said coordinate transformation parameters, which are generated by said coordinate transformation parameter generation means, by employing, as a reference, a position for said image that is designated by said reference image designation means, and generates the obtained coordinate transformation parameters as image synthesis information.

2. An image synthesis apparatus according to claim 1, wherein said image synthesis information generation means includes image synthesis information holding means for holding said image synthesis information that is generated; and wherein said image synthesis apparatus is so arranged that said coordinate transformation parameter generation means sequentially generates, for all of said plurality of images, said coordinate transformation parameters, used for said image synthesis unit, that said image synthesis information generation means employs a position of an arbitrary image of said plurality of images in order to sequentially convert said coordinate transformation parameters that are generated by said coordinate transformation parameter generation means, and sequentially stores, in said image synthesis information holding means, the obtained coordinate transformation parameters as image synthesis information, and that, when said image synthesis information for all of said plurality of images has been stored in said image synthesis information holding means, said image synthesis processing means collectively synthesizes said plurality of images in accordance with said image synthesis information.

3. An image synthesis apparatus according to claim 1, wherein said image synthesis information generation means includes image synthesis information holding means for holding said image synthesis information that is generated; and wherein said image synthesis apparatus is so arranged that said coordinate transformation parameter generation means sequentially generates, for all of said plurality of images, said coordinate transformation parameters, used for said image synthesis unit, that said image synthesis information generation means employs to position an arbitrary image of said plurality of images in order to sequentially convert said coordinate transformation parameters that are generated by said coordinate transformation parameter generation means, and sequentially stores, in said image synthesis information holding means, the obtained coordinate transformation parameters as image synthesis information, and that, each time said image synthesis information is stored in said image synthesis information holding means, image information that was previously stored in said storage means is abandoned and image information for the next selected image is stored in said storage means.

4. An image synthesis apparatus according to claim 1, wherein said image synthesis information generation means includes recording means for recording on a recording medium said image synthesis information that is generated.

5. An image synthesis apparatus according to claim 1, further comprising a memory medium that is readable by a computer in which is stored a program for permitting said storage means, said coordinate transformation parameter generation means, said image synthesis information generation means and said image synthesis processing means to perform processing, and which is so arranged that the processing of said image synthesis apparatus is controlled by said computer that is operated by said program stored in said memory medium.

6. An image synthesis apparatus, for synthesizing a plurality of images to generate a synthesized image, comprising:
  (A) storage means for selecting from a plurality of images to be synthesized, as an image synthesis unit, two or more images and for storing image information for the selected images;
  (B) adjustment information generation means for employing said image information stored in said storage means to adjust the characteristics of said selected images before synthesizing said selected images and obtaining a single image;
  (C) image synthesis information generation means for changing said adjustment information, which is generated by said adjustment information generation means, by using as a reference the characteristic of any image selected from said plurality of images, and for providing the resultant adjustment information as image synthesis information;
  (D) image synthesis processing means for synthesizing said plurality of images in accordance with said image synthesis information generated by said image synthesis information generation means; and
  (E) reference image designation means for designating as a reference an image selected from among said plurality of images, wherein said image synthesis information generation means, converts said adjustment information, which is generated by said adjustment information generation means, by employing, as a reference, a characteristic for said image that is designated by said reference image designation means, and generates the obtained adjustment information as image synthesis information.

7. An image synthesis apparatus according to claim 6, wherein said image synthesis information generation means includes image synthesis information holding means for holding said image synthesis information that is generated; and wherein said image synthesis apparatus is so arranged that said adjustment information generation means sequentially generates, for all of said plurality of images, said adjustment information used for said image synthesis unit, that said image synthesis information generation means employs a position for an arbitrary image, selected from among said plurality of images, to sequentially convert said adjustment information, which is generated by said adjustment information generation means, and sequentially stores, in said image synthesis information holding means, the obtained adjustment information as image synthesis information, and that, when said image synthesis information for all of said plurality of images has been stored in said image synthesis information holding means, said image synthesis processing means collectively synthesizes said plurality of images in accordance with said image synthesis information.

8. An image synthesis apparatus according to claim 6, wherein said image synthesis information generation means includes image synthesis information holding means for holding said image synthesis information that is generated; and wherein said image synthesis apparatus is so arranged that said adjustment information generation means sequentially generates, for all of said plurality of images, said adjustment information used for said image synthesis unit, that said image synthesis information generation means employs a position for an arbitrary image, selected from among said plurality of images, to sequentially convert said adjustment information, which is generated by said adjustment information generation means, and sequentially stores, in said image synthesis information holding means, the obtained adjustment information as image synthesis information, and that, each time said image synthesis information is stored in said image synthesis information holding means, image information that was previously stored in said storage means is abandoned and image information for the next selected image is stored in said storage means.

9. An image synthesis apparatus according to claim 6, wherein said adjustment information generation means, as arranged, employs said image information stored in said storage means to adjust the characteristics of said selected images before synthesizing said selected images and obtaining a single image.

10. An image synthesis apparatus according to claim 6, wherein said adjustment information generation means, as arranged, generates adjustment information with which to obtain intermediate characteristics for said selected images.

11. An image synthesis apparatus according to claim 6, further comprising a memory medium that is readable by a computer in which is stored a program for permitting said storage means, said adjustment information generation means, said image synthesis information generation means and said image synthesis processing means to perform processing, and which is so arranged that the processing of said image synthesis apparatus is controlled by said computer that is operated by said program stored in said memory medium.

12. An image synthesis apparatus, for synthesizing a plurality of images to generate a synthesized image, comprising:
  (A) storage means for selecting from a plurality of images to be synthesized, as an image synthesis unit, two or more images and for storing image information for the selected images;
  (B) adjustment information generation means for employing said image information stored in said storage means to adjust the characteristics of said selected images before synthesizing said selected images and obtaining a single image;

(C) coordinate transformation parameter generation means for employing said image information stored in said storage means to generate plural coordinate transformation parameters that are used to establish a positional relationship for said selected images before said selected images are synthesized to obtain a single image;

(D) image synthesis information generation means for using as a reference any image selected from said plurality of images to change said adjustment information, which is generated by said adjustment information generation means, and said coordinate transformation parameters, which are generated by said coordinate transformation parameter generation means, and for providing, as image synthesis information, the resultant adjustment information and the resultant coordinate transformation parameters;

(E) image synthesis processing means for synthesizing said plurality of images in accordance with said image synthesis information generated by said image synthesis information generation means; and (F) reference image designation means for designating as a reference an image selected from among said plurality of images, wherein said image synthesis information generation means, employs, as a reference, said image that is designated by said reference image designation means to convert said adjustment information and said coordinate transformation parameters, which are respectively generated by said adjustment information generation means and said coordinate transformation parameter generation means, and generates the obtained adjustment information and coordinate transformation parameters as image synthesis information.

13. An image synthesis apparatus according to claim 12, wherein said image synthesis information generation means includes image synthesis information holding means for holding said image synthesis information that is generated; and wherein said image synthesis apparatus is so arranged that said adjustment information generation means and said coordinate transformation parameter generation means sequentially generate, for all of said plurality of images, said adjustment information and said coordinate transformation parameters used for said image synthesis unit, that said image synthesis information generation means employs as a reference an arbitrary image, selected from among said plurality of images, to sequentially convert said adjustment information and said coordinate transformation parameters, which are respectively generated by said adjustment information generation means and said coordinate transformation parameter generation means, and sequentially stores, in said image synthesis information holding means, the obtained adjustment information and coordinate transformation parameters as image synthesis information, and that, when said image synthesis information for all of said plurality of images has been stored in said image synthesis information holding means, said image synthesis processing means collectively synthesizes said plurality of images in accordance with said image synthesis information.

14. An image synthesis apparatus according to claim 12, wherein said image synthesis information generation means includes image synthesis information holding means for holding said image synthesis information that is generated; and wherein said image synthesis apparatus is so arranged that said adjustment information generation means and said coordinate transformation parameter generation means sequentially generate, for all of said plurality of images, said adjustment information and said coordinate transformation parameters used for said image synthesis unit, that said image synthesis information generation means employs as a reference an arbitrary image, selected from among said plurality of images, to sequentially convert said adjustment information and said coordinate transformation parameters, which are respectively generated by said adjustment information generation means and said coordinate transformation parameter generation means, and sequentially stores, in said image synthesis information holding means, the obtained adjustment information and coordinate transformation parameters as image synthesis information, and that, each time said image synthesis information is stored in said image synthesis information holding means, image information that was previously stored in said storage means is abandoned and image information for the next selected image is stored in said storage means.

15. An image synthesis apparatus according to claim 12, wherein said adjustment information generation means, as arranged, employs said image information stored in said storage means to adjust the characteristics of said selected images before synthesizing said selected images and obtaining a single image.

16. An image synthesis apparatus according to claim 12, wherein said adjustment information generation means, as arranged, generates adjustment information with which to obtain intermediate characteristics for said selected images.

17. An image synthesis apparatus according to claim 12, further comprising a memory medium that is readable by a computer in which is stored a program for permitting said storage means, said adjustment information generation means, said coordinate transformation parameter generation means, said image synthesis information generation means and said image synthesis processing means to perform processing, and which is so arranged that the processing of said image synthesis apparatus is controlled by said computer that is operated by said program stored in said memory medium.

18. An image synthesis method, for synthesizing a plurality of images in order to generate a synthesized image, comprising:

(A) a storage step of selecting from a plurality of images to be synthesized, as an image synthesis unit, two or more images, and of storing image information for the selected images;

(B) a coordinate transformation parameter generation step of employing said image information stored at said storage step to generate plural coordinate transformation parameters that are used to establish a positional relationship for said selected images before said selected images are synthesized to obtain a single image;

(C) an image synthesis information generation step of changing said coordinate transformation parameters, which are generated at said coordinate transformation parameter generation step, by using as a reference the position of any image of said plurality of images, and of furnishing the resultant coordinate transformation parameters as image synthesis information;

(D) an image synthesis processing step of synthesizing said plurality of images in accordance with said image synthesis information generated at said image synthesis information generation step; and (E) a reference image designation step of designating as a reference an image selected from among said plurality of images, wherein at said image synthesis information generation step, said coordinate transformation parameters, which are generated at said coordinate transformation parameter generation step, are converted by employing, as a reference, a position for, said image that is designated at said reference image designation step, and the obtained coordinate transformation parameters are generated as image synthesis information.

19. An image synthesis method according to claim 18, wherein said image synthesis information generation step includes an image synthesis information holding step of holding said image synthesis information that is generated; and wherein said image synthesis method is so arranged that at said coordinate transformation parameter generation step, said coordinate transformation parameters, used for said image synthesis unit, are sequentially generated for all of said plurality of images, that at said image synthesis information generation step, a position of an arbitrary image of said plurality of images is employed in order to sequentially convert said coordinate transformation parameters that are generated at said coordinate transformation parameter generation step, that at said image synthesis information holding step, the obtained coordinate transformation parameters are sequentially stored as image synthesis information, and that, when said image synthesis information for all of said plurality of images has been stored at said image synthesis information holding step, said plurality of images are collectively synthesized at said image synthesis processing step in accordance with said image synthesis information.

20. An image synthesis method according to claim 18, wherein said image synthesis information generation step includes an image synthesis information holding step of holding said image synthesis information that is generated; and wherein said image synthesis method is so arranged that at said coordinate transformation parameter generation step said coordinate transformation parameters, used for said image synthesis unit, are sequentially generated for all of said plurality of images, that at said image synthesis information generation step a position of an arbitrary image of said plurality of images is employed in order to sequentially convert said coordinate transformation parameters that are generated at said coordinate transformation parameter generation step, that at said image synthesis information holding step, the obtained coordinate transformation parameters are sequentially stored as image synthesis information, and that, each time said image synthesis information is stored at said image synthesis information holding step, image information that was previously stored at said storage step is abandoned and image information for the next selected image is stored at said storage step.

21. An image synthesis method according to claim 18, wherein said image synthesis information generation step includes a recording step of recording on a recording medium said image synthesis information that is generated.

22. An image synthesis method according to claim 18, which employs a memory medium that is readable by a computer in which is stored a program for performing processing at said storage step, said coordinate transformation parameter generation step, said image synthesis information generation step and said image synthesis processing step, and which is executed by said computer that is operated by said program stored in said memory medium.

23. An image synthesis method, for synthesizing a plurality of images to generate a synthesized image, comprising:

(A) a storage step of selecting from a plurality of images to be synthesized, as an image synthesis unit, two or more images and of storing image information for the selected images;

(B) an adjustment information generation step of employing said image information stored at said storage step to adjust the characteristics of said selected images before synthesizing said selected images and obtaining a single image;

(C) an image synthesis information generation step of changing said adjustment information, which is generated at said adjustment information generation step, by using as a reference the characteristic of any image selected from said plurality of images, and of providing the resultant adjustment information as image synthesis information;

(D) an image synthesis processing step of synthesizing said plurality of images in accordance with said image synthesis information generated at said image synthesis information generation step; and (E) a reference image designation step of designating as a reference an image selected from among said plurality of images, wherein at said image synthesis information generation step, said adjustment information, which is generated at said adjustment information generation step, is converted by employing, as a reference, a characteristic for said image that is designated at the said reference image designation step, and the obtained adjustment information is generated as image synthesis information.

24. An image synthesis method according to claim 23, wherein said image synthesis information generation step includes an image synthesis information holding step of holding said image synthesis information that is generated; and wherein said image synthesis method is so arranged that at said adjustment information generation step said adjustment information used for said image synthesis unit is sequentially generated for all of said plurality of images, that at said image synthesis information generation step, a position for an arbitrary image, selected from among said plurality of images, is employed to sequentially convert said adjustment information, which is generated at said adjustment information generation step, and at said image synthesis information holding step, the obtained adjustment information is sequentially stored as image synthesis information, and that, when said image synthesis information for all of said plurality of images has been stored at said image synthesis information holding step, said plurality of images are collectively synthesized at said image synthesis processing step in accordance with said image synthesis information.

25. An image synthesis method according to claim 23, wherein said image synthesis information generation step includes an image synthesis information holding step of holding said image synthesis information that is generated; and wherein said image synthesis method is so arranged that at said adjustment information generation step, said adjustment information used for said image synthesis unit are sequentially generated for all of said plurality of images, that at said image synthesis information generation step, a position for an arbitrary image, selected from among said plurality of images, is employed to sequentially convert said adjustment information, which is generated at said adjustment information generation step, and at said image synthesis information holding step, the obtained adjustment information is sequentially stored as image synthesis information, and that, each time said image synthesis information is stored at said image synthesis information holding step, image information that was previously stored at said storage step is abandoned and image information for the next selected image is stored at said storage step.

26. An image synthesis method according to claim 23, wherein at said adjustment information generation step, as arranged, said image information stored at said storage step is employed to adjust the characteristics of said selected images before synthesizing said selected images and obtaining a single image.

27. An image synthesis method according to claim 23, wherein at said adjustment information generation step, as arranged, adjustment information is generated with which to obtain intermediate characteristics for said selected images.

28. An image synthesis method according to claim 23, which employs a memory medium that is readable by a computer in which is stored a program for performing the processing at said storage step, said adjustment information generation step, said image synthesis information generation step and said image synthesis processing step, and which is executed by said computer that is operated by said program stored in said memory medium.

29. An image synthesis method, for synthesizing a plurality of images to generate a synthesized image, comprising:
(A) a storage step of selecting from a plurality of images to be synthesized, as an image synthesis unit, two or more images and of storing image information for the selected images;
(B) an adjustment information generation step of employing said image information stored at said storage step to adjust the characteristics of said selected images before synthesizing said selected images and obtaining a single image;
(C) a coordinate transformation parameter generation step for employing said image information stored at said storage step to generate plural coordinate transformation parameters that are used to establish a positional relationship for said selected images before said selected images are synthesized to obtain a single image;
(D) an image synthesis information generation step of using as a reference any image selected from said plurality of images to change said adjustment information, which is generated at said adjustment information generation step, and said coordinate transformation parameters, which are generated at said coordinate transformation parameter generation step, and of providing, as image synthesis information, the resultant adjustment information and the resultant coordinate transformation parameters;
(E) an image synthesis processing step of synthesizing said plurality of images in accordance with said image synthesis information generated at said image synthesis information generation step; and
(F) a reference image designation step of designating as a reference an image selected from among said plurality of images, wherein at said image synthesis information generation step, said image that is designated at said reference image designation step is employed as a reference to convert said adjustment information and said coordinate transformation parameters, which are respectively generated at said adjustment information generation step and said coordinate transformation parameter generation step, and the obtained adjustment information and coordinate transformation parameters are generated as image synthesis information.

30. An image synthesis method according to claim 29, wherein said image synthesis information generation step includes an image synthesis information holding step of holding said image synthesis information that is generated; and wherein said image synthesis method is so arranged that at said adjustment information generation step and said coordinate transformation parameter generation step, said adjustment information and said coordinate transformation parameters, used for said image synthesis unit, are sequentially generated for all of said plurality of images, that at said image synthesis information generation step, an arbitrary image, selected from among said plurality of images, is employed as a reference to sequentially convert said adjustment information and said coordinate transformation parameters, which are respectively generated at said adjustment information generation step and said coordinate transformation parameter generation step, and at said image synthesis information holding step, the obtained adjustment information and coordinate transformation parameters are sequentially stored as image synthesis information, and that, when said image synthesis information for all of said plurality of images has been stored at said image synthesis information holding step, said plurality of images are collectively synthesized at said image synthesis processing step in accordance with said image synthesis information.

31. An image synthesis method according to claim 29, wherein said image synthesis information generation step includes an image synthesis information holding step of holding said image synthesis information that is generated; and wherein said image synthesis method is so arranged that at said adjustment information generation step and said coordinate transformation parameter generation step, said adjustment information and said coordinate transformation parameters, used for said image synthesis unit, are sequentially generated for all of said plurality of images, that at said image synthesis information generation step, an arbitrary image, selected from among said plurality of images, is employed as a reference to sequentially convert said adjustment information and said coordinate transformation parameters, which are respectively generated at said adjustment information generation step and said coordinate transformation parameter generation step, and at said image synthesis information holding step, the obtained adjustment information and coordinate transformation parameters are sequentially stored as image synthesis information, and that, each time said image synthesis information is stored at said image synthesis information holding step, image information that was previously stored at said storage step is abandoned and image information for the next selected image is stored at said storage step.

32. An image synthesis method according to claim 29, wherein at said adjustment information generation step, as arranged, said image information stored at said storage step is employed to adjust the characteristics of said selected images before synthesizing said selected images and obtaining a single image.

33. An image synthesis method according to claim 29, wherein at said adjustment information generation step, as arranged, adjustment information is generated with which to obtain intermediate characteristics for said selected images.

34. An image synthesis method according to claim 29, which employs a memory medium that is readable by a computer in which is stored a program for performing the processing at said storage step, said adjustment information generation step, said coordinate transformation parameter generation step, said image synthesis information generation step and said image synthesis processing step, and which is executed by said computer that is operated by said program stored in said memory medium.

35. A storage medium, which is readable by a computer in which is stored an image synthesis program that when executed performs image synthesis processing to synthesize a plurality of images and to generate a synthesized image, said image synthesis program comprising:

(A) a storage module for selecting from a plurality of images to be synthesized, as an image synthesis unit, two or more images, and for storing image information for the selected images;

(B) a coordinate transformation parameter generation module for employing said image information stored in said storage module to generate plural coordinate transformation parameters that are used to establish a positional relationship for said selected images before said selected images are synthesized to obtain a single image;

(C) an image synthesis information generation module for changing said coordinate transformation parameters, which are generated by said coordinate transformation parameter generation module, by using as a reference the position of any image of said plurality of images, and for furnishing the resultant coordinate transformation parameters as image synthesis information;

(D) an image synthesis processing module for synthesizing said plurality of images in accordance with said image synthesis information generated by said image synthesis information generation module; and (E) a reference image designation module for designating as a reference an image selected from among said plurality of images, and wherein said image synthesis information generation module, converts said coordinate transformation parameters, which are generated by said coordinate transformation parameter generation module, by employing, as a reference, a position for said image that is designated by said reference image designation module, and generates the obtained coordinate transformation parameters as image synthesis information.

36. A storage medium according to claim 35, wherein said image synthesis information generation module includes an image synthesis information holding module for holding said image synthesis information that is generated; and wherein said image synthesis program stored in said storage medium is so arranged that said coordinate transformation parameter generation module sequentially generates, for all of said plurality of images, said coordinate transformation parameters, used for said image synthesis unit, that said image synthesis information generation module employs a position of an arbitrary image of said plurality of images in order to sequentially convert said coordinate transformation parameters that are generated by said coordinate transformation parameter generation module, and sequentially stores, in said image synthesis information holding module, the obtained coordinate transformation parameters as image synthesis information, and that, when said image synthesis information for all of said plurality of images has been stored in said image synthesis information holding module, said image synthesis processing module collectively synthesizes said plurality of images in accordance with said image synthesis information.

37. A storage medium according to claim 35, wherein said image synthesis information generation module includes an image synthesis information holding module for holding said image synthesis information that is generated; and wherein said image synthesis program stored in said storage medium is so arranged that said coordinate transformation parameter generation module sequentially generates, for all of said plurality of images, said coordinate transformation parameters, used for said image synthesis unit, that said image synthesis information generation module employs to position an arbitrary image of said plurality of images in order to sequentially convert said coordinate transformation parameters that are generated by said coordinate transformation parameter generation module, and sequentially stores, in said image synthesis information holding module, the obtained coordinate transformation parameters as image synthesis information, and that, each time said image synthesis information is stored in said image synthesis information holding module, image information that was previously stored in said storage module is abandoned and image information for the next selected image is stored in said storage module.

38. A storage medium according to claim 35, wherein said image synthesis information generation module includes a recording module for recording on a recording medium said image synthesis information that is generated.

39. A storage medium, which is readable by a computer in which is stored an image synthesis program that when executed performs image synthesis processing to synthesize a plurality of images and to generate a synthesized image, said image synthesis program comprising:

(A) a storage module for selecting from a plurality of images to be synthesized, as an image synthesis unit, two or more images and for storing image information for the selected images;

(B) an adjustment information generation module for employing said image information stored in said storage module to adjust the characteristics of said selected images before synthesizing said selected images and obtaining a single image;

(C) an image synthesis information generation module for changing said adjustment information, which is generated by said adjustment information generation module, by using as a reference the characteristic of any image selected from said plurality of images, and for providing the resultant adjustment information as image synthesis information;

(D) an image synthesis processing module for synthesizing said plurality of images in accordance with said image synthesis information generated by said image synthesis information generation module; and (E) a reference image designation module for designating as a reference an image selected from among said plurality of images, wherein said image synthesis information generation module, converts said adjustment information, which is generated by said adjustment information generation module, by employing, as a reference, a characteristic for said image that is designated by said reference image designation module, and generates the obtained adjustment information as image synthesis information.

40. A storage medium according to claim 39, wherein said image synthesis information generation module includes an image synthesis information holding module for holding said image synthesis information that is generated; and wherein said image synthesis program stored in said storage medium is so arranged that said adjustment information generation module sequentially generates, for all of said plurality of images, said adjustment information used for said image synthesis unit, that said image synthesis information generation module employs a position for an arbitrary image, selected from among said plurality of images, to sequentially convert said adjustment information, which is generated by said adjustment information generation module, and sequentially stores, in said image synthesis information holding module, the obtained adjustment information as image synthesis information, and that, when said image synthesis information for all of said plurality of images has been stored in said image synthesis information holding module, said image synthesis processing module collectively synthesizes said plurality of images in accordance with said image synthesis information.

41. A storage medium according to claim 39, wherein said image synthesis information generation module includes an image synthesis information holding module for holding said image synthesis information that is generated; and wherein said image synthesis program stored in said storage medium is so arranged that said adjustment information generation module sequentially generates, for all of said plurality of images, said adjustment information used for said image synthesis unit, that said image synthesis information generation module employs a position for an arbitrary image, selected from among said plurality of images, to sequentially convert said adjustment information, which is generated by said adjustment information generation module, and sequentially stores, in said image synthesis information holding module, the obtained adjustment information as image synthesis information, and that, each time said image synthesis information is stored in said image synthesis information holding module, image information that was previously stored in said storage module is abandoned and image information for the next selected image is stored in said storage module.

42. A storage medium according to claim 39, wherein said adjustment information generation module, as arranged, employs said image information stored in said storage module to adjust the characteristics of said selected images before synthesizing said selected images and obtaining a single image.

43. A storage medium according to claim 39, wherein said adjustment information generation module, as arranged, generates adjustment information with which to obtain intermediate characteristics for said selected images.

44. A storage medium, which is readable by a computer in which is stored an image synthesis program that when executed performs image synthesis processing to synthesize a plurality of images and to generate a synthesized image, said image synthesis program comprising:

(A) a storage module for selecting from a plurality of images to be synthesized, as an image synthesis unit, two or more images and for storing image information for the selected images;

(B) an adjustment information generation module for employing said image information stored in said storage module to adjust the characteristics of said selected images before synthesizing said selected images and obtaining a single image;

(C) a coordinate transformation parameter generation module for employing said image information stored in said storage module to generate coordinate transformation parameters that are used to establish a positional relationship for said selected images before said selected images are synthesized to obtain a single image;

(D) an image synthesis information generation module for using as a reference any image selected from said plurality of images to change said adjustment information, which is generated by said adjustment information generation module, and said coordinate transformation parameters, which are generated by said coordinate transformation parameter generation module, and for providing, as image synthesis information, the resultant adjustment information and the resultant coordinate transformation parameters;

(E) an image synthesis processing module for synthesizing said plurality of images in accordance with said image synthesis information generated by said image synthesis information generation module; and (F) a reference image designation module for designating as a reference an image selected from among said plurality of images, wherein said image synthesis information generation module, employs, as a reference, said image that is designated by said reference image designation module to convert said adjustment information and said coordinate transformation parameters, which are respectively generated by said adjustment information generation module and said coordinate transformation parameter generation module, and generates the obtained adjustment information and coordinate transformation parameters as image synthesis information.

45. A storage medium according to claim 44, wherein said image synthesis information generation module includes an image synthesis information holding module for holding said image synthesis information that is generated; and wherein said image synthesis program stored in said storage medium is so arranged that said adjustment information generation module and said coordinate transformation parameter generation module sequentially generate, for all of said plurality of images, said adjustment information and said coordinate transformation parameters used for said image synthesis unit, that said image synthesis information generation module employs as a reference an arbitrary image, selected from among said plurality of images, to sequentially convert said adjustment information and said coordinate transformation parameters, which are respectively generated by said adjustment information generation module and said coordinate transformation parameter generation module, and sequentially stores, in said image synthesis information holding module, the obtained adjustment information and coordinate transformation parameters as image synthesis information, and that, when said image synthesis information for all of said plurality of images has been stored in said image synthesis information holding module, said image synthesis processing module collectively synthesizes said plurality of images in accordance with said image synthesis information.

46. A storage medium according to claim 44, wherein said image synthesis information generation module includes an image synthesis information holding module for holding said image synthesis information that is generated; and wherein said image synthesis program stored in said storage medium is so arranged that said adjustment information generation module and said coordinate transformation parameter generation module sequentially generate, for all of said plurality of images, said adjustment information and said coordinate transformation parameters used for said image synthesis unit, that said image synthesis information generation module employs as a reference an arbitrary image, selected from among said plurality of images, to sequentially convert said adjustment information and said coordinate transformation parameters, which are respectively generated by said adjustment information generation module and said coordinate transformation parameter generation module, and sequentially stores, in said image synthesis information holding module, the obtained adjustment information and coordinate transformation parameters as image synthesis information, and that, each time said image synthesis information is stored in said image synthesis information holding module, image information that was previously stored in said storage module is abandoned and image information for the next selected image is stored in said storage module.

47. A storage medium according to claim 44, wherein said adjustment information generation module, as arranged, employs said image information stored in said storage module to adjust the characteristics of said selected images before synthesizing said selected images and obtaining a single image.

48. A storage medium according to claim 44, wherein said adjustment information generation module, as arranged, generates adjustment information with which to obtain intermediate characteristics for said selected images.

49. An image synthesis apparatus, for generating a synthesized image by synthesizing a plurality of images, each of which share an overlapping portion with at least one other of those images, comprising:
   (A) arrangement destination means for designating an arrangement for said plurality of images to be synthesized;
   (B) parameter generation means for employing said arrangement for said plurality of images designated by said arrangement designation means to select from said plurality of images, as an image synthesis unit, two or more images lying adjacent to each other, and for generating parameters that are used to establish, for each of said selected images, a positional relationship for matching said overlapping portions of said selected images;
   (C) reference image designation means for designating as a reference an image selected from among said plurality of images, wherein said image synthesis information generation means, converts said coordinate transformation parameters, which are generated by said coordinate transformation parameter generation means, by employing, as a reference, a position for said image that is designated by said reference image designation means, and generates the obtained coordinate transformation parameters as image synthesis information; and
   (D) image synthesis processing means for synthesizing said plurality of images in accordance with said parameters generated by said parameter generation means,
   wherein said parameter generation means includes:
      image selection means for employing said arrangement for said plurality of images designated by said arrangement designation means to select, from among said plurality of images, two or more arbitrary images that are adjacent to each other; and
      parameter calculation means for calculating parameters that are used to establish a positional relationship for matching said overlapping portions of said images selected by said image selection means,
      wherein, to retry synthesis for said plurality of images performed by said image synthesis processing means, said image selection means employs said arrangement for said plurality of images designated by said arrangement designation means to select, from among said plurality of images, two or more arbitrary images that are adjacent to each other, and said parameter calculation means calculates said parameters that are used to establish a positional relationship for matching said overlapping portions of said images selected by said image selection means, and
      wherein said image synthesis processing means synthesizes said plurality of images in accordance with said parameters generated by said parameter calculation means.

50. An image synthesis apparatus according to claim 49, wherein said arrangement designation means designates an arrangement wherein said plurality of images are arranged vertically or horizontally, or an arrangement wherein said plurality of images are arranged two-dimensionally.

51. An image synthesis apparatus according to claim 49, further comprising manual parameter setting means, for manually setting parameters used to establish a positional relationship that enables the matching of overlapping portions of images selected from among said plurality of images, wherein, when said parameters are set by said manual parameter setting means, said image synthesis processing means synthesizes said plurality of images in accordance with said parameters.

52. An image synthesis apparatus according to claim 49, wherein, in accordance with said arrangement for said plurality of images designated by said arrangement designation means, said parameter generation means automatically and collectively generates said parameters that are used to establish a positional relationship that enables the matching of said overlapping portions of said plurality of images, and wherein said image synthesis processing means, as arranged, collectively synthesizes said plurality of images in accordance with said parameters that are automatically generated by said parameter generation means.

53. An image synthesis apparatus according to claim 49, wherein said parameter generation means includes:
   image selection means for employing said arrangement for said plurality of images designated by said arrangement designation means to select, from among said plurality of images, two or more arbitrary images that are adjacent to each other; and
   parameter manual setting means for manually setting parameters that are used to establish a positional relationship for matching said overlapping portions of said images selected by said image selection means,
   wherein, to retry synthesis for said plurality of images performed by said image synthesis processing means, said image selection means employs said arrangement for said plurality of images designated by said arrangement designation means to select, from among said plurality of images, two or more arbitrary images that are adjacent to each other, and said parameter manual setting means manually sets said parameters that are used to establish a positional relationship for matching said overlapping portions of said images selected by said image selection means, and
   wherein said image synthesis processing means synthesizes said plurality of images in accordance with said parameters set by said parameter manual setting means.

54. An image synthesis apparatus according to claim 49, further comprising display means for displaying images, said image synthesis apparatus being so arranged that, when said parameters are to be generated by said parameter generation means, said display means provides a screen on which are displayed two or more adjacent images that are selected, as an image synthesis unit, from among said plurality of images.

55. An image synthesis apparatus according to claim 49, further comprising display means for displaying images, said image synthesis apparatus being so arranged that, when said plurality of images are to be synthesized by said image synthesis processing means, two or more adjacent images, which are selected as an image synthesis unit from among said plurality of images, are synthesized in accordance with said parameters generated by said parameter generation means, and the obtained synthesized image is displayed on said screen of said display means.

56. An image synthesis apparatus according to claim 55, wherein said display means is so arranged as to provide said screen on which an overlapping portion of said plurality of images that constitute said synthesized image is displayed as a transparent image.

57. An image synthesis apparatus according to claim 49, further comprising a memory medium that is readable by a computer in which is stored a program for permitting said arrangement designation means, said parameter generation means and said image synthesis processing means to perform processing, and which is so arranged that the processing of said image synthesis apparatus is controlled by said computer that is operated by said program stored in said memory medium.

58. An image synthesis method, for generating a synthesized image by synthesizing a plurality of images, each of which share an overlapping portion with at least one other of those images, comprising:
   (A) an arrangement destination step of designating an arrangement for said plurality of images to be synthesized;
   (B) a parameter generation step of employing said arrangement for said plurality of images designated at said arrangement designation step to select from said plurality of images, as an image synthesis unit, two or more images lying adjacent to each other, and of generating parameters that are used to establish, for each of said selected images, a positional relationship for matching said overlapping portions of said selected images;
   (C) a reference image designation step of designating as a reference an image selected from among said plurality of images, wherein at said image synthesis information generation step, said coordinate transformation parameters, which are generated at said coordinate transformation parameter generation step, are converted by employing, as a reference, a position for, said image that is designated at said reference image designation step, and the obtained coordinate transformation parameters are generated as image synthesis information; and
   (D) an image synthesis processing step of synthesizing said plurality of images in accordance with said parameters generated at said parameter generation step.

59. An image synthesis method according to claim 58, wherein at said arrangement designation step, designated is an arrangement wherein said plurality of images are arranged vertically or horizontally, or an arrangement wherein said plurality of images are arranged two-dimensionally.

60. An image synthesis method according to claim 58, further comprising a manual parameter setting step of manually setting parameters used to establish a positional relationship that enables the matching of overlapping portions of images selected from among said plurality of images, wherein, when said parameters are set at said manual parameter setting step, said plurality of images are synthesized at said image synthesis processing step in accordance with said parameters.

61. An image synthesis method according to claim 58, wherein, in accordance with said arrangement for said plurality of images designated at said arrangement designation step, said parameters that are used to establish a positional relationship that enables the matching of said overlapping portions of said plurality of images are automatically and collectively generated at said parameter generation step, and wherein at said image synthesis processing step, as arranged, said plurality of images are collectively synthesized in accordance with said parameters that are automatically generated at said parameter generation step.

62. An image synthesis method according to claim 58, wherein said parameter generation step includes:
   an image selection step of employing said arrangement for said plurality of images designated at said arrangement designation step to select, from among said plurality of images, two or more arbitrary images that are adjacent to each other; and
   a parameter calculation step of calculating parameters that are used to establish a positional relationship for matching said overlapping portions of said images selected at said image selection step,
   wherein, to retry synthesis for said plurality of images performed at said image synthesis processing step, at said image selection step, said arrangement for said plurality of images designated by said arrangement designation means is employed to select, from among said plurality of images, two or more arbitrary images that are adjacent to each other, and at said parameter calculation step, said parameters are calculated that are used to establish a positional relationship for matching said overlapping portions of said images selected at said image selection step, and
   wherein at said image synthesis processing step, said plurality of images are synthesized in accordance with said parameters generated at said parameter calculation step.

63. An image synthesis method according to claim 58, wherein said parameter generation step includes:
   an image selection step of employing said arrangement for said plurality of images designated at said arrangement designation step to select, from among said plurality of images, two or more arbitrary images that are adjacent to each other; and
   a manual parameter setting step of manually setting parameters that are used to establish a positional relationship for matching said overlapping portions of said images selected at said image selection step,
   wherein, to retry synthesis for said plurality of images performed at said image synthesis processing step, at said image selection step, said arrangement for said plurality of images designated at said arrangement designation step is employed to select, from among said plurality of images, two or more arbitrary images that are adjacent to each other, and at said manual parameter setting step, said parameters are manually set that are used to establish a positional relationship for matching said overlapping portions of said images selected at said image selection step, and
   wherein at said image synthesis processing step, said plurality of images are synthesized in accordance with said parameters set at said manual parameter setting step.

64. An image synthesis method according to claim 58, further comprising a display step of displaying images, said image synthesis method being so arranged that, when said parameters are to be generated at said parameter generation step, at said display step provided is a screen on which are displayed two or more adjacent images that are selected, as an image synthesis unit, from among said plurality of images.

65. An image synthesis method according to claim 58, further comprising a display step of displaying images, said image synthesis method being so arranged that, when said plurality of images are to be synthesized at said image synthesis processing step, two or more adjacent images, which are selected as an image synthesis unit from among said plurality of images, are synthesized in accordance with said parameters generated at said parameter generation step, and the obtained synthesized image is displayed on said screen at said display step.

66. An image synthesis method according to claim 65, wherein said display step is so arranged as to provide said screen on which an overlapping portion of said plurality of images that constitute said synthesized image is displayed as a transparent image.

67. An image synthesis method according to claim 58, which employs a memory medium that is readable by a computer in which is stored a program for performing the processing at said arrangement designation step, said parameter generation step and said image synthesis processing step, and which is controlled by said computer that is operated by said program stored in said memory medium.

68. A storage medium, which is readable by a computer, in which is stored an image synthesis program that when executed performs image synthesis processing to generate a synthesized image by synthesizing a plurality of images that share an overlapping portion of at least one of those images, said image synthesis program comprising:

(A) an arrangement destination module for designating an arrangement for said plurality of images to be synthesized;

(B) a parameter generation module for employing said arrangement for said plurality of images designated by said arrangement designation module to select from said plurality of images, as an image synthesis unit, two or more images lying adjacent to each other, and for generating parameters that are used to establish, for each of said selected images, a positional relationship for matching said overlapping portions of said selected images;

(C) a reference image designation module for designating as a reference an image selected from among said plurality of images, and wherein said image synthesis information generation module, converts said coordinate transformation parameters, which are generated by said coordinate transformation parameter generation module, by employing, as a reference, a position for said image that is designated by said reference image designation module, and generates the obtained coordinate transformation parameters as image synthesis information; and (D) an image synthesis processing module for synthesizing said plurality of images in accordance with said parameters generated by said parameter generation module.

69. A storage medium according to claim 68, wherein said arrangement designation module designates an arrangement wherein said plurality of images are arranged vertically or horizontally, or an arrangement wherein said plurality of images are arranged two-dimensionally.

70. A storage medium according to claim 68, wherein said image synthesis program stored in said storage medium further comprises a manual parameter setting module, for manually setting parameters used to establish a positional relationship that enables the matching of overlapping portions of images selected from among said plurality of images, and wherein, when said parameters are set by said manual parameter setting module, said image synthesis processing module synthesizes said plurality of images in accordance with said parameters.

71. A storage medium according to claim 68, wherein, in accordance with said arrangement for said plurality of images designated by said arrangement designation module, said parameter generation module automatically and collectively generates said parameters that are used to establish a positional relationship that enables the matching of said overlapping portions of said plurality of images, and wherein said image synthesis processing module, as arranged, collectively synthesizes said plurality of images in accordance with said parameters that are automatically generated by said parameter generation module.

72. A storage medium according to claim 68, wherein said parameter generation module includes:

an image selection module for employing said arrangement for said plurality of images designated by said arrangement designation module to select, from among said plurality of images, two or more arbitrary images that are adjacent to each other; and a parameter calculation module for calculating parameters that are used to establish a positional relationship for matching said overlapping portions of said images selected by said image selection module, wherein, to retry synthesis for said plurality of images performed by said image synthesis processing module, said image selection module employs said arrangement for said plurality of images designated by said arrangement designation module to select, from among said plurality of images, two or more arbitrary images that are adjacent to each other, and said parameter calculation module calculates said parameters that are used to establish a positional relationship for matching said overlapping portions of said images selected by said image selection module, and wherein said image synthesis processing module synthesizes said plurality of images in accordance with said parameters generated by said parameter calculation module.

73. A storage medium according to claim 68, wherein said parameter generation module includes:

an image selection module for employing said arrangement for said plurality of images designated by said arrangement designation module to select, from among said plurality of images, two or more arbitrary images that are adjacent to each other; and a parameter manual setting module for manually setting parameters that are used to establish a positional relationship for matching said overlapping portions of said images selected by said image selection module, wherein, to retry synthesis for said plurality of images performed by said image synthesis processing module, said image selection module employs said arrangement for said plurality of images designated by said arrangement designation module to select, from among said plurality of images, two or more arbitrary images that are adjacent to each other, and said parameter manual setting module manually sets said parameters that are used to establish a positional relationship for matching said overlapping portions of said images selected by said image selection module, and wherein said image synthesis processing module synthesizes said plurality of images in accordance with said parameters set by said parameter manual setting module.

74. A storage medium according to claim 68, wherein said image synthesis program stored in said storage medium further comprises a display module for displaying images, and wherein said image synthesis program is so arranged that, when said parameters are to be generated by said parameter generation module, said display module provides a screen on which are displayed two or more adjacent images that are selected, as an image synthesis unit, from among said plurality of images.

75. A storage medium according to claim 68, wherein said image synthesis program stored in said storage medium further comprises a display module for displaying images, and wherein said image synthesis program is so arranged that, when said plurality of images are to be synthesized by said image synthesis processing module, two or more adjacent images, which are selected as an image synthesis unit from among said plurality of images, are synthesized in accordance with said parameters generated by said parameter generation module, and the obtained synthesized image is displayed on said screen of said display module.

76. A storage medium according to claim 75, wherein said display module is so arranged as to provide said screen on which an overlapping portion of said plurality of images that constitute said synthesized image is displayed as a transparent image.

* * * * *

UNITED STATES PATENT AND TRADEMARK OFFICE
CERTIFICATE OF CORRECTION

PATENT NO. : 6,424,752 B1
DATED : July 23, 2002
INVENTOR(S) : Tatsushi Katayama et al.

Figure 1:
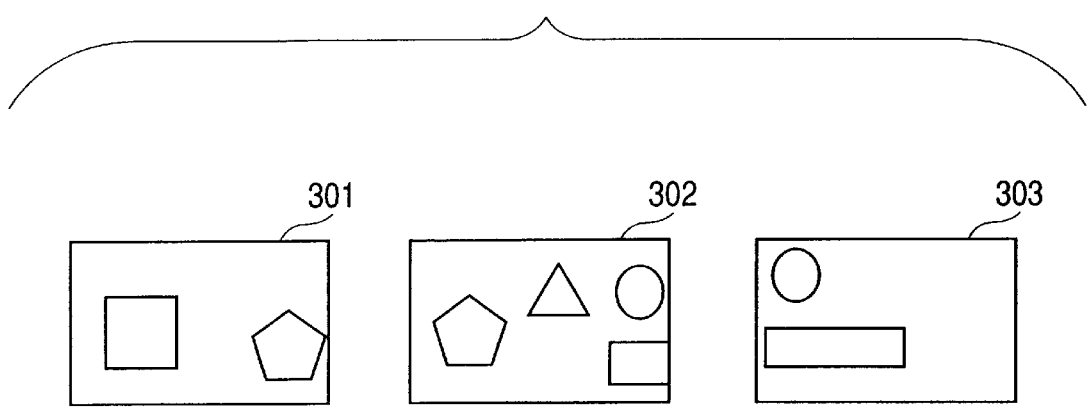
FIG. 1 is a diagram showing a plurality of images that are partially overlapped.
Figure 2:
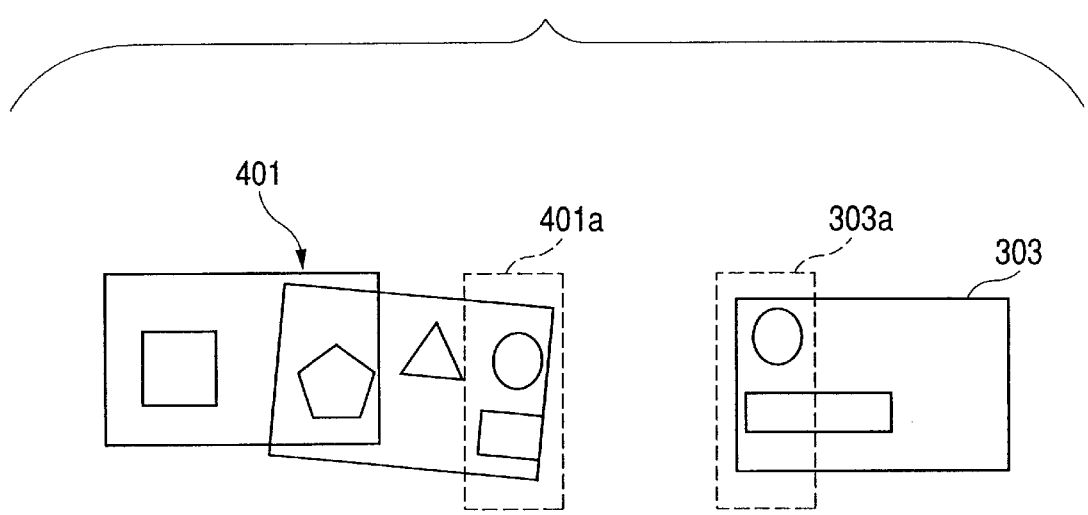
FIG. 2 is a diagram showing the processing used to synthesize the images in FIG. 1.
Figure 3:
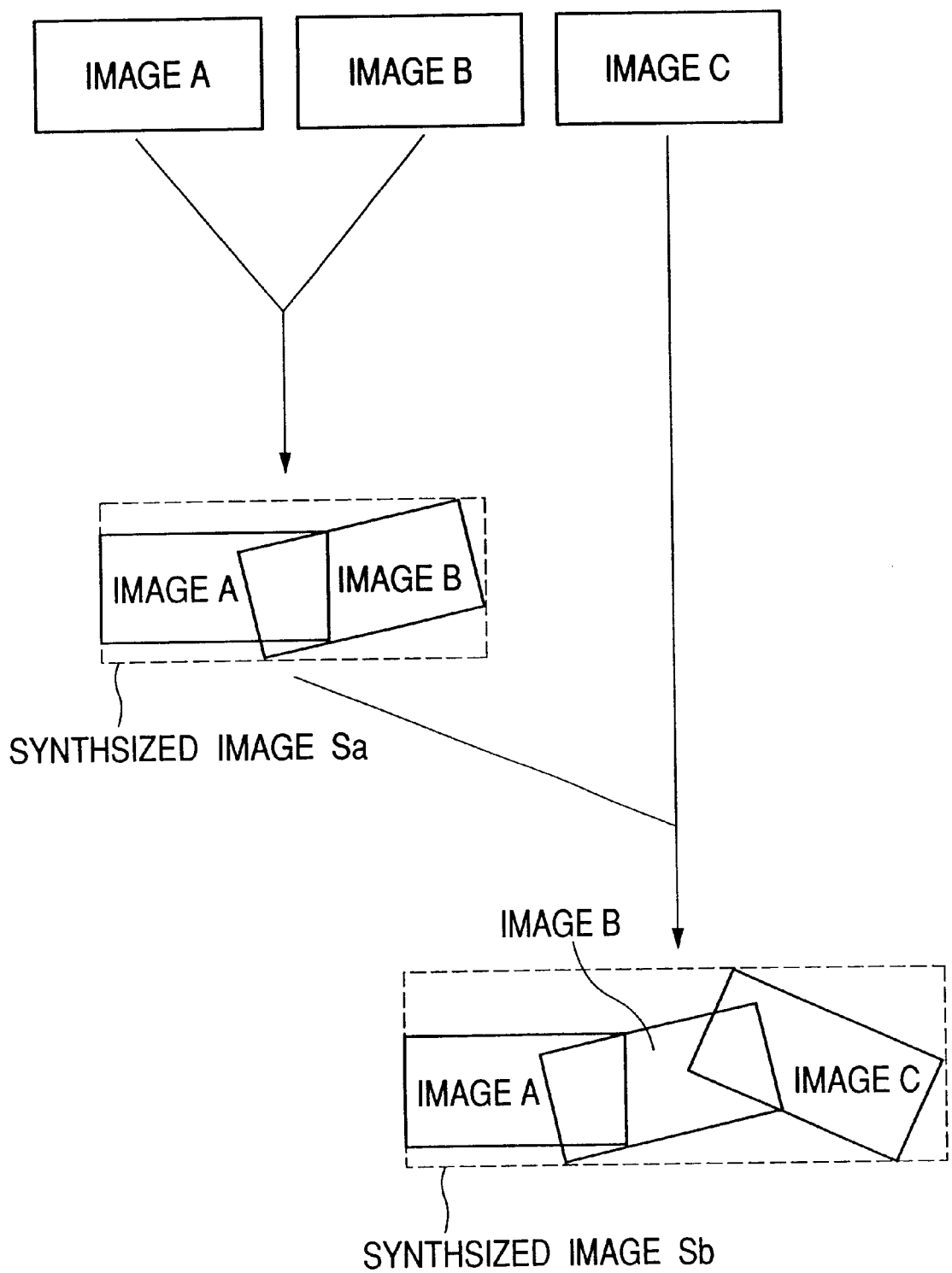
FIG. 3 is a diagram for explaining the image synthesis processing using a conventional image synthesis method.
Figure 4:
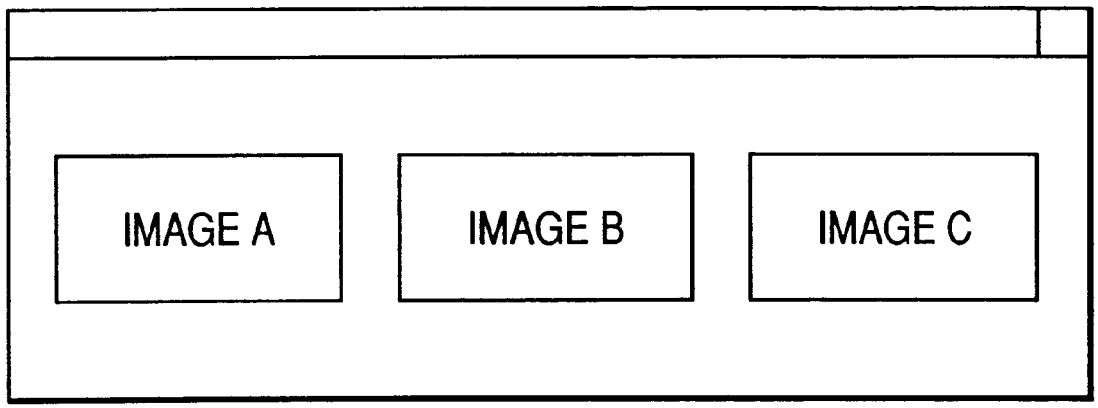
FIG. 4 is a diagram for explaining the image synthesis processing using the conventional image synthesis method.
Figure 5:
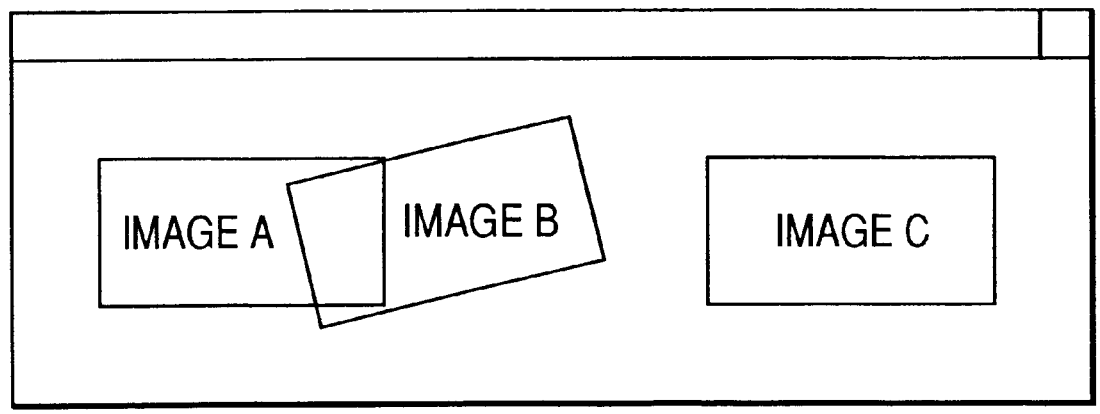
FIG. 5 is a diagram for explaining the image synthesis processing using the conventional image synthesis method.
Figure 6:
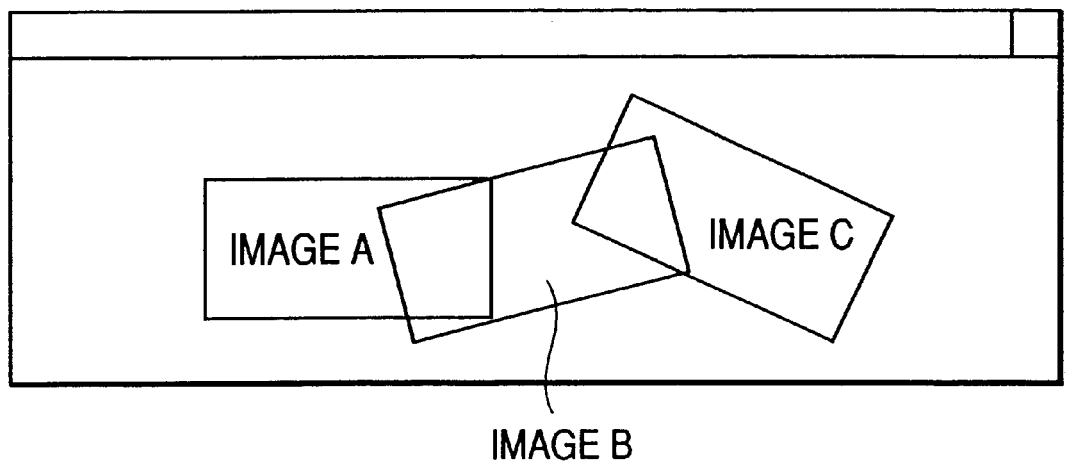
FIG. 6 is a diagram for explaining the image synthesis processing using the conventional image synthesis method.
Figure 7:
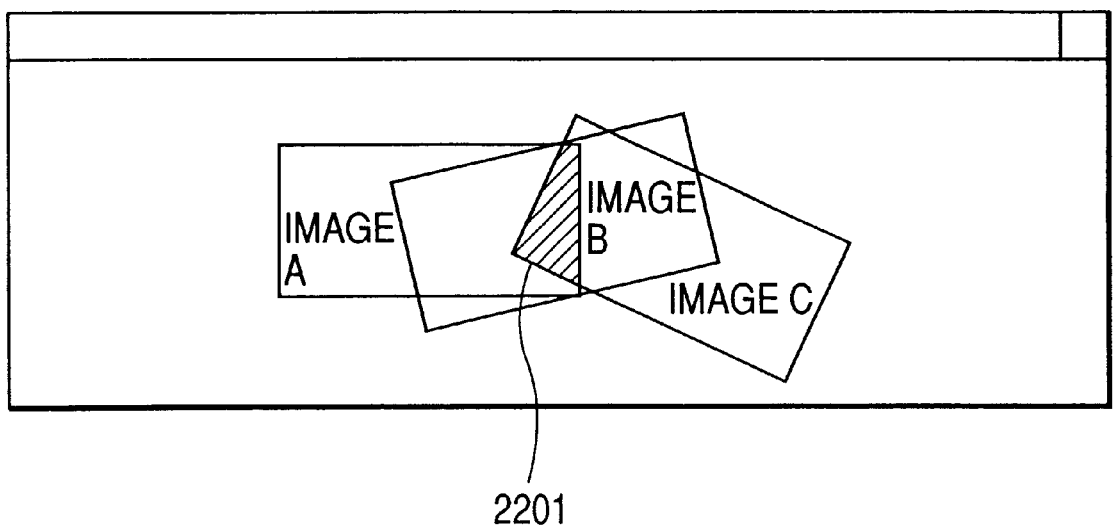
FIG. 7 is a diagram for explaining the image synthesis processing using the conventional image synthesis method.

It is certified that error appears in the above-identified patent and that said Letters Patent is hereby corrected as shown below:

Drawings,
Sheet 2, FIGURE 3, "SYNTHSIZED" (both occurrences) should read
-- SYNTHESIZED --.

Column 7,
Line 67, "y'=Bx+Ay+D" should read -- y'=-Bx+Ay+D --.

Signed and Sealed this

Twenty-eighth Day of January, 2003

JAMES E. ROGAN
*Director of the United States Patent and Trademark Office*